(12) United States Patent
Harrison, Jr.

(10) Patent No.: US 7,599,938 B1
(45) Date of Patent: Oct. 6, 2009

(54) SOCIAL NEWS GATHERING, PRIORITIZING, TAGGING, SEARCHING, AND SYNDICATION METHOD

(76) Inventor: Shelton E. Harrison, Jr., 6225 Canterbury Dr. #105, Culver City, CA (US) 90230

( * ) Notice: Subject to any disclaimer, the term of this patent is extended or adjusted under 35 U.S.C. 154(b) by 681 days.

(21) Appl. No.: 10/888,781

(22) Filed: Jul. 9, 2004

Related U.S. Application Data

(60) Provisional application No. 60/486,630, filed on Jul. 11, 2003.

(51) Int. Cl.
G06F 17/30 (2006.01)
G06F 17/00 (2006.01)
G06Q 10/00 (2006.01)

(52) U.S. Cl. .................. 707/10; 707/3; 707/5; 707/7; 707/9; 707/102; 705/1; 705/7; 705/10; 705/12; 705/26; 715/200; 715/221; 715/239; 715/700; 715/762

(58) Field of Classification Search .................. 707/1, 707/3–7; 705/14; 709/206, 219
See application file for complete search history.

(56) References Cited

U.S. PATENT DOCUMENTS

| | | | |
|---|---|---|---|
| 5,175,814 A | 12/1992 | Anick et al. | |
| 5,220,625 A | 6/1993 | Hatakeyama et al. | |
| 5,321,833 A | 6/1994 | Chang et al. | |
| 5,446,891 A | 8/1995 | Kaplan et al. | |
| 5,488,725 A | 1/1996 | Turtle et al. | |
| 5,659,732 A | 8/1997 | Kirsch | |
| 5,696,962 A | 12/1997 | Kupiec | |
| 5,724,567 A | 3/1998 | Rose et al. | |
| 5,778,367 A | 7/1998 | Wesinger et al. | |
| 5,796,952 A | 8/1998 | Davis et al. | |
| 5,842,203 A | 11/1998 | D'Elena et al. | |
| 5,848,410 A | 12/1998 | Walls et al. | |
| 5,864,845 A | 1/1999 | Vorhees et al. | |
| 5,864,846 A | 1/1999 | Vorhees et al. | |
| 5,890,152 A | 3/1999 | Rapaport et al. | |
| 5,913,215 A | 6/1999 | Rubinstein et al. | |
| 6,006,218 A | 12/1999 | Breese et al. | |
| 6,029,195 A * | 2/2000 | Herz | 725/116 |
| 6,041,326 A | 3/2000 | Amro et al. | |
| 6,199,061 B1 | 3/2001 | Blewett et al. | |
| 6,236,990 B1 | 5/2001 | Geller et al. | |
| 6,247,007 B1 | 6/2001 | Cooperman et al. | |
| 6,317,741 B1 | 11/2001 | Burrows | |

(Continued)

OTHER PUBLICATIONS

Bharat et al., When Experts Agree: Using Non-Affiliated Experts to Rank Popular Topics, Jan. 2002, ACM Press, vol. 20, Issue 1, pp. 47-58.*

(Continued)

*Primary Examiner*—Apu M Mofiz
*Assistant Examiner*—Jessica N Le

(57) ABSTRACT

A "URLIT" identifier is assigned to a URL and embedded in an HTML document located at the URL. The URLIT and other data are described using a Universal Advertisement Markup Language such that high-precision searching of the World Wide Web is possible. URLIT-enabled transactions are conducted through a Universal Toolbar Utility. A search method allows user-definition of search algorithms and includes a ranking method that assigns relevancy scores to documents by polling users. Transaction reliability is enhanced by user participation in a Universal Terms of Use system and a Universal Arbitration system.

27 Claims, 82 Drawing Sheets

U.S. PATENT DOCUMENTS

| | | | |
|---|---|---|---|
| 6,327,593 B1 | 12/2001 | Goiffon | |
| 6,347,307 B1 | 2/2002 | Sandhu et al. | |
| 6,363,377 B1 | 3/2002 | Kravets et al. | |
| 6,421,675 B1 | 7/2002 | Ryan et al. | |
| 6,433,795 B1 | 8/2002 | MacNaughton et al. | |
| 6,473,749 B1 | 10/2002 | Smith et al. | |
| 6,480,837 B1 | 11/2002 | Dutta | |
| 6,490,577 B1 | 12/2002 | Anwar | |
| 6,516,312 B1 | 2/2003 | Kraft et al. | |
| 6,539,377 B1 | 3/2003 | Culliss | |
| 6,546,388 B1 | 4/2003 | Edlund et al. | |
| 6,571,238 B1 | 5/2003 | Pollack et al. | |
| 6,601,061 B1 | 7/2003 | Holt et al. | |
| 6,626,957 B1 | 9/2003 | Lippert et al. | |
| 6,647,384 B2 | 11/2003 | Gilmour | |
| 6,678,694 B1 | 1/2004 | Zimmerman et al. | |
| 6,704,739 B2 | 3/2004 | Craft et al. | |
| 6,714,975 B1 | 3/2004 | Aggarwal et al. | |
| 6,766,320 B1 | 7/2004 | Wang et al. | |
| 6,766,362 B1 * | 7/2004 | Miyasaka et al. | 709/219 |
| 6,772,150 B1 | 8/2004 | Whitman et al. | |
| 6,778,193 B2 | 8/2004 | Biebesheimer et al. | |
| 6,785,676 B2 | 8/2004 | Oblinger | |
| 6,801,936 B1 | 10/2004 | Diwan | |
| 6,816,850 B2 * | 11/2004 | Culliss | 707/1 |
| 6,816,857 B1 | 11/2004 | Weissman et al. | |
| 6,834,277 B1 | 12/2004 | Learmonth | |
| 6,865,746 B1 | 3/2005 | Herrington et al. | |
| 6,876,997 B1 | 4/2005 | Rorey et al. | |
| 6,889,222 B1 | 5/2005 | Zhao | |
| 6,895,385 B1 * | 5/2005 | Zacharia et al. | 705/10 |
| 6,944,612 B2 * | 9/2005 | Roustant et al. | 707/3 |
| 6,968,233 B1 | 11/2005 | Abbott et al. | |
| 7,028,024 B1 | 4/2006 | Kommers et al. | |
| 7,043,450 B2 | 5/2006 | Velez et al. | |
| 7,062,488 B1 * | 6/2006 | Reisman | 707/8 |
| 7,089,236 B1 | 8/2006 | Stibel | |
| 7,092,992 B1 * | 8/2006 | Yu | 709/206 |
| 7,099,871 B2 | 8/2006 | Faybishenko et al. | |
| 7,117,198 B1 | 10/2006 | Cronin et al. | |
| 7,139,972 B2 | 11/2006 | Hamilton et al. | |
| 7,142,883 B2 | 11/2006 | Rouse et al. | |
| 7,155,427 B1 | 12/2006 | Prothia et al. | |
| 7,165,119 B2 | 1/2007 | Fish | |
| 7,171,415 B2 | 1/2007 | Kan et al. | |
| 7,181,488 B2 | 2/2007 | Martin et al. | |
| 7,185,065 B1 * | 2/2007 | Holtzman et al. | 709/217 |
| 7,240,055 B2 * | 7/2007 | Grasso et al. | 707/5 |
| 7,246,106 B2 * | 7/2007 | Gaynor et al. | 707/1 |
| 7,293,019 B2 | 11/2007 | Dumais et al. | |
| 2001/0044811 A1 | 11/2001 | Ballantyne et al. | |
| 2001/0044812 A1 | 11/2001 | Byrd et al. | |
| 2001/0051943 A1 * | 12/2001 | Drucker et al. | 707/3 |
| 2002/0010639 A1 | 1/2002 | Howey et al. | |
| 2002/0013728 A1 * | 1/2002 | Wilkman | 705/14 |
| 2002/0057299 A1 | 5/2002 | Oren et al. | |
| 2002/0059204 A1 | 5/2002 | Harris | |
| 2002/0069140 A1 | 6/2002 | Tang | |
| 2002/0092019 A1 | 7/2002 | Marcus | |
| 2002/0107882 A1 * | 8/2002 | Gorelick et al. | 707/500.1 |
| 2002/0186255 A1 | 12/2002 | Shafron et al. | |
| 2003/0046098 A1 * | 3/2003 | Kim | 705/1 |
| 2003/0055831 A1 | 3/2003 | Ryan et al. | |
| 2003/0088554 A1 | 5/2003 | Ryan et al. | |
| 2003/0139975 A1 | 7/2003 | Perkowski | |
| 2003/0144955 A1 | 7/2003 | Kim | |
| 2003/0158839 A1 * | 8/2003 | Faybishenko et al. | 707/3 |
| 2003/0167213 A1 | 9/2003 | Jammes et al. | |
| 2003/0171944 A1 | 9/2003 | Fine et al. | |
| 2003/0172005 A1 | 9/2003 | Hellal et al. | |
| 2003/0182177 A1 | 9/2003 | Gallagher et al. | |
| 2003/0182245 A1 | 9/2003 | Seo | |
| 2003/0182372 A1 | 9/2003 | Lee | |
| 2003/0200137 A1 | 10/2003 | Drummond | |
| 2003/0200170 A1 | 10/2003 | Tenembaum | |
| 2003/0233274 A1 * | 12/2003 | Urken et al. | 705/12 |
| 2003/0233425 A1 | 12/2003 | Lyons et al. | |
| 2004/0003097 A1 | 1/2004 | Willis et al. | |
| 2004/0006536 A1 | 1/2004 | Kawashima et al. | |
| 2004/0061720 A1 | 4/2004 | Weber | |
| 2004/0064447 A1 | 4/2004 | Simske et al. | |
| 2004/0068527 A1 | 4/2004 | Smith | |
| 2004/0083143 A1 | 4/2004 | Rodger | |
| 2004/0111370 A1 | 6/2004 | Saylors et al. | |
| 2004/0111467 A1 | 6/2004 | Willis | |
| 2004/0133601 A1 | 7/2004 | Graham | |
| 2004/0215624 A1 | 10/2004 | Gonzalez | |
| 2004/0249801 A1 * | 12/2004 | Kapur | 707/3 |
| 2005/0033641 A1 | 2/2005 | Jha et al. | |
| 2005/0234953 A1 | 10/2005 | Zhang et al. | |
| 2005/0256905 A1 | 11/2005 | Gruhl et al. | |
| 2006/0149708 A1 * | 7/2006 | Lavine | 707/3 |
| 2006/0161845 A1 | 7/2006 | Kahn et al. | |
| 2006/0168185 A1 | 7/2006 | McCall et al. | |
| 2006/0253459 A1 | 11/2006 | Kahn et al. | |
| 2006/0253463 A1 | 11/2006 | Wu et al. | |
| 2006/0253489 A1 | 11/2006 | Kahn et al. | |
| 2006/0282822 A1 | 12/2006 | Weng | |
| 2007/0050393 A1 | 3/2007 | Vogel et al. | |

OTHER PUBLICATIONS

Unknown Aurthor, "Alaska Cam," Touch n' Go Systems (alaskacam.com), Mar. 14, 2004, Anchorage, AK.

Liedtke, Michael; "Amazon.com Adds Photographs to Directory," Associated Press (a9.com), Jan. 29, 2005, San Francisco.

Unknown Author, "Circa Technology: Applying Meaning to Information Management. An Applied Semantics Technical White Paper," Unknown Item, Unknown Date, Unknown City.

Unknown Author, "CamZone Streaming—Check Out Live San Diego," Camzone Networks, Unknown Date, San Diego.

Cooper, Chip; "Online Contract Drafting and Document Assembly Service," Digital Contracts, Inc., Aug. 23, 2005, Unknown City.

Unknown Author, "Contract Builder System," Enhanced Technologies Inc., Unknown Date, Unknown City.

Unknown Author, "WebcamSat Server Software," Surveyor Corporation, Unknown Date, Unknown City.

Altova, "Altova Mapforce Database Mapping," Item Unknown, Unknown Date, Unknown City.

Unknown Author, "NRS Contract Builder," Drake Analytics (nrs-online.com), Unknown Date, Unknown City.

Patch, Kimberly; "Summarizer Ranks Sentences," Technology Research News, Apr. 20/27, 2005, Unknown City.

Nick Rhodes, "Electronic Text and Markup," Unknown Item, Unknown Date, Unknown City.

Microsoft, "Setting Up Windows Media Services 4.1: The Basics", Microsoft Windows Media (Microsoft.com), Unknown Date, Unknown City.

Marshall Brain, "How Web Servers Work," How Stuff Works (computer.howstuffworks.com), Unknown Date, Unknown City.

M.Day, Lotus, J. Rosenberg, DynamicSoft, H. Sugano, Fujitsu, "A Model for Presence and Instant Messaging," RFC 2778—Internet RFC/STD/FYI/BCP Archives, Feb. 2000, Unknown City.

M. Day, Lotus, S. Aggarwal Microsoft, G Mohr, Activerse, J. Vincent, Into Networks, "Instant Messaging/Presence Protocol Requirements," RFC 2779-RFC/STD/FYI/BCP Archives, Feb. 2000, Unknown City.

Unknown Author,"Searching the ADS by Email" (NASA ADS Help Pages), Harvard (adsdoc.harvard.edu), Unknown Date, Unknown City.

Unknown Author, "Wikipedia : Dispute Resolution," Unknown Item, Jun. 10, 2004, Unknown City.

Hu, Jim; "Yahoo to Trillian : Talk to the Hand," CNET News.com (zdnet.com.com), Jun. 23, 2004, Unknown City.

Yahoo; "Get Rid of Pop-Ups Before They Pop Up," Yahoo! Companion Toolbar (companion.yahoo.com), Unknown Date, Unknown City.

Unknown Author, "About : Lexico Publishing Group-Offering Online Reference and Learning Services," Unknown Item, Unknown Date, Unknown City.

Emancipator, "Applied Semantics + Stemming: The Future of Google Searching," Search Guild, Unknown Date, Unknown City.

Yechiel (Gene C.)Coleman, "Ensuring Enforceability of Beis Din's Judgements," Jewish Law Articles (jlaw.com), May 3, 1998, Unknown City.

Yahoo, "Try the New Yahoo! Toolbar BETA With Anti-Spy," Yahoo! Toolbar (beta.toolbar.yahoo.com), Unknown Date, Unknown City.

Marshall Brain, "How CGI Scripting Works," How Stuff Works (computer.howstuffworks.com), Unknown Date, Unknown City.

Matt Hahnfeld, "EveryAuction," EverySoft Unknown Date, Unknown City.

Gain Publishing, "Gator eWallet, The Smart Online Companion," Gator.com, Unknown Date. Unknown City.

Cape Clear, "CapeMail—Asynchronous Google Access or Google by Email," Cape Science (CapeScience.com), Unknown Date, Unknown City.

Dennis G Watson, "Brief History of Document Markup," edis (edis.ifas.ufl.edu), Nov. 1992, Gainesville FL.

Jeff Tyson, "How Internet Infrastructure Works," How Stuff Works (computer.howstuffworks.com), Unknown Date, Unknown City.

TechTarget, "Lexibot," Whatis.com (Whatis.techtarget.com), Jul. 29, 2001, Unknown City.

Amter, Charlie; "AirFX : Good Vibrations?," TechTV (techtv.com), Apr. 21, 2001, Unknown City.

Long, Google Hacking for Penetration Testers, Jul. 2004, Syngress, Sec. 1-2.

Bharat et al., When Experts Agree: Using Non-Affiliated Experts to Rank Popular Topics, Jan. 2002, ACM Transactions, vol. 20, No. 1, pp. 47-58.

Musgrove, Representing the Context of Equivalent Query Words as a Means of Preserving Search Precision, Apr. 2005, Proceedings . . . , pp. 63-71.

Quigley, JavaScript by Example, Jun. 19, 2003, Prentice Hall, Chapter 10.

Howe, Jeff, "The Rise of Crowdsouring," Wired Magazine, Jun. 2006, San Francisco, CA.

Unknown Author, "What Is Upcoming.org?" May 2004, via www.archive.org, Unknown City.

O'Reilly, Tim, "What Is Web 2.0?", O'Reilly Media, Sep. 30, 2005, San Francisco, CA.

Unknown Author, "Help Is at Hand." FLICKR.com, Sep. 2004, via www.archive.org, Unknown City.

Unknown Author, "About Fickr", FLICKR.com, Sep. 2004, via www.archive.org, Unknown City.

Unknown Author, "Del.icio.us", wikipedia.com, Oct. 2004, via www.archive.org., Unknown City.

Unknown Author, "Collective Intelligence," Wikipedia, Jun. 1, 2004, via www.archive.org, Unknown City.

Unknown Author, "FAQ," Digg.com, Jan. 2005, via www.archive.org., Unknown City.

Unknown Author, "FAQ", StumbleUpon, Feb. 7, 2003, via www.archive.org, Unknown City.

Unknown Author, "What Is It?", StumbleUpon.com, Apr. 2, 2003, via www.archive.org, Unknown City.

Unknown Author, "How It Works", StumbleUpon.com, Apr. 2, 2003, via www.archive.org, Unknown City.

Unknown Author, "Redditt", wikipedia.com, Oct. 29, 2007, wikipedia.com, Unknown City.

Unknown Author, "I Want To Be a Slashdot.org Author!", Slashdot,org via archive.org, Jan. 1998.

Unknown Author, "Editorial," Slashdot.org, via archive.org, Dec. 2002, Unknown City.

Unknown Author, "Slashdot FAQ," slashdot.org, via www.archive.org, Dec. 2002, Unknown City.

Unknown Author, "About This Site," Slashdot.org, via www.archive.org, Dec. 2002, Unknown City.

\* cited by examiner

FIG. 1    Universal Electronic Transaction (UET) System: Method Overview
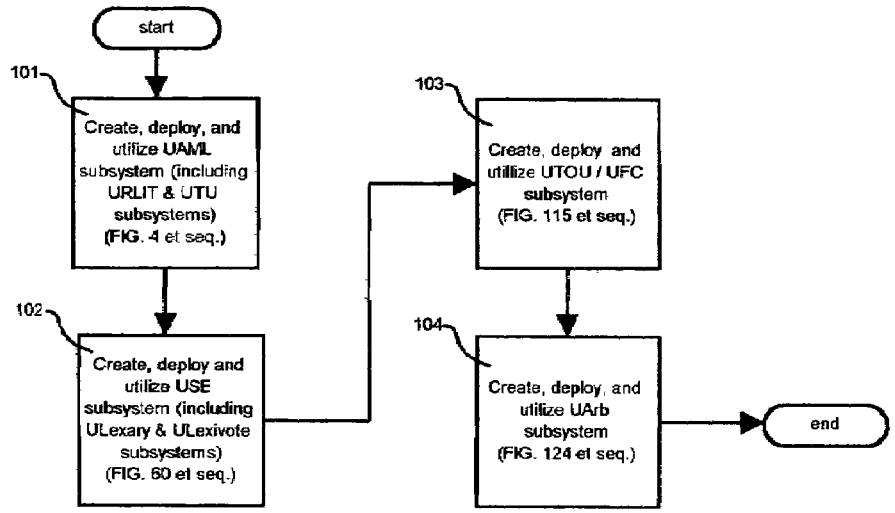
FIG. 2    UET System: System Overview
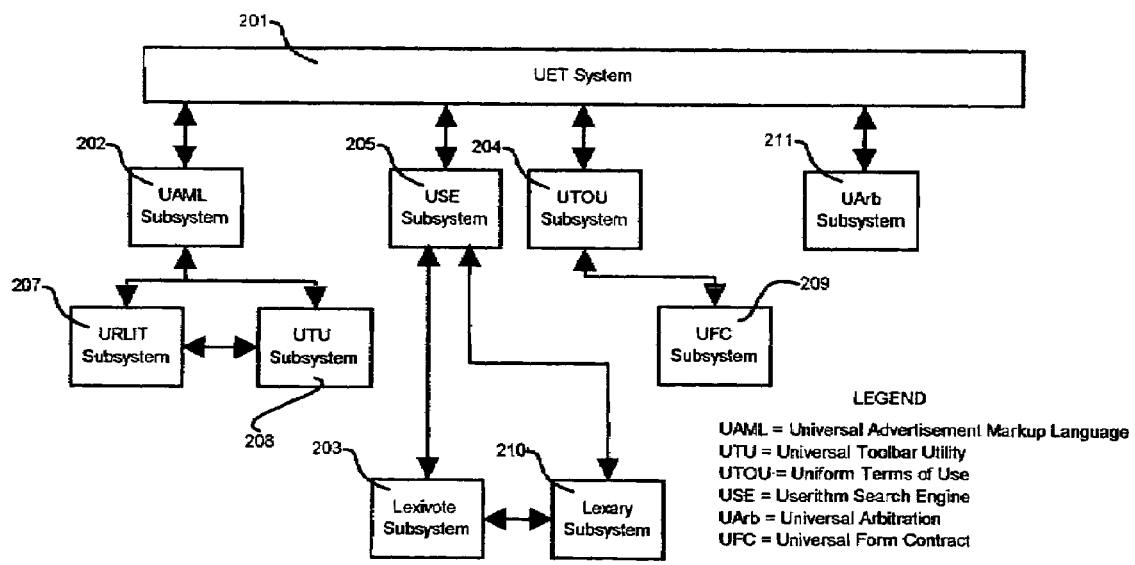

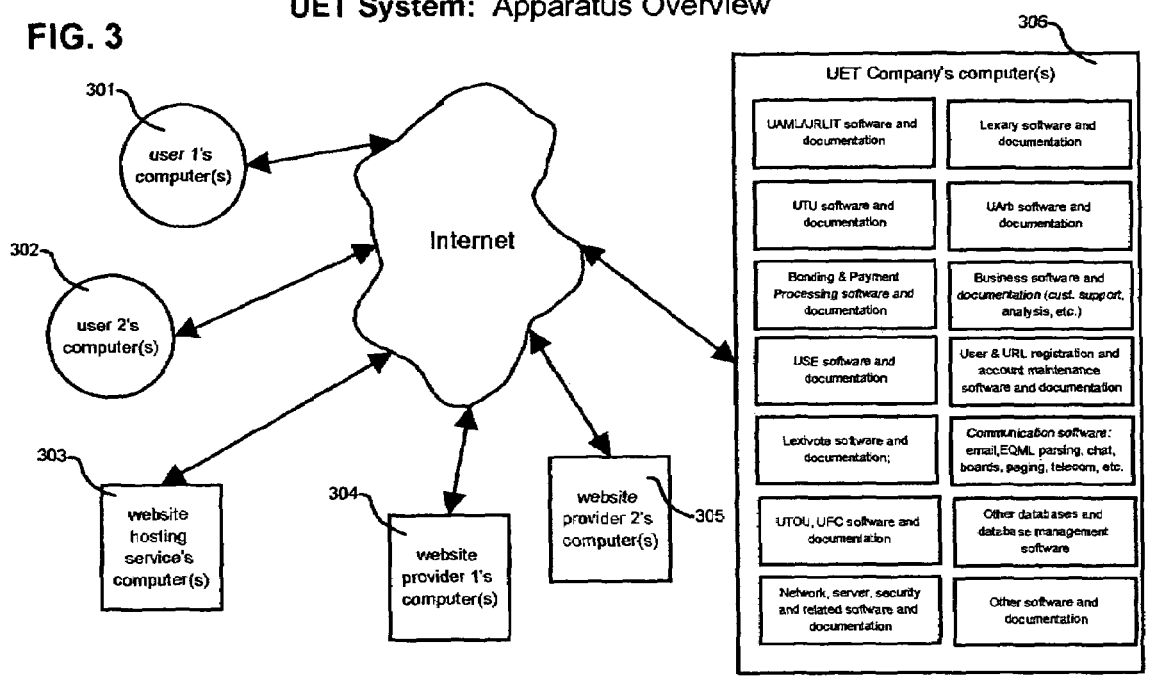
FIG. 3 — UET System: Apparatus Overview
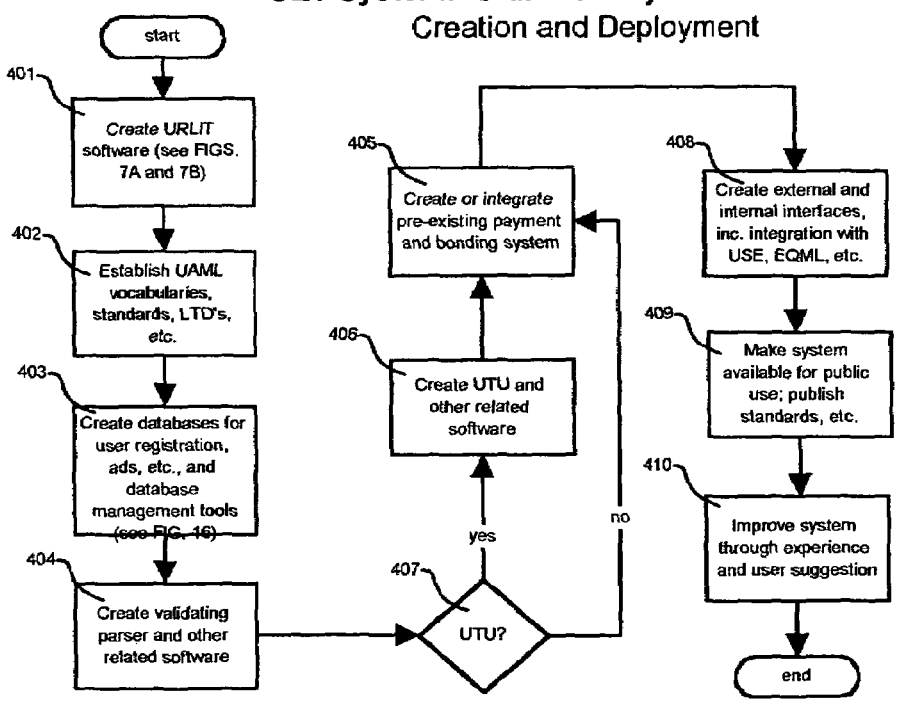
FIG. 4 — UET System: UAML Subsystem: Method of Creation and Deployment

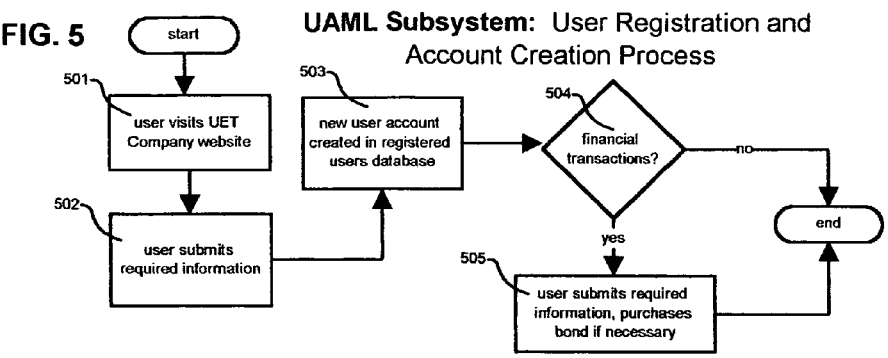
FIG. 5 UAML Subsystem: User Registration and Account Creation Process
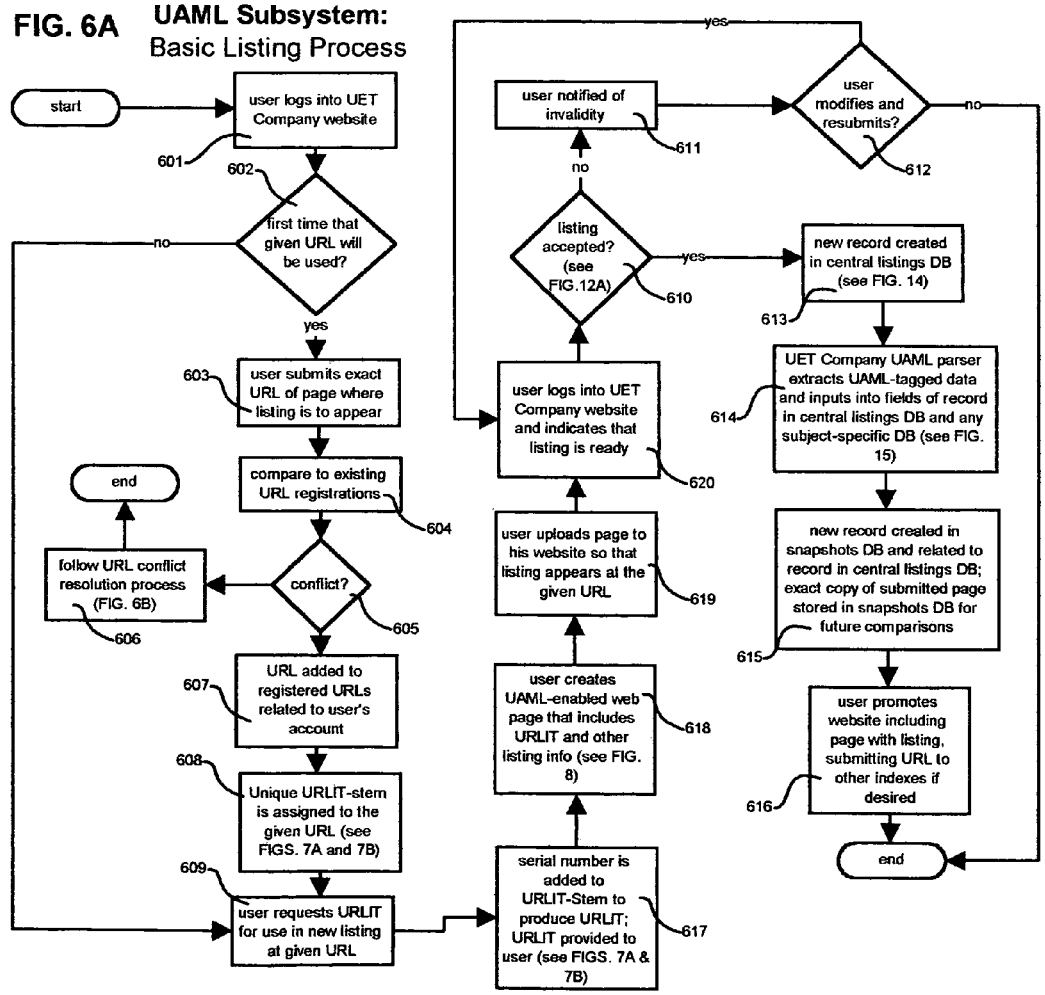
FIG. 6A UAML Subsystem: Basic Listing Process

UAML Subsystem: URL Conflict Resolution Process

UAML Subsystem: URLIT Formation Process

UAML Subsystem: Example URLIT Formation and Usage

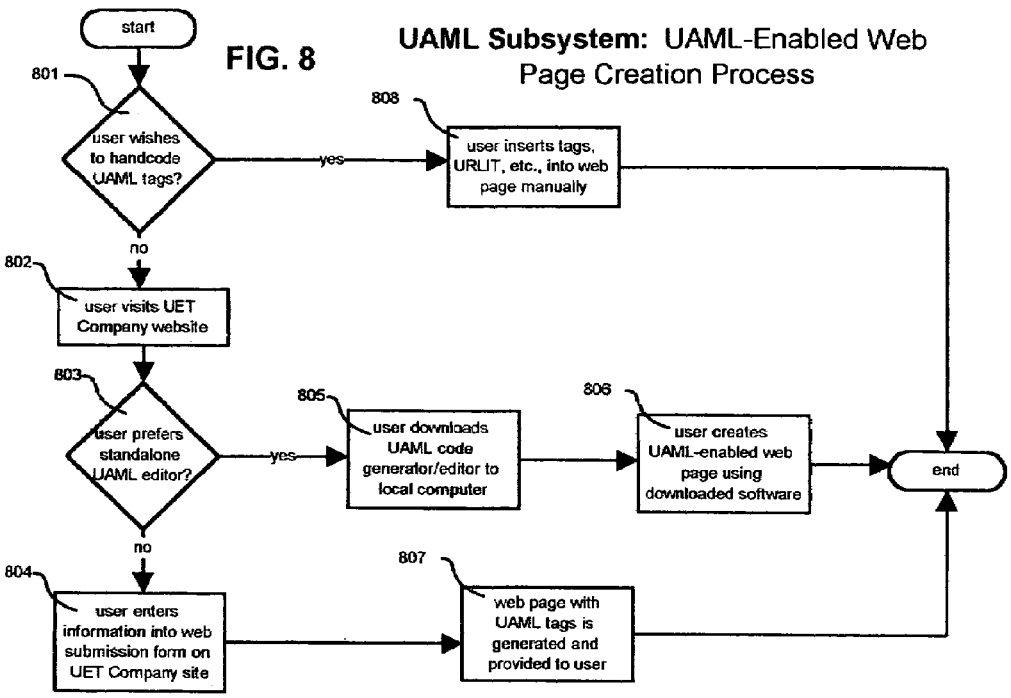
FIG. 8 UAML Subsystem: UAML-Enabled Web Page Creation Process
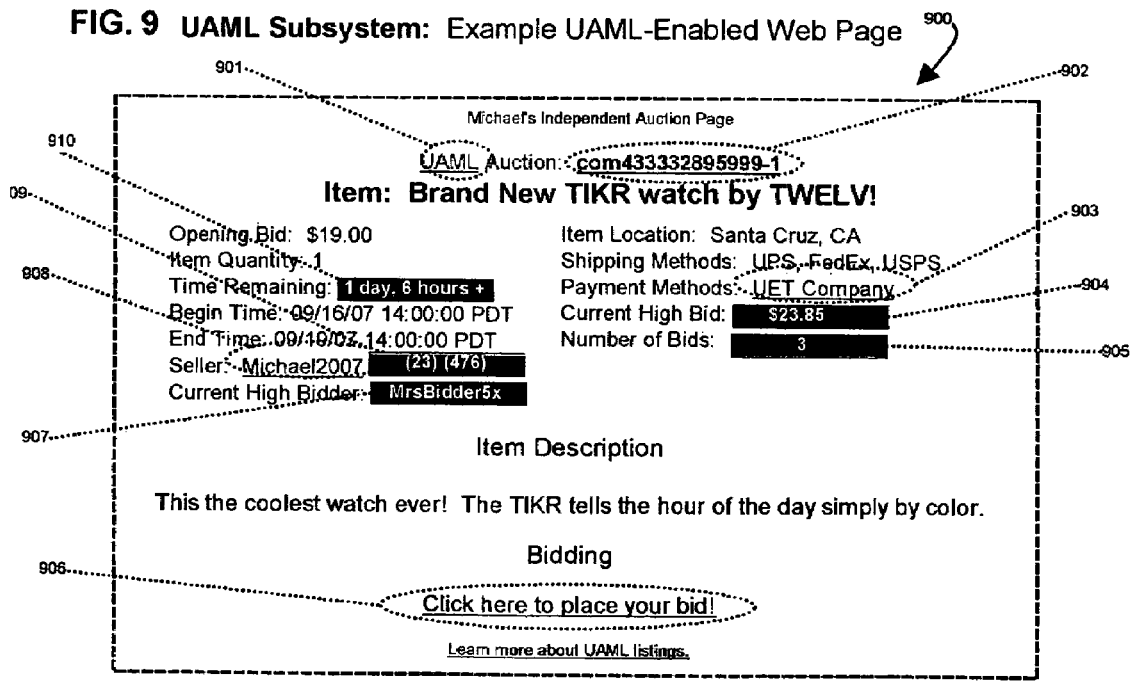
FIG. 9 UAML Subsystem: Example UAML-Enabled Web Page

FIG. 10

UAML Subsystem: Excerpt from Example User-Accessible Submission Form for Entry of Data and Submission to UAML Code Generator

```
UAML-Enabled Web Page Generator:
Submit Your Auction Info Below

Enter Your User ID             [              Michael2007 ]
Enter the Title of Your Auction [ Brand New TIKR watch by TWELV! ]
Enter the Opening Bid Amount   [                    19.00 ]
                              [etc.]
```

FIG. 11  UAML Subsystem: Excerpt from Example UAML-Enabled HTML Document

```
.....[cut].....
<TR> <TD>  <P><UAMLAuctOpenBidPhrase>Opening Bid:
<UAMLAuctOpenBidAmount>$19.00</UAMLAuctOpenBidAmount></UAMLAuctOpenBidPhrase></FONT
></P>
</TD></TR>  <TR><TD>  <P><UAMLAuctQPhrase>Item Quantity:
<UAMLAuctQuant>1</UAMLAuctQuant></UAMLAuctQPhrase></P>
</TD></TR> <TR> <TD> <P><UAMLAuctTimeRem>Time Remaining: <IMG
SRC="uaml-images/com433332895999-1a.jpg"></UAMLAuctTimeRem></P>
</TD> </TR><TR> <TD> <P><UAMLAuctBeginPhrase>Begin Time:
<UAMLAuctBeginDate>09/16/07</UAMLAuctBeginDate>
<UAMLAuctBeginTime>14:00:00</UAMLAuctBeginTime>
<UAMLAuctBeginTimeZone>PDT</UAMLAuctBeginTimeZone></UAMLAuctBeginPhrase></P></TD></T
R>
<TR> <TD><P><UAMLAuctEndPhrase>End Time: <UAMLAuctEndDate>09/19/07</UAMLAuctEndDate>
<UAMLAuctEndTime>14:00:00</UAMLAuctEndTime>
<UAMLAuctEndTimeZone>PDT</UAMLAuctEndTimeZone></UAMLAuctEndPhrase></P>
</TD></TR><TR><TD HEIGHT=14><P><UAMLAuctSellerPhrase>Seller: <A
HREF="http://www.uetcompany.htm/users/michael2007">Michael2007<IMG
SRC="uaml-images/com433332895999-1b.jpg"></A></UAMLAuctSellerPhrase></P>
</TD></TR><TR><TD><P><UAMLAuctHighBidderPhrase>Current High Bidder: <IMG
SRC="uaml-images/com433332895999-1c.jpg"></UAMLAuctHighBidderPhrase></P>
</TD> </TR></TABLE><BR></FONT></P> </TD> <TD VALIGN=top WIDTH=375><P><FONT
SIZE="-2" FACE="Arial" COLOR="#000000"><TABLE BORDER=0>
<TR><TD><P><UAMLAuctItemLocPhrase>Item Location: <UAMLAuctItemLocation>Santa Cruz,
CA</UAMLAuctItemLocation></UAMLAuctItemLocPhrase></P>
</TD> </TR><TR><TD><P><UAMLAuctShipMethPhrase>Shipping Methods:
<UAMLAuctShipMethod>UPS</UAMLAuctShipMethod>,
<UAMLAuctShipMethod>FedEx</UAMLAuctShipMethod>,
<UAMLAuctShipMethod>USPS</UAMLAuctShipMethod></UAMLAuctShipMethPhrase></P>
</TD></TR><TR><TD><P><UAMLAuctPayMethPhrase>Payment Methods: <A
HREF="http://www.uetcompany.com">UET Company</A></UAMLAuctPayMethPhrase></P>
</TD></TR><TR><TD><P><UAMLAuctHighBidPhrase>Current High Bid: <IMG
SRC="uaml-images/com433332895999-1d.jpg"></UAMLAuctHighBidPhrase></P>
</TD> </TR><TR> <TD><P><UAMLAuctNumBidsPhrase>Number of Bids: <IMG
SRC="uaml-images/com433332895999-1e.jpg"></UAMLAuctNumBidsPhrase></P>
.....[cut].....
```

UAML Subsystem: Initial Validation Process

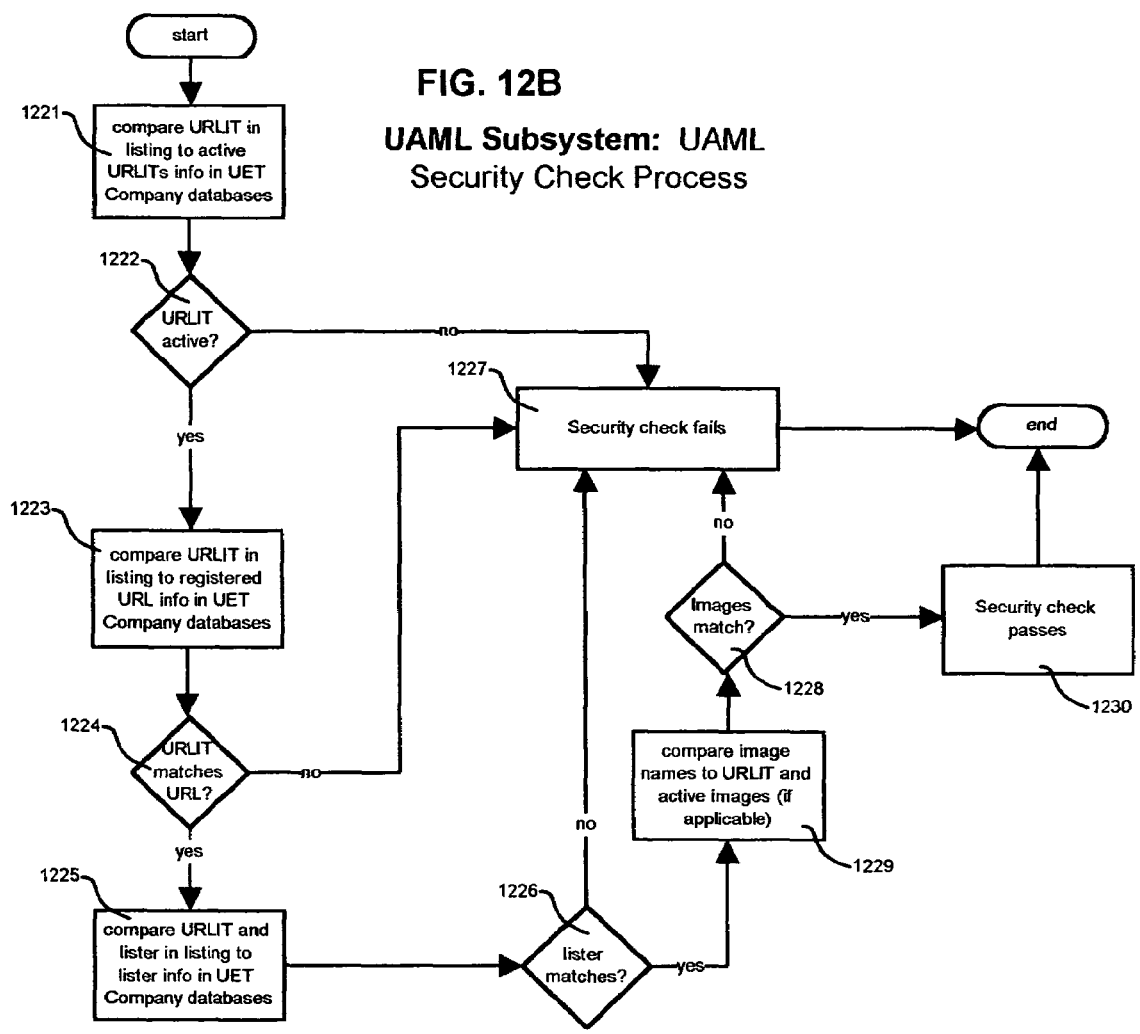

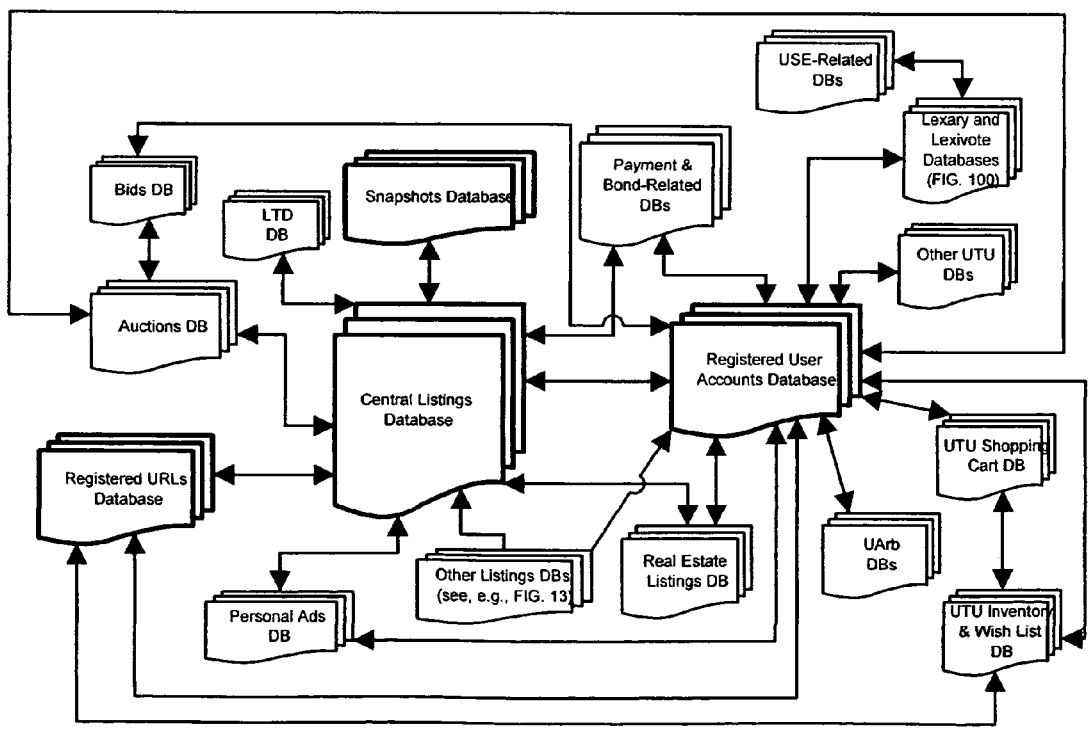

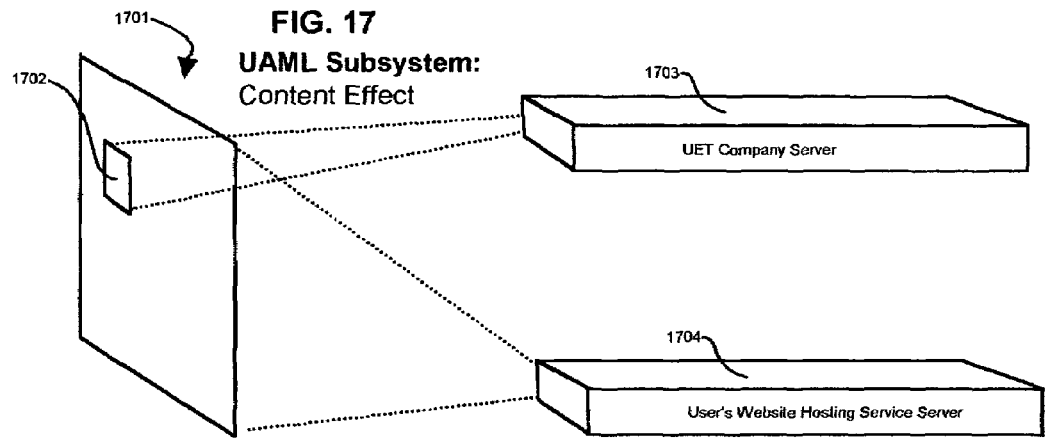
FIG. 17
UAML Subsystem: Content Effect
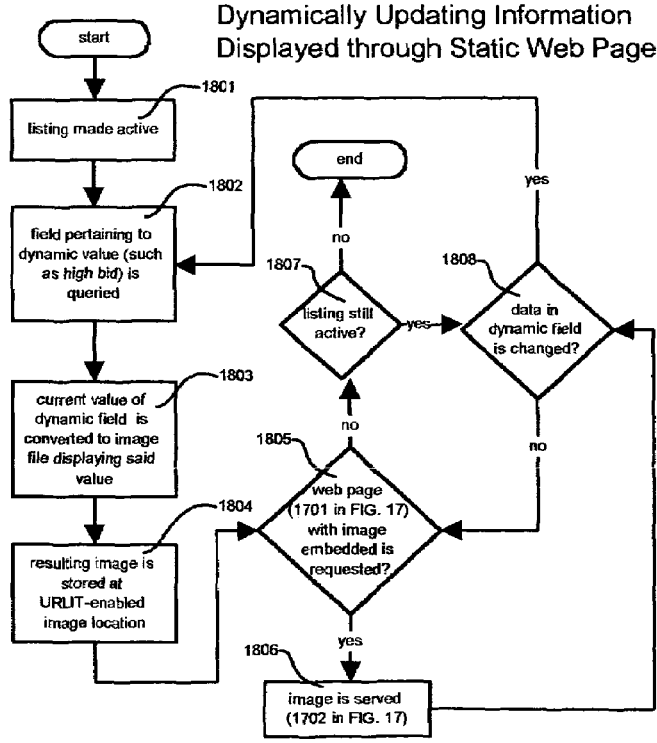
FIG. 18A  UAML Subsystem: Process for Dynamically Updating Information Displayed through Static Web Pages
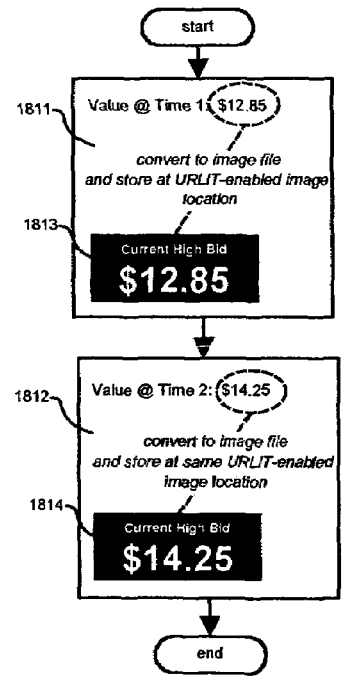
FIG. 18B
UAML Subsystem: Example Progression of Images as Data Changes

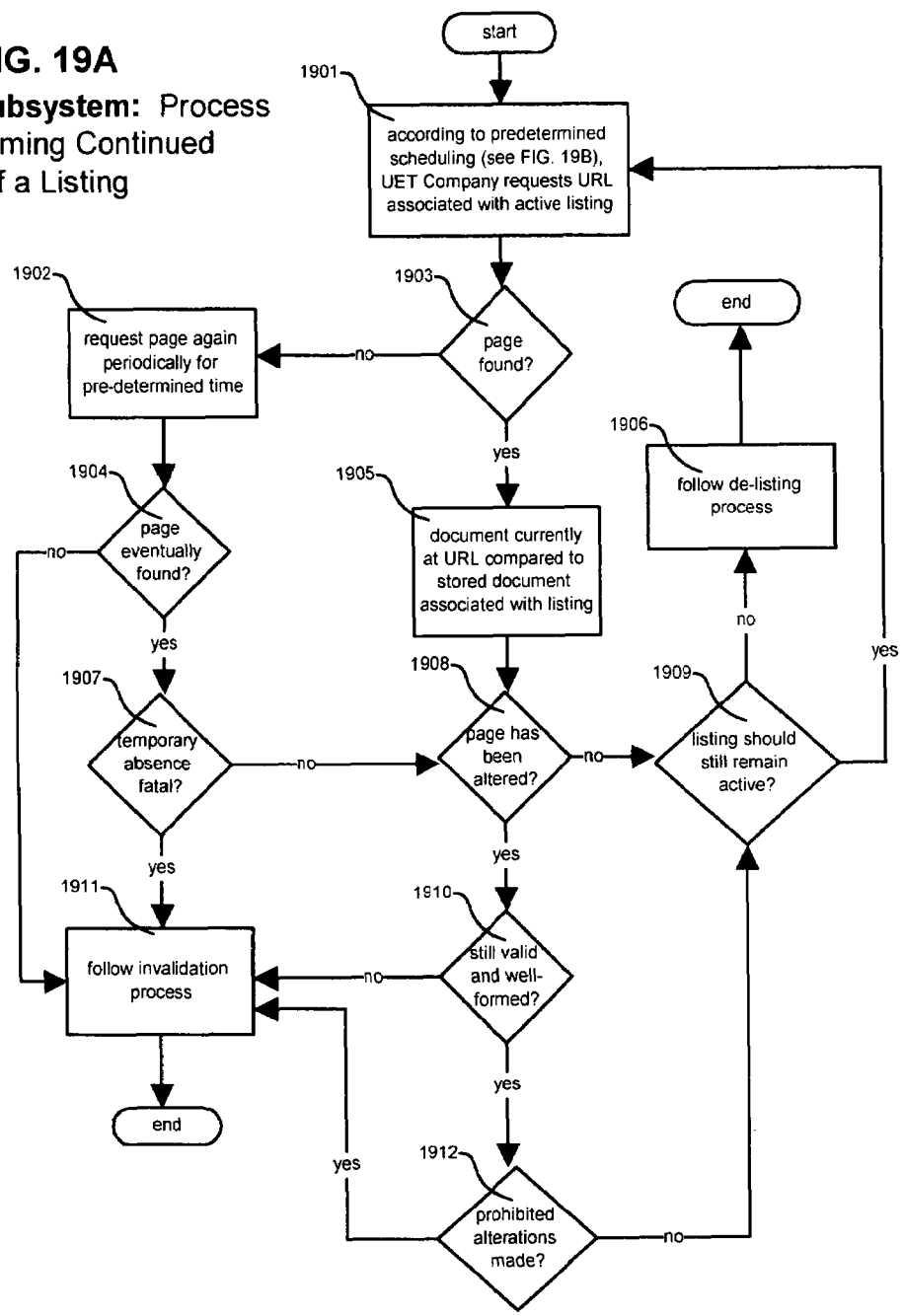

UAML Subsystem:
Invalidate Listing Process

UAML Subsystem:
Auction Cut-Short Process

UAML Subsystem:
De-Listing Process

UAML Subsystem: Example Usage Scenario

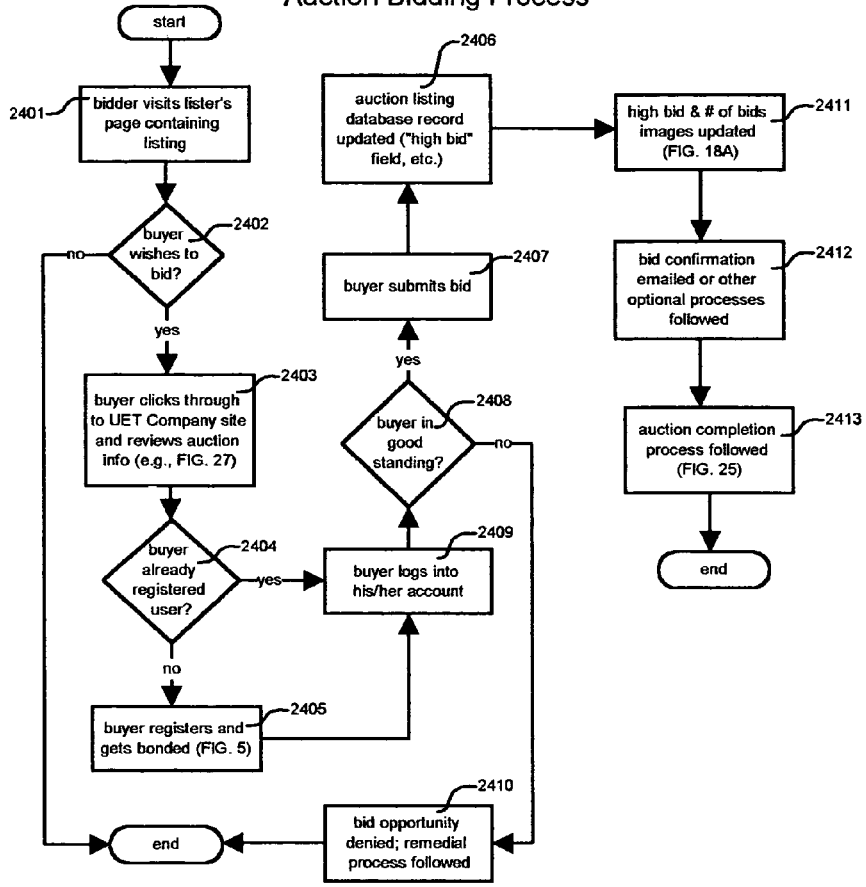
FIG. 24 UAML Subsystem: Auction Bidding Process
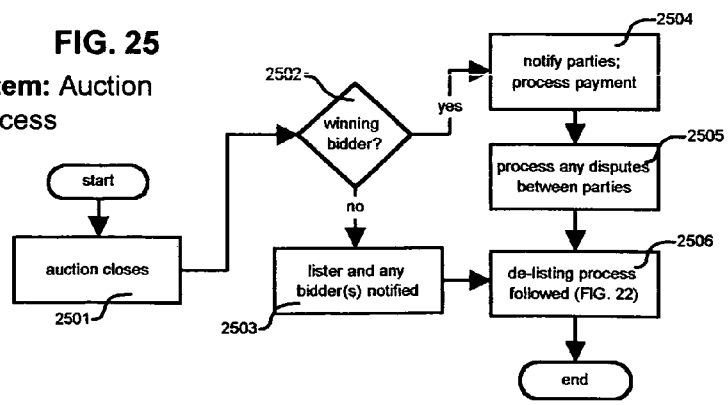
FIG. 25 UAML Subsystem: Auction Completion Process FIG. 26  UAML Subsystem: Excerpt from Sample "My Registered URLs'" Page

You are logged in as: Michael2007

My Registered URLs

| URL | URLIT Stem | Active URLIT | UTU Inventory | UTU Wish | UTU Contact | UTU Auction |
|---|---|---|---|---|---|---|
| 1. www.michaelsworld.com/uaml/bookauction.htm | com431546621763 | request | Inv. 1 | Wish. 4 | Cont. 1 | add |
| 2. www.michaelsworld.com/uaml/coinauction.htm | com431914362708 | request | add | Wish. 4 | Cont. 1 | add |
| 3. www.michaelsworld.com/uaml/bookauction2.htm | com432489349101 | com432489349101-8 | Inv. 1 | add | Cont. 1 | add |
| 4. www.michaelsworld.com/uaml/lookingforlove.htm | com432919567432 | request | Inv. 1 | Wish. 2 | Cont. 1 | add |
| 5. www.michaelsworld.com/uaml/watchauction3.htm | com433332895999 | com433332895999-1 | Inv. 1 | Wish. 1 | Cont. 1 | add |

2601  2602  2603  2604  2605  2606  2607

FIG. 27  UAML Subsystem: Sample Web Page from UET Co. Site Displaying Record from UET Co. Listings Database Pertaining to a Given Auction Listing

You are logged in as: BidBather

URLIT: com433332895999-1
Lister: Michael2007
Type: Auction
Item: Brand New TIKR watch by TWELV!
Opening Bid: $19.00
Item Quantity: 1
Begin Time: 09/16/07 14:00:00 PDT
End Time: 09/19/07 14:00:00 PDT
Item Location: Santa Cruz, CA
Shipping Methods: UPS, FedEx, USPS
Payment Methods: UET Company
Current High Bidder: MrsBidder5x
Current High Bid: $23.85
Number of Bids: 3
Item Description: This is the coolest watch ever! The TIKR tells the hour of the day simply by color.

Enter Your Bid Amount [                    ]
Enter Your Password  [                    ]

(submit bid)

UAML Subsystem: Summary View of Interaction between UAML-enabled Pages Published by Users, Third Party Service Providers Tapping UAML-Enabled Pages, and UET Company Dynamically Generated Pages

UAML Subsystem: Example Data Relationships Indicating Web Pages and Database Records Associated with a Listing

FIG. 28C

UAML Subsystem: Excerpt from Sample Web Page by Third Party Website Provider Tapping UAML for Directory of Certain Type of Listings

```
PoetryAnthology.com
The Best Poetry on the Web!
```

| Title | Poet | Year |
|---|---|---|
| How Once We Were in Love | Billy Willie | 2004 |
| Two Panthers | Doodle McLean | 1972 |
| Nights and Wisdom, Coals and Tears | Studs Walsh | 1888 |
| Summer's End | Brucene | 1986 |

FIG. 28D

UAML Subsystem: Excerpt from Sample Web Page by Third Party Website Provider Tapping UAML for Market Data

Auction Statistics - Week Ending 05/30/04

| Category | Auctions | Avg. Opening Bid |
|---|---|---|
| Automobiles | 1008 | $1832 |
| Collectibles | 7313 | $15 |
| Computer Hardware | 941 | $61 |
| Computer Software | 1279 | $22 |

FIG. 28E

UAML Subsystem: Excerpt from Sample Web Page by Third Party Website Provider Tapping UAML for Independent Search Engine

Magic Search
We Do Magic With the Web!

*What are you looking for, Merlin?*

| Job | Auction | Real Estate | Personals | Car | Flight | Movie | Stock | Book by ISBN | Product by UPC/EPC |
|---|---|---|---|---|---|---|---|---|---|
| ● | ○ | ○ | ○ | ○ | ○ | ○ | ○ | ○ | ○ |

Enter the term(s) you want to search here, and let there be magic!

( Abracadabra )

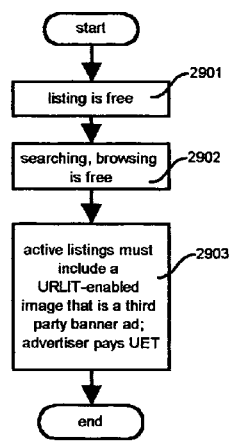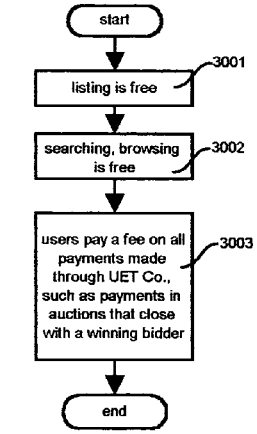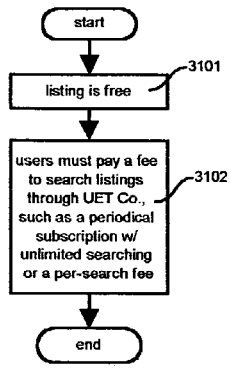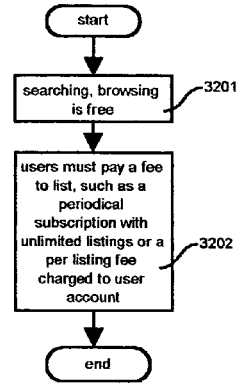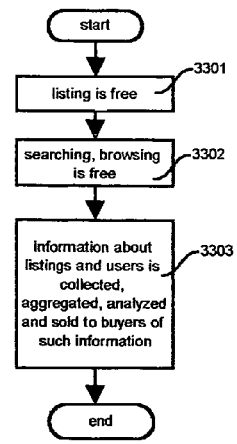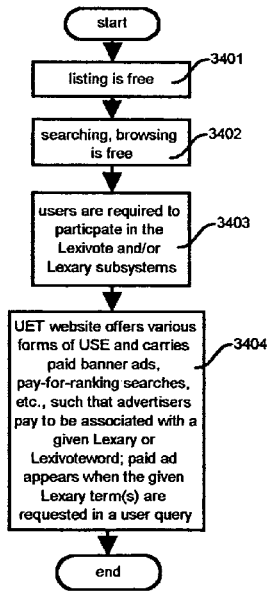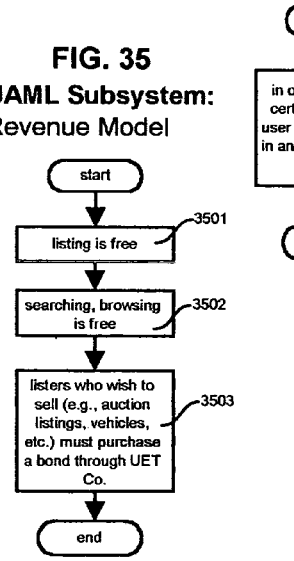

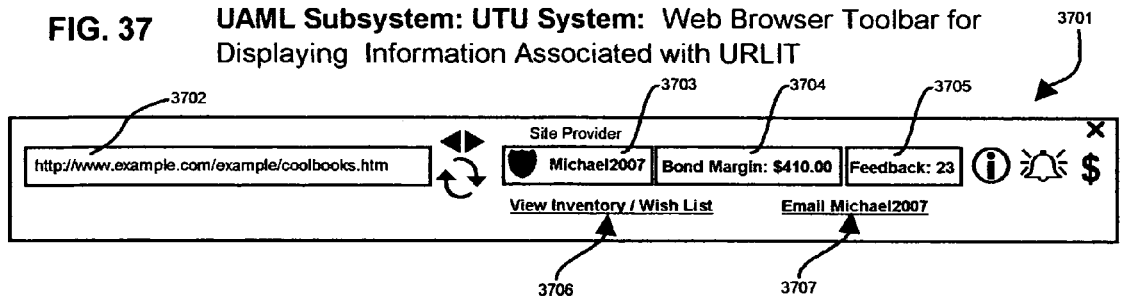
FIG. 37 UAML Subsystem: UTU System: Web Browser Toolbar for Displaying Information Associated with URLIT
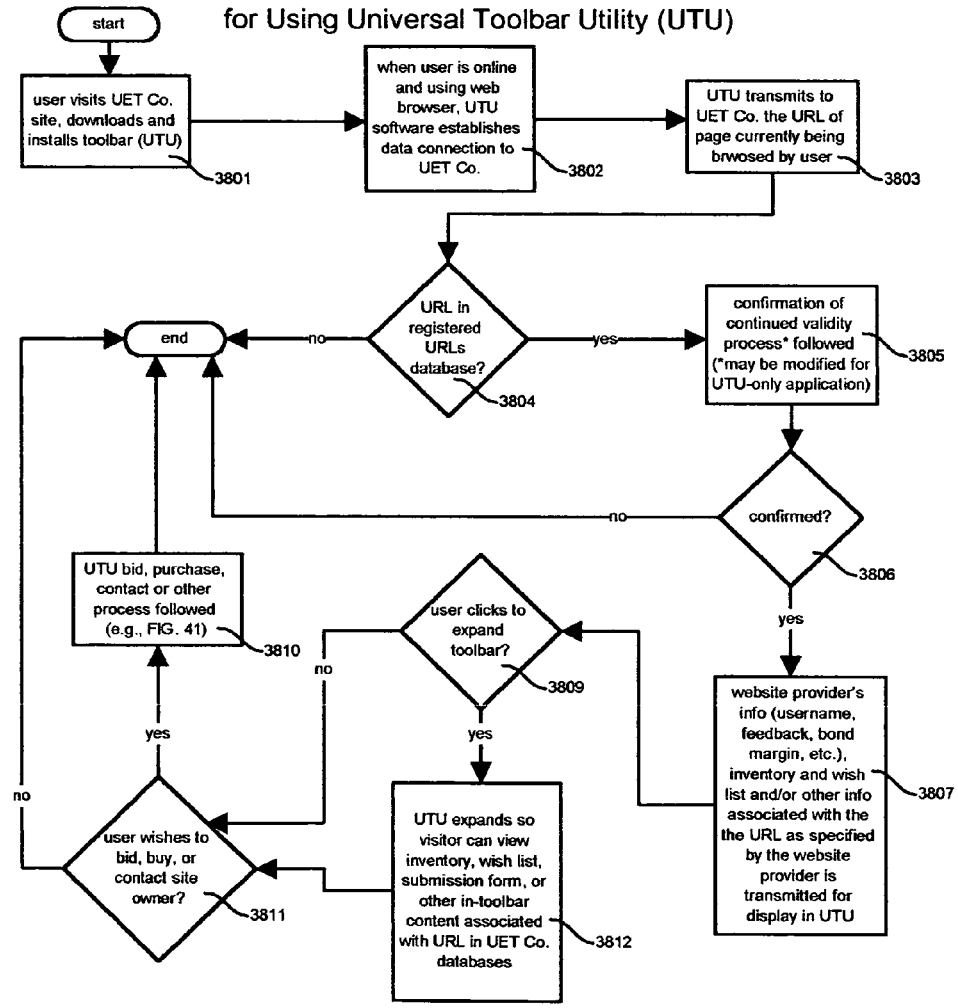
FIG. 38 UAML Subsystem: UTU System: Basic Steps for Using Universal Toolbar Utility (UTU)

FIG. 39　UAML Subsystem: UTU System: Expanded Toolbar Displaying Inventory List & Wish List Associated with URL
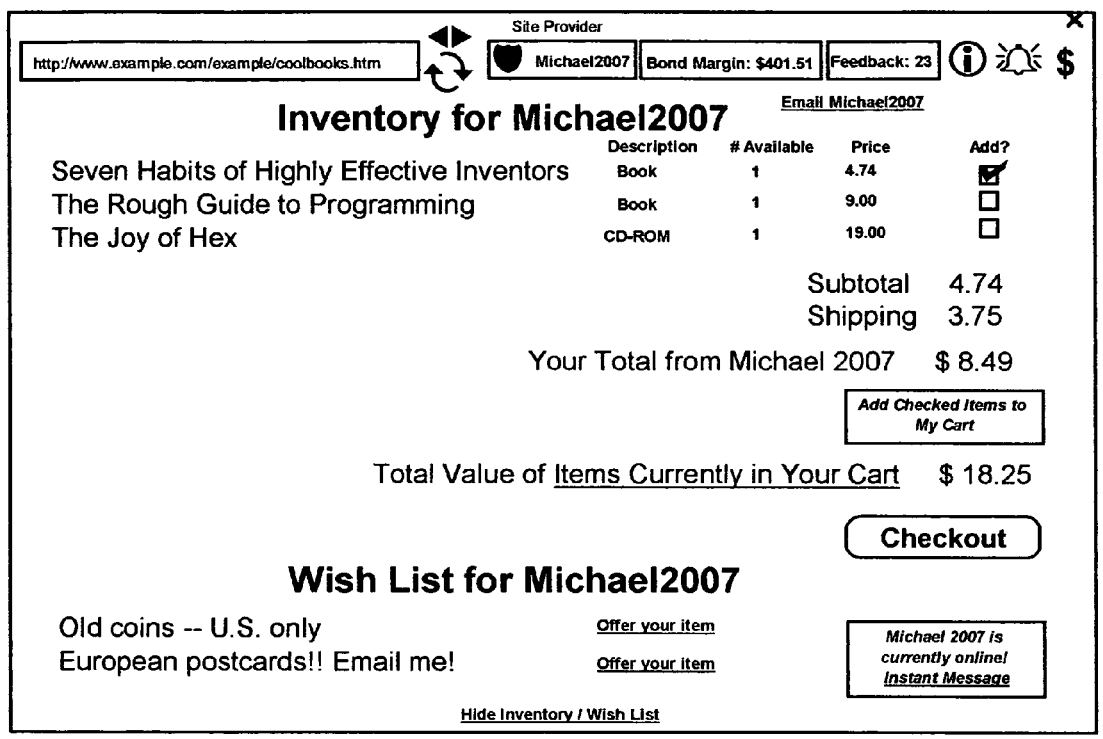

UAML Subsystem: UTU
System: Inventory/Wish List Creation Process for Use with UTU

FIG. 40B UAML Subsystem: UTU System: Sample My Inventory & Wish List Main Page
4021

You Are Logged in as: Michael2007
My Inventory & Wish Lists

| Inventory Lists | | Wish Lists | |
|---|---|---|---|
| Name of List | Creation Date | Name of List | Creation Date |
| Inv. 1 | 09/04/05 | Wish. 1 | 09/04/05 |
| Inv. 2 | 11/12/05 | Wish. 2 | 09/04/05 |
| Inv. 3 - Postcards | 11/12/05 | Wish. 3 | 09/04/05 |
| | | Wish. 4 | 10/02/05 |
| | | Wish. 5 | 11/12/05 |

Create New Inventory List          Create New Wish List

FIG. 40C UAML Subsystem: UTU: Sample Inventory List Creation & Editing Page
4031

You Are Logged in as: Michael2007
My Inventory & Wish Lists
Modify Inventory List List Name: `Inv. 1`

Created: 09/04/05
Modified: 09/04/05

( submit change )

Existing Inventory

| Item | Description | Quantity | Price | Status | Item ID |
|---|---|---|---|---|---|
| Seven Habits of Highly Effective Inventors | Book | 1 | $4.74 | * Reserved * | 98236749832761 |
| The Rough Guide to Programming | Book | 1 | $9.00 | For sale | 74307078370078 |
| Being Digital | Book | 1 | $3.00 | Sold - Ship Immediately | 09834790187087 |

Add New Inventory

Item: 
Description: 
Quantity: 
Price: $ ( submit item )

FIG. 41   UAML Subsystem: UTU System: Example Usage Scenario for UTU Shopping Cart Utility
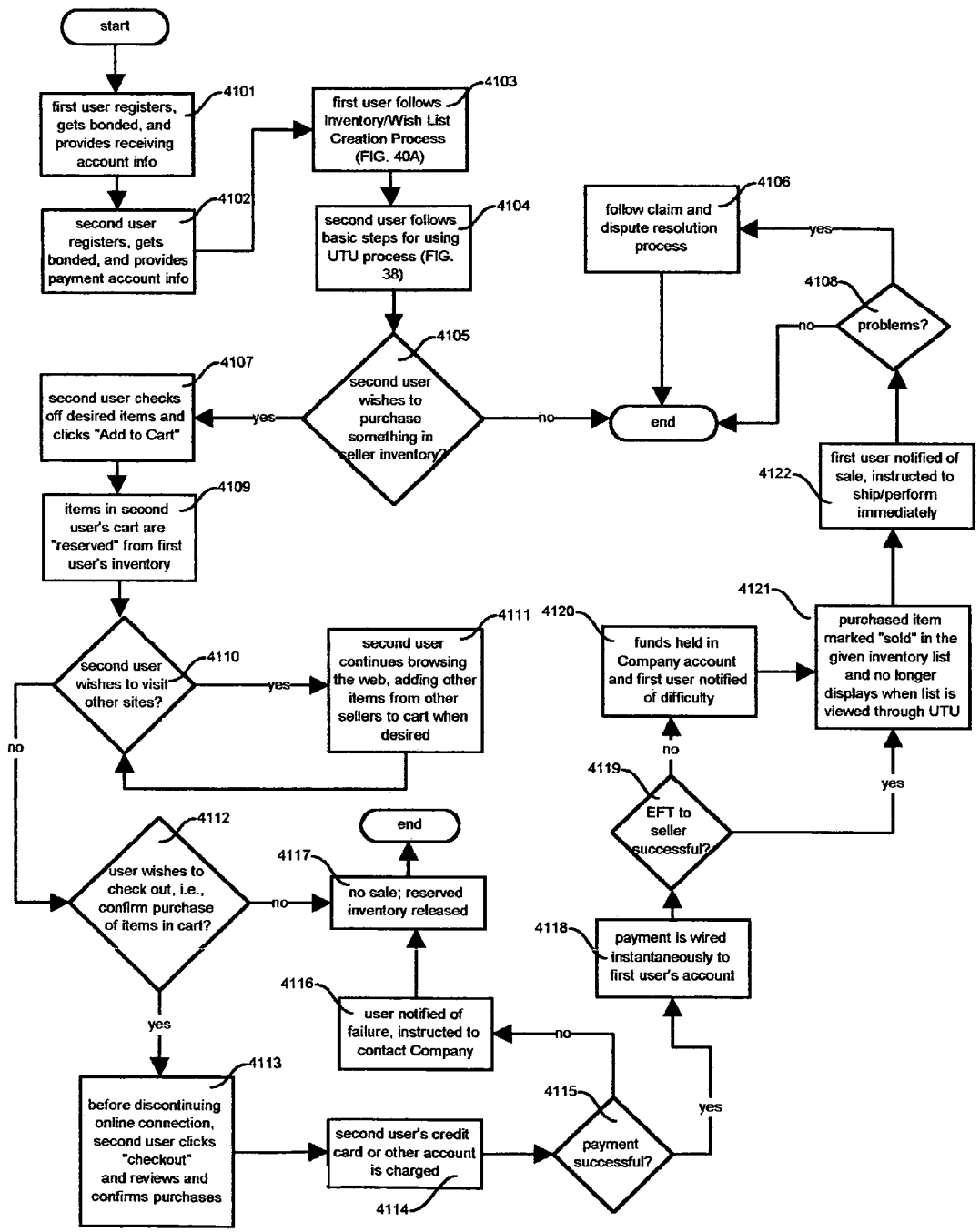

UAML Subsystem: UTU: URLIT-to-URL Relationship in UTU Application vs. UAML-Enabled Listing Application

FIG. 42A

Web Page w/ UAML-Enabled Listing: Contains Transaction-Specific or Listing-Specific Information, Requiring One-on-One Correspondence

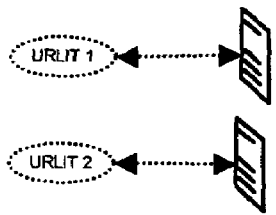

FIG. 42B

Web Page for UTU Application Only: Contains No Transaction-/Listing-Specific Information; URLIT Serves Only as Identifier for Authentication Purposes, Allowing Many-to-One Correspondence Between Pages and a Single URLIT-Stem (Full URLIT Unnecessary)

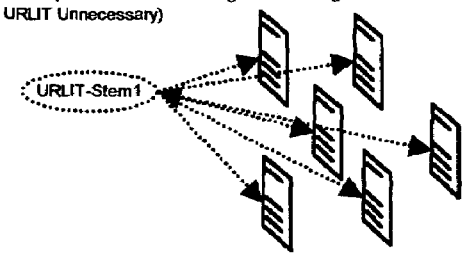

FIG. 43

UAML Subsystem: UTU: Data Relationships Overview - Toolbar and Inventory/Wish Lists

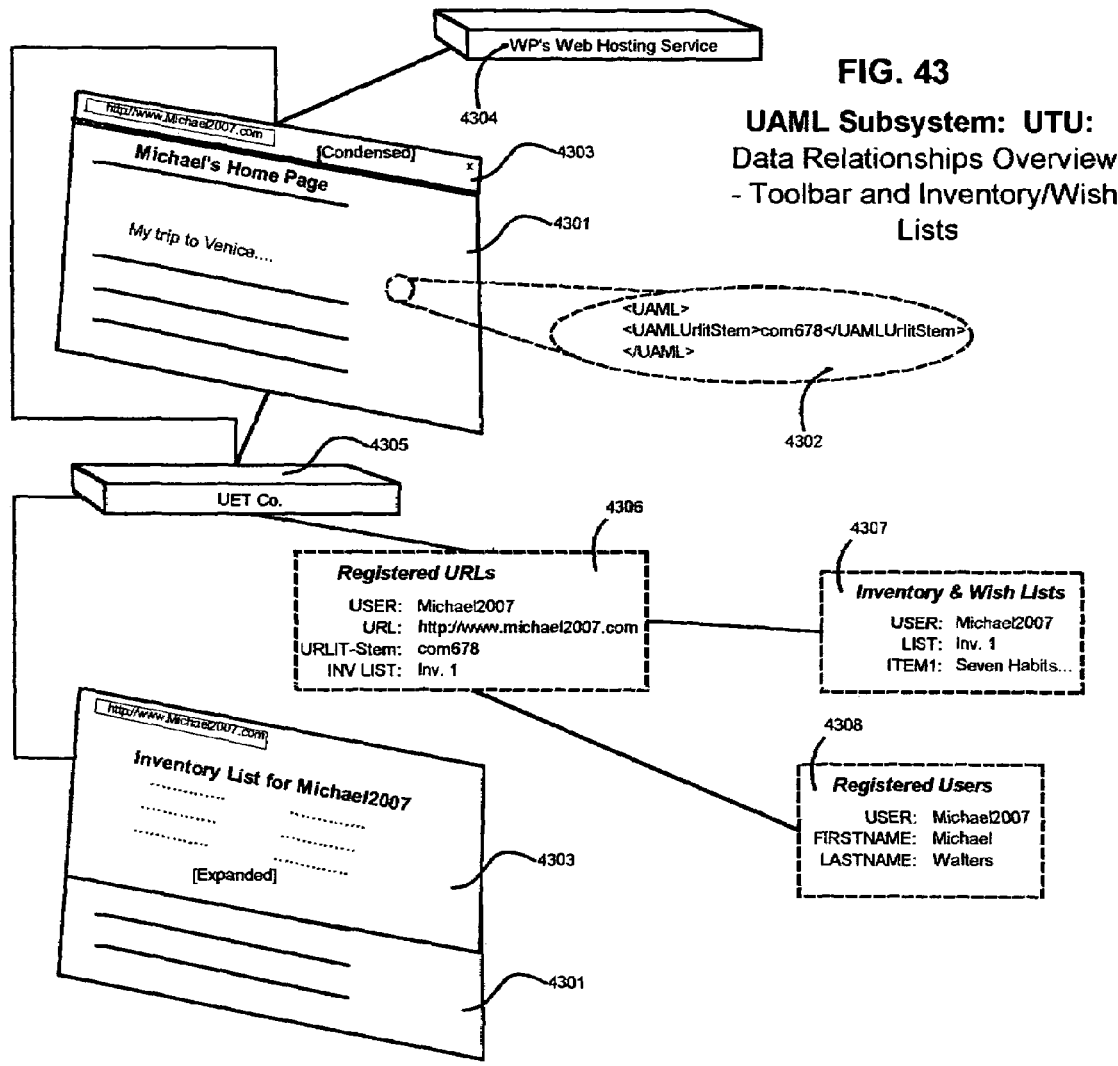

FIG. 44  UAML Subsystem: UTU: Data Relationships Overview -
Multiple Inventory Lists and Shopping Cart
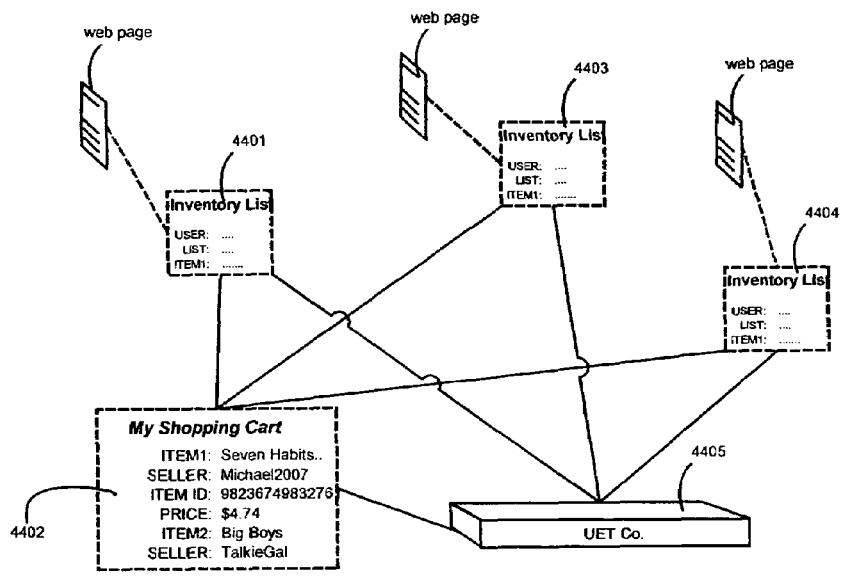
FIG. 45  UAML Subsystem: UTU: Non-Profit Donation UTU Embodiment
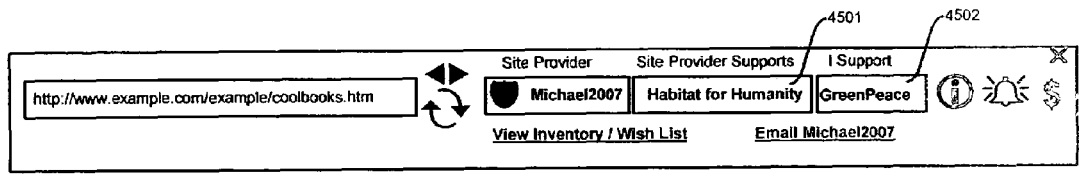
FIG. 46  UAML Subsystem: UTU: Non-Profit Donation UTU Embodiment
with Pop-Up Menu Selected
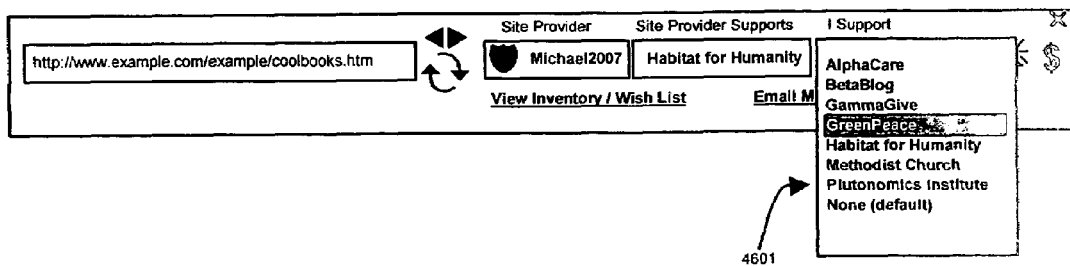

UAML Subsystem: UTU: Process for Using UTU Charity Donation Function

UAML Subsystem: UTU: Process for Eco-operative Seal of Approval Program Participation and Seal Delivery

UAML Subsystem: UTU: Example Eco-Operative Seal of Approval UTU Embodiment in Use and Displaying Seal

UAML Subsystem: UTU: Process for Creation of a Submission Form and/or Auction for Display in Toolbar FIG. 51   UAML Subsystem: UTU: Excerpt from Sample Web
          Submission form for Creation of a Submission Form for
          Display in Toolbar

Account: Michael2007

Create Your Own In-Toolbar Submission Form

| Check Box | Submit Button | Radio Button | Text Area | Text Field | Hidden Entry | Email Addr. | Pass-word | Field Name |
|---|---|---|---|---|---|---|---|---|
| ☐ | ☐ | ☐ | ☐ | ☐ | ☐ | ☒ | ☐ | Email Address |
| ☐ | ☐ | ☐ | ☐ | ☒ | ☐ | ☐ | ☐ | Your Name |
| ☐ | ☒ | ☐ | ☐ | ☐ | ☐ | ☐ | ☐ | Submit |

[etc.]

FIG. 52   UAML Subsystem: UTU: Excerpt from Sample Web
          Submission form for Creation of an Auction for Display in
          Toolbar

Account: Michael2007

Create Your Own In-Toolbar Auction

Auction Title [               ]

Duration   ☐ 3 Days   ☐ 5 Days   ☐ 7 Days

Enter the Opening Bid Amount [     ]

[etc.]

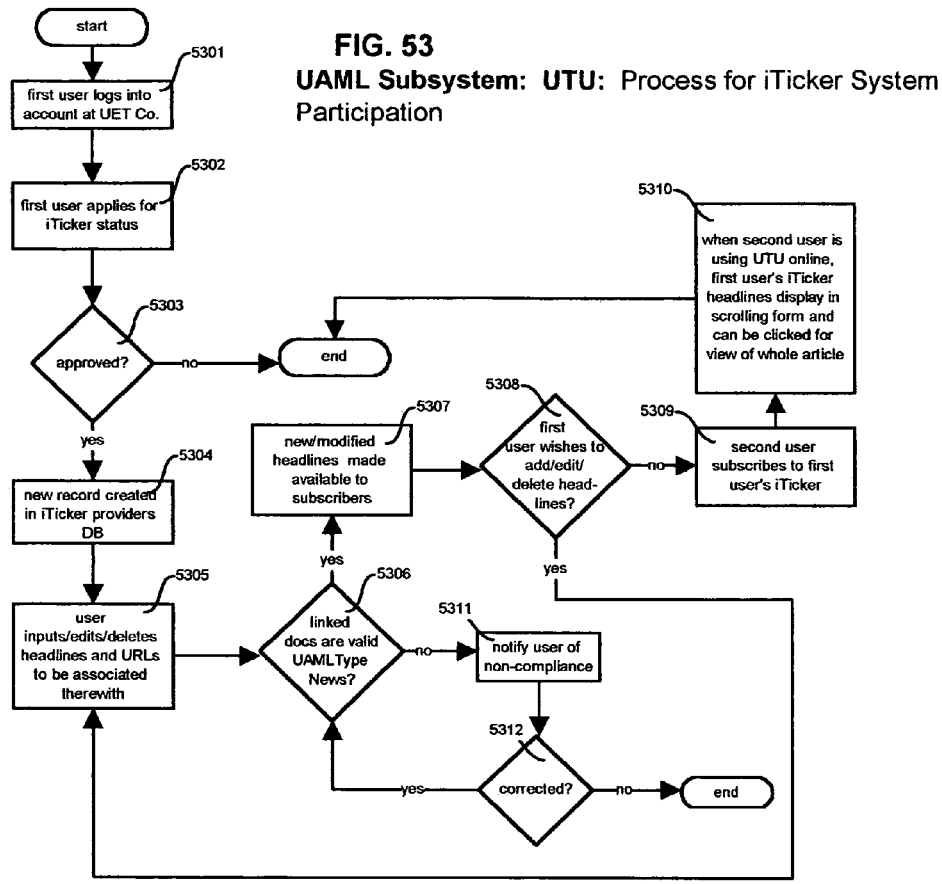
FIG. 53 UAML Subsystem: UTU: Process for iTicker System Participation
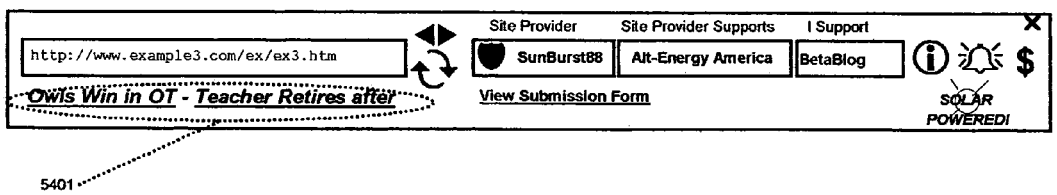
FIG. 54 UAML Subsystem: UTU: Example iTicker UTU Embodiment in Use and Displaying iTicker Headlines FIG. 55   UAML Subsystem: Example Common Tags

- UAML
- UAMLType
- UAMLUrlit
- UAMLHostPhrase
- UAMLListerPhrase

FIG. 56   UAML Subsystem: Subject-Specific Tag Nomenclature Template (for this disclosure)

<[Language][Database][Field]>Data</[Language][Database][Field]>

FIG. 57A  UAML Subsystem: Example Subject-Specific Tag Vocabulary/Fields for Database Record: Collectible Coin Listings

- UAMLCoinYear
- UAMLCoinDenomination (data: penny, etc.)
- UAMLCoinCountryOrigin (data: US, etc.)
- UAMLCoinCondition(data: MS-60, Proof, etc.)
- UAMLCoinPrecMetalType(data: gold, etc.)
- UAMLCoinWeight
- UAMLCoinPrecMetalPercent (data: 73, etc.)
- UAMLCoinIrreg (data: double-die, etc.)
- UAMLCoinPrice
- UAMLCoinAppraisalValue
- UAMLCoinLocation

FIG. 57B    UAML Subsystem: Example Subject-Specific Tag Vocabulary/Fields for Database Record: Car Listings

- UAMLCarYear
- UAMLCarMake
- UAMLCarModel
- UAMLCarMpg
- UAMLCarIntColor
- UAMLCarExtColor
- UAMLCarNumDoors
- UAMLCarPowerWin
- UAMLCarPowerLock
- UAMLCarSoundSys
- UAMLCarFourWDrive
- UAMLCarFrontWDrive
- UAMLCarHorsePwr
- UAMLCarFuel (data: gas, diesel, hybrid)
- UAMLCarIntCubicFt
- UAMLCarTowCap
- UAMLCarMileage
- UAMLCarNumOwners
- UAMLCarBluebook
- UAMLCarLocation
- UAMLCarVIN
[etc.]

FIG. 57C    UAML Subsystem: Example Subject-Specific Tag Vocabulary/Fields for Database Record: Real Estate Listings

- UAMLRELotSqFt
- UAMLREBldgSqFt
- UAMLREZoning
- UAMLREYrBuilt
- UAMLRENumBeds
- UAMLRENumBaths
- UAMLREPrice
- UAMLREPropType (data: condo, SFR, etc.)
- UAMLREPool
- UAMLREMLSNum
- UAMLREContactName
- UAMLREContactNum
- UAMLREContactEmail
[etc.]

FIG. 57D    UAML Subsystem: Example Subject-Specific Tag Vocabulary/Fields for Database Record: Job Listings

- UAMLJobTitle
- UAMLJobStatus (data: W-2, 1099)
- UAMLJobPayWeek
- UAMLJobHrsWeek
- UAMLJobLocation
- UAMLJobYrsExpReq
- UAMLJobDegreeReq
- UAMLJobTelecommute
- UAMLJobIndustry
- UAMLJobField
- UAMLJobRole
- UAMLJobHealthIns
- UAMLJobDentalIns
- UAMLJobTravelPct
- UAMLJobRetirePlan
- UAMLJobEmployer
- UAMLJobContactName
- UAMLJobContactNum
- UAMLJobContactEmail
[etc.]

FIG. 57E UAML Subsystem: Example Subject-Specific Tag Vocabulary/Fields for Database Record: Personal Ads
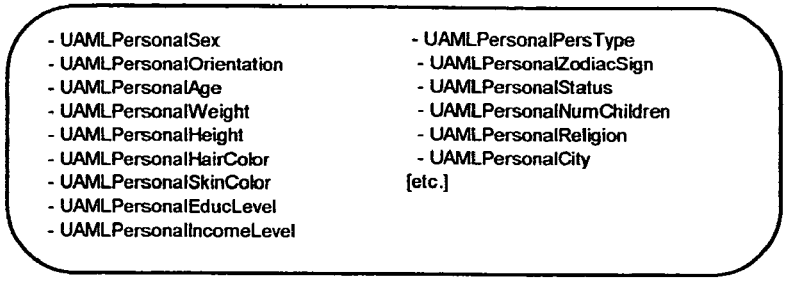
FIG. 57F UAML Subsystem: Example Subject-Specific Tag Vocabulary/Fields for Database Record: ISBN (Book) Listings
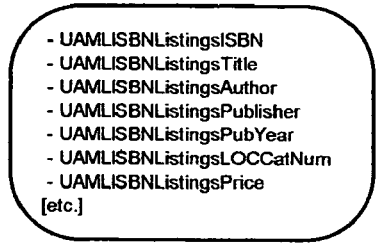
FIG. 57G UAML Subsystem: Example Subject-Specific Tag Vocabulary/Fields for Database Record: UPC or EPC (Any Product By UPC or EPC)
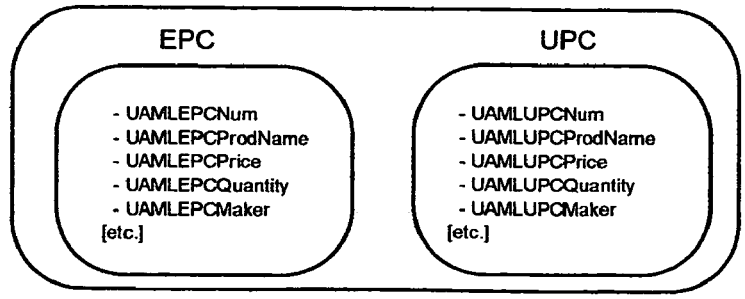

FIG. 57H  UAML Subsystem: Example Subject-Specific Tag Vocabulary/Fields for Database Record: Lending Institution, with Tag for Dynamic Look-Up Field
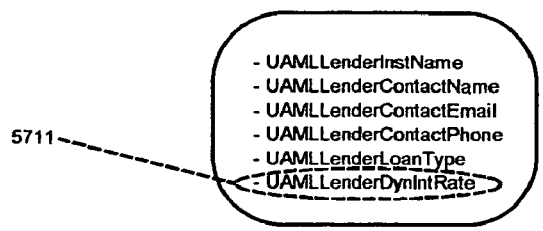
FIG. 58  UAML Subsystem: Process for Usage with Dynamically Generated Pages
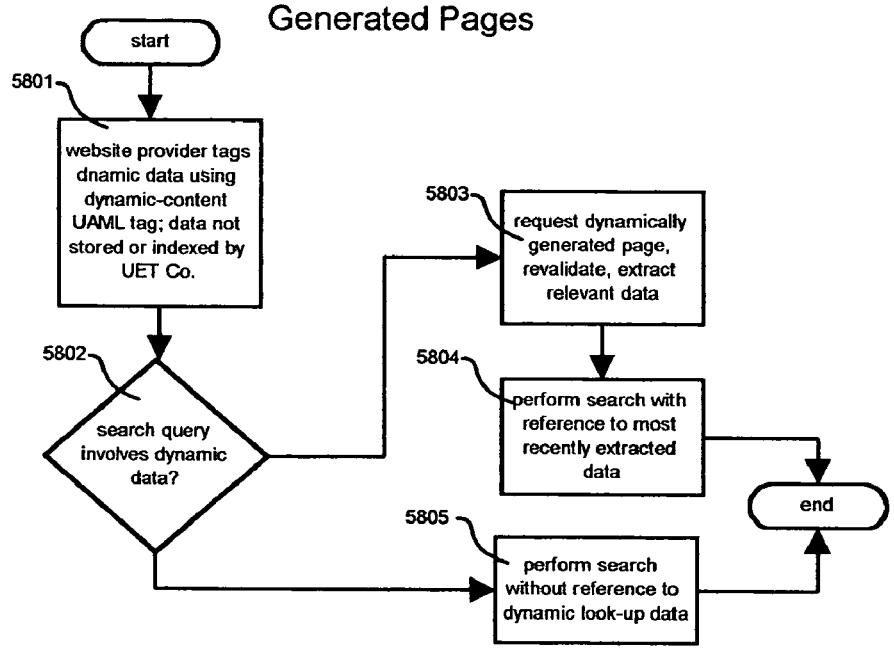

UAML Subsystem:
Automatic Data Capture
Integration Process

UAML Subsystem:
Telephone
Integration Process

UAML Subsystem: Email
Integration Process

FIG. 59D  UAML Subsystem: Email Integration
Cont'd: Example of EQML-Enabled Search
Engine Query via Email
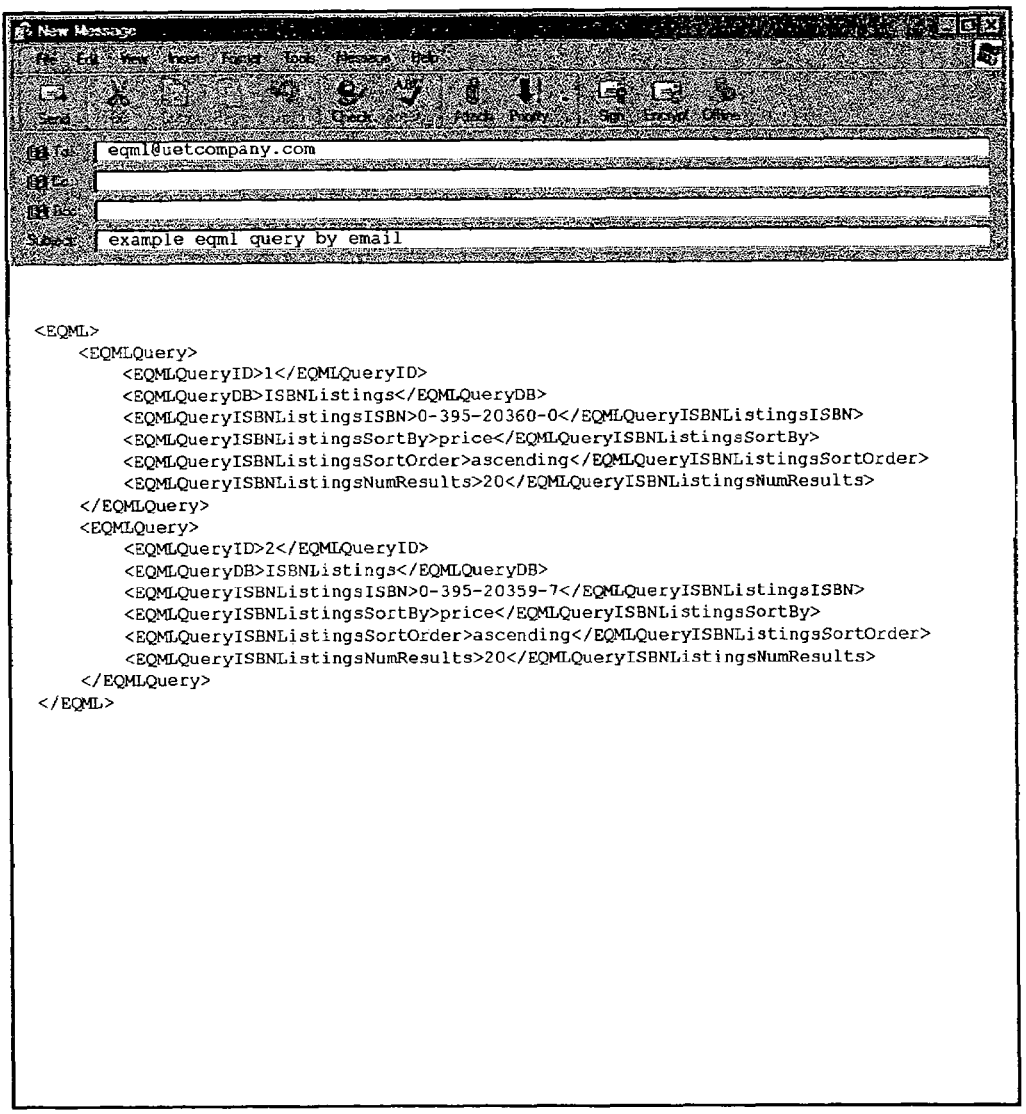

FIG. 59E  UAML Subsystem: Email Integration Cont'd:
Example of EQML Query Results
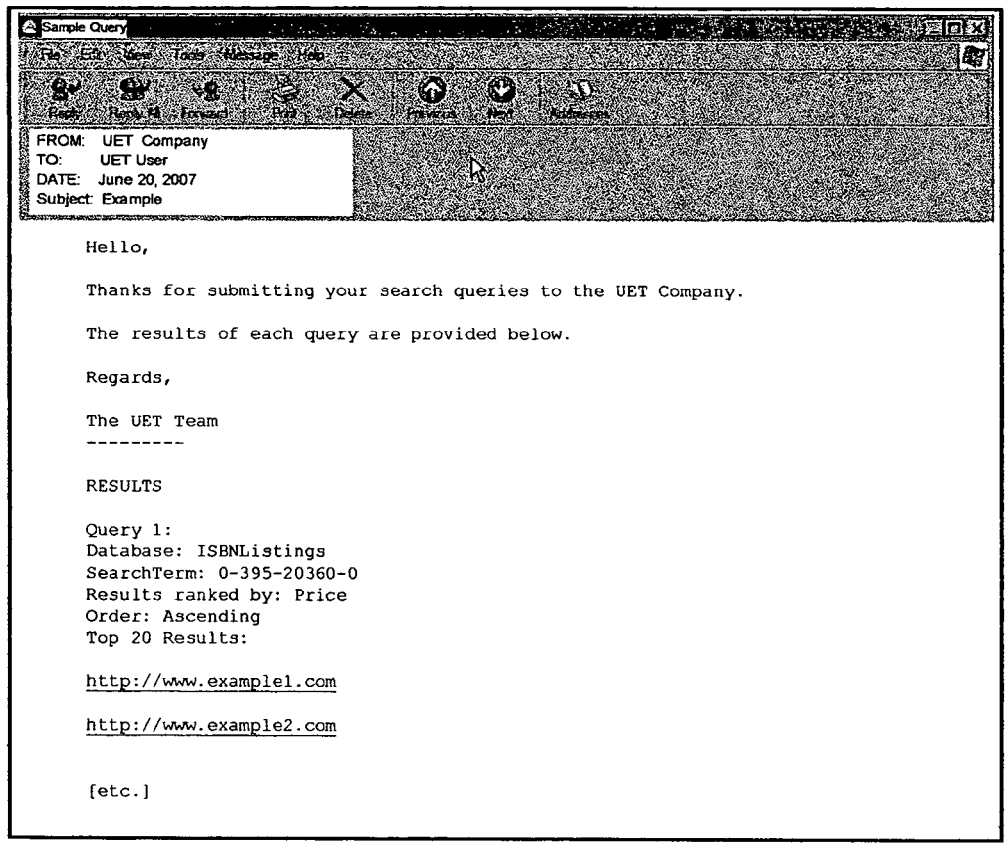

FIG. 60  USE Subsystem: Userithm Search Engine ("USE") Process Overview
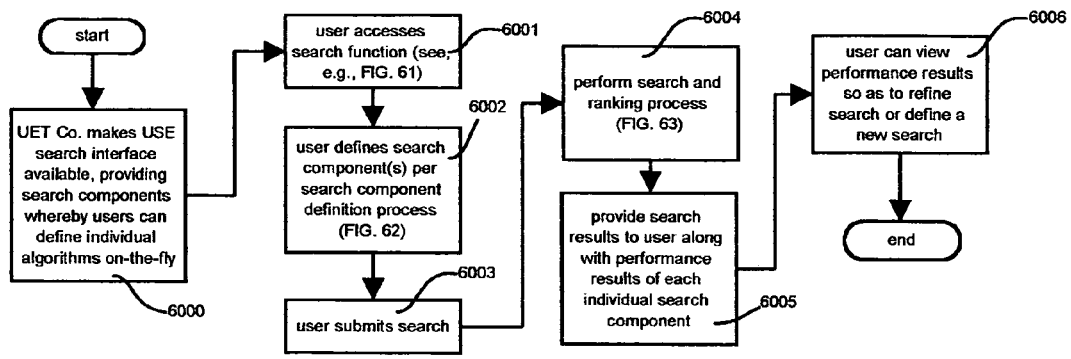
FIG. 61  USE Subsystem: Template for Primary (i.e., Simple Search Component) USE Search Submission Form with Three Simple Search Components (A, B & C)
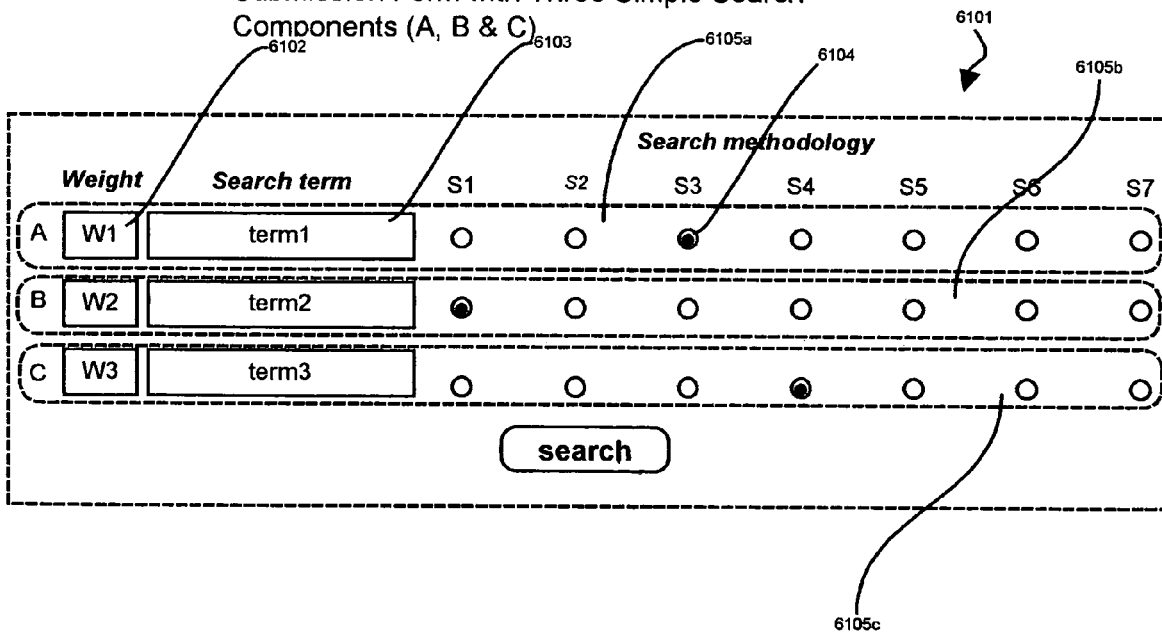

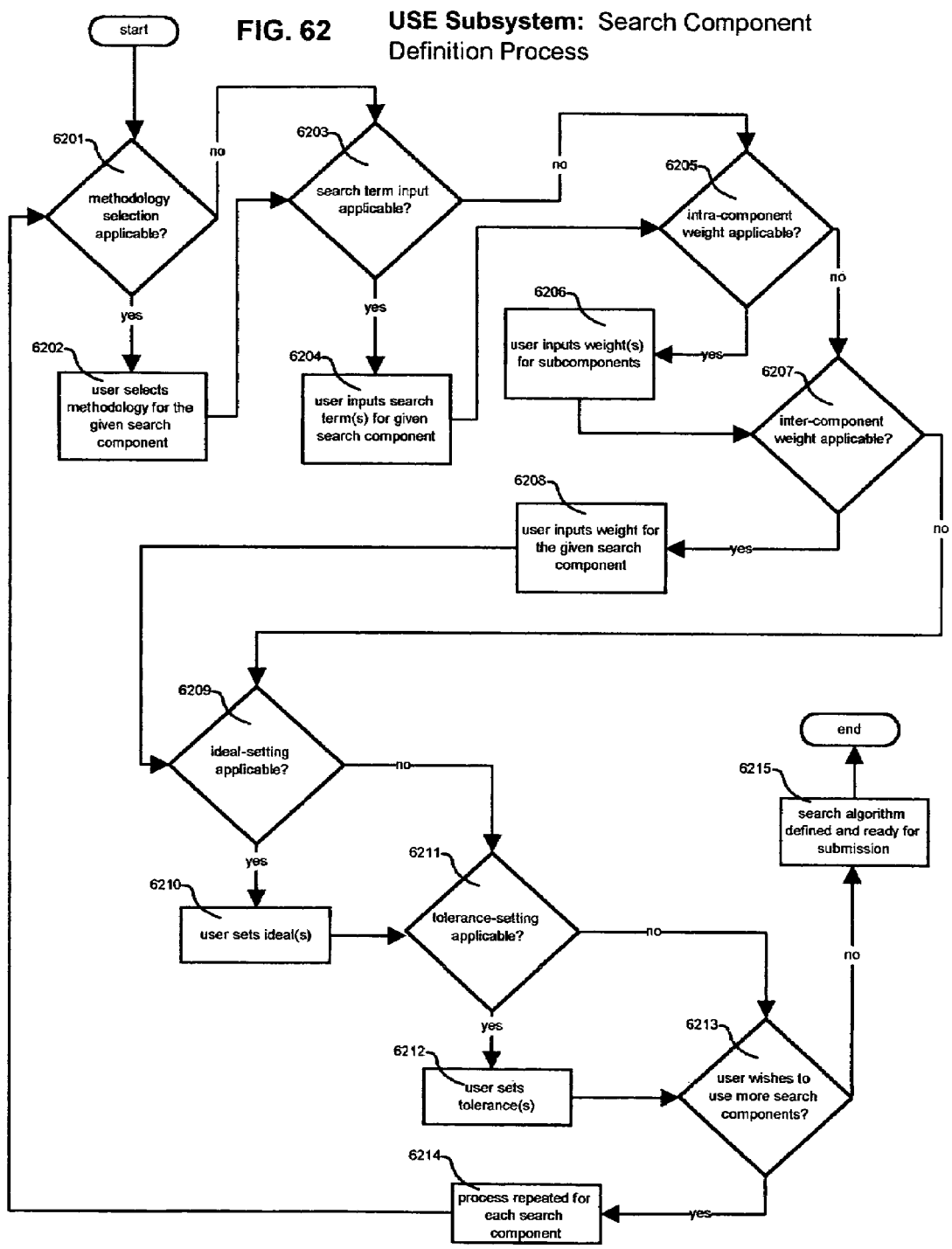
FIG. 62 USE Subsystem: Search Component Definition Process

FIG. 63   USE Subsystem: Search and Ranking Process
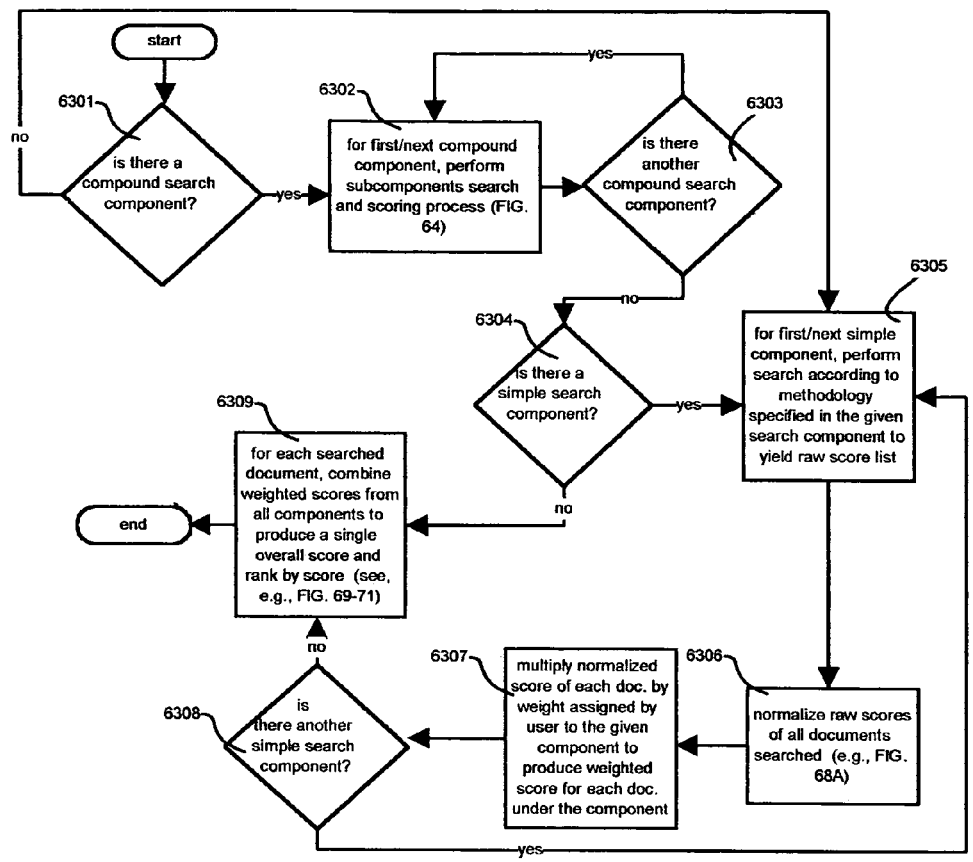
FIG. 64   USE Subsystem: Subcomponents Search and Scoring Process for a Compound Search Component
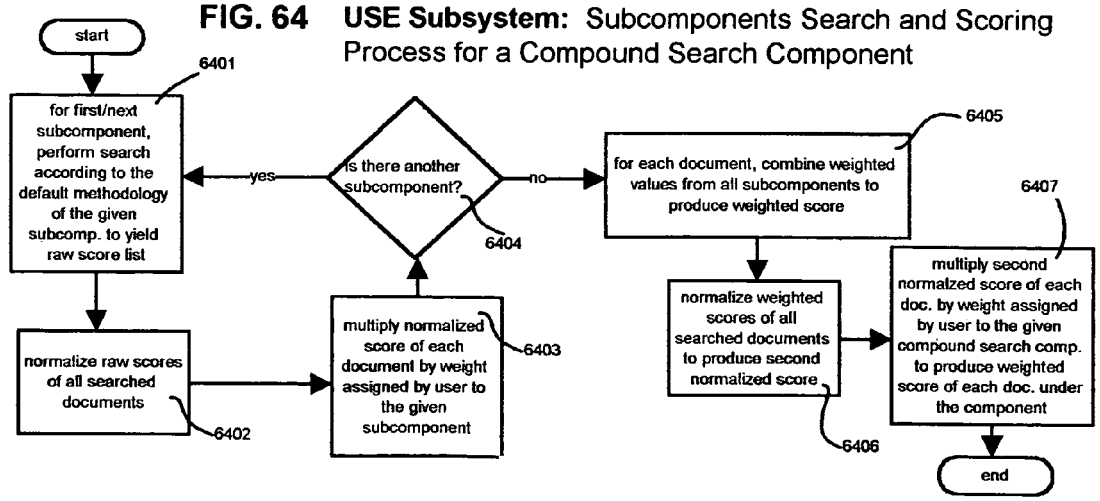

FIG. 65   USE Subsystem: Example Simple Component USE Search Submission Page

| Weight | Search term | Search methodology | | | | | | |
|---|---|---|---|---|---|---|---|---|
| | | links to | links from | pay-for-placement | freshness | title or URL | popularity | Lexivote |
| 50 | guitar | ○ | ○ | ● | ○ | ○ | ○ | ○ |
| 10 | guitar | ● | ○ | ○ | ○ | ○ | ○ | ○ |
| 10 | instruction | ○ | ○ | ○ | ● | ○ | ○ | ○ |

( search )

FIG. 66   USE Subsystem: Example Simple Component USE Search Submission Page with Methodology Already Defined

| Weight | Search string |
|---|---|
| 50 | bears BUTNOT chicago |
| 10 | grizzly OR kodiac |
| | |

( search )

FIG. 67   USE Subsystem: Example Options for Search Methodology Menu

*Links to*
Items ranked according to number of pages containing the search term that link to the given page (see, e.g., US Patent 6285999 to Page)
*Links from*
Items ranked according to number of pages containing the search term to which the given page links
*Meaning*
Items ranked with reference to meaning gleaned from words appearing in page related to the meaning of the search term (synonyms, etc.) (see, e.g., www.appliedsemantics.com)
*Title/Name/URL*
Items ranked according to density of search term itself in title, file name, and/or URL
*Density*
Items ranked according to density of search term in the given page
*Popularity*
Items ranked according to usage by previous users (see, e.g., US Patent 6539377 to Cullis)
*Hits*
Items ranked by a hit counter on the page that contains the search term
*Freshness*
Items ranked according to the time the document was most recently updated
*My visits*
Items ranked according to number of pages that the user has visited that link to the given page (with reference to visited URL's history)
*Amount bid*
Items ranked by bid of the site owner to pay for search ranking (see, e.g., US Patent 6269361 to Davis et al.)
*Lexivote*
Per the present disclosure, FIG. 93 et seq.

FIG. 68A   USE Subsystem: Basic Normalization Process start → divide raw score of each document by raw score of highest-scoring document (6401) → multiply normalized raw score of each document by 100 (6402) → end FIG. 68B   USE Subsystem: Score Equation $$r_1(A) = w_1(r_2(A)) + \ldots + w_{n-1}(r_n(A))$$

FIG. 69 USE Subsystem: EXAMPLE:
First search component, assuming user-assigned weight of "50"

| | Normalized Score (scale of 1-100, as as an integer) | Weighted Score |
|---|---|---|
| Page P1 | 100 | 5000 |
| Page P2 | 79 | 3950 |
| Page P3 | 65 | 3250 |
| Page P4 | 55 | 2750 |
| Page P5 | 51 | 2550 |
| Page P6 | 45 | 2250 |
| Page P7 | 33 | 1650 |
| Page P8 | 22 | 1100 |
| Page P9 | 20 | 1000 |
| Page P10 | 11 | 550 |

FIG. 70

USE Subsystem: EXAMPLE:
Second search component, assuming user-assigned weight of "10"

| | Normalized Score | Weighted Score |
|---|---|---|
| Page P3 | 100 | 1000 |
| Page P6 | 87 | 870 |
| Page P11 | 65 | 650 |
| Page P4 | 55 | 550 |
| Page P1 | 51 | 510 |
| Page P5 | 33 | 330 |
| Page P2 | 22 | 220 |
| Page P8 | 22 | 220 |
| Page P7 | 21 | 210 |
| Page P10 | 19 | 190 |

FIG. 71

USE Subsystem: EXAMPLE:
Overall scores and ranking according to sum of weighted values of first and second search components

| Rank in Descending Order | Final Overall Score |
|---|---|
| Page P1 | 5510 |
| Page P3 | 4250 |
| Page P2 | 4170 |
| Page P4 | 3300 |
| Page P6 | 3120 |
| Page P5 | 2880 |
| Page P7 | 1860 |
| Page P8 | 1320 |
| Page P9 | 1000 |
| Page P10 | 740 |

FIG. 72  USE Subsystem: Conceptual Rendering of or Template for Results Page with Search Component Gauge

|  | Rank per each search component | | |
| --- | --- | --- | --- |
| Site URL | A | B | C |
| http://result 1 | Rank A1 | Rank B1 | Rank C1 |
| http://result 2 | Rank A2 | Rank B2 | Rank C2 |
| http://result 3 | Rank A3 | Rank B3 | Rank C3 |
| http://result 4 | Rank A4 | Rank B4 | Rank C4 |
| http://result 5 | Rank A5 | Rank B5 | Rank C5 |
| http://result 6 | Rank A6 | Rank B6 | Rank C6 |
| http://result 7 | Rank A7 | Rank B7 | Rank C7 |
| http://result 8 | Rank A8 | Rank B8 | Rank C8 |
| http://result 9 | Rank A9 | Rank B9 | Rank C9 |

FIG. 73  USE Subsystem: Example Web Search Results Page with Search Component Gauge

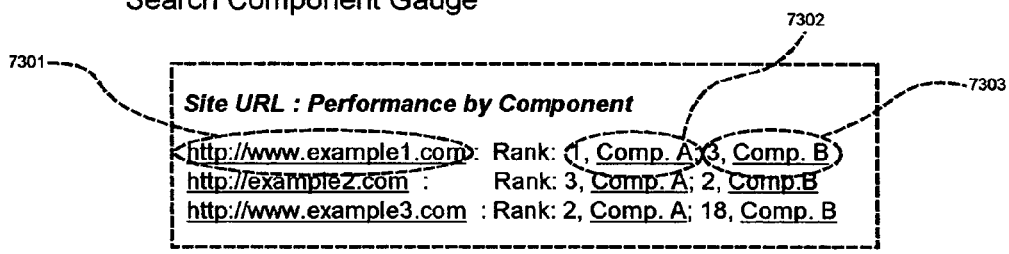

FIG. 74  USE Subsystem: Example Auction Search Results page with Search Component Gauge

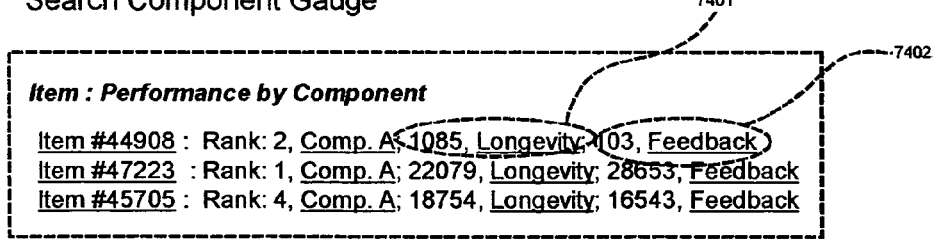

FIG. 75 USE Subsystem: Example Advanced USE (Level 1): Simple Components + Compound Component (Example: Auction Search)
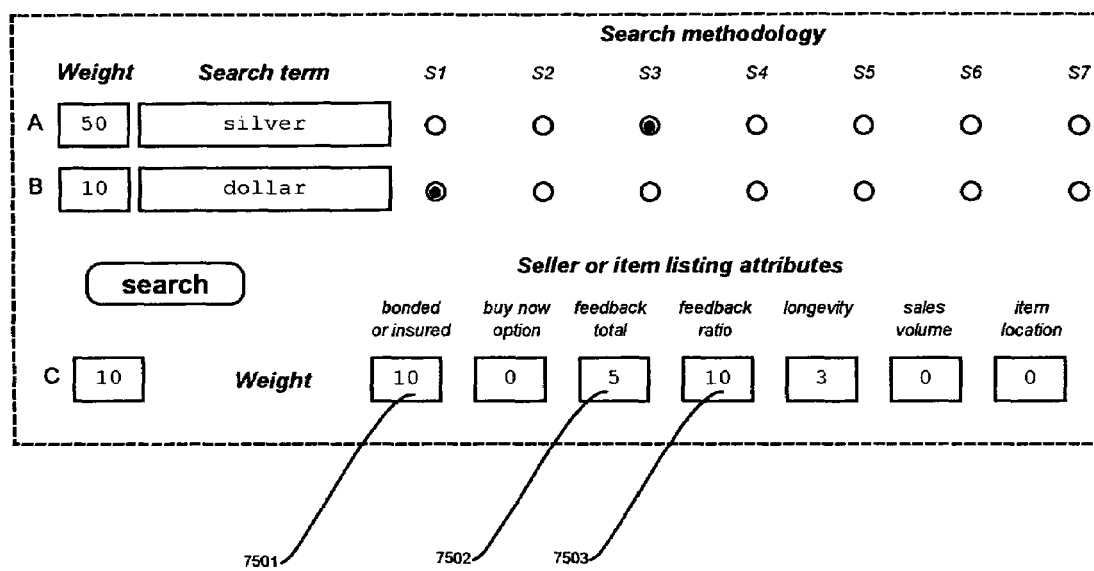

FIG. 76  USE Subsystem: Advanced USE (Level 1): Alternative Application (Example: Stock Search (Simple Components not pictured))

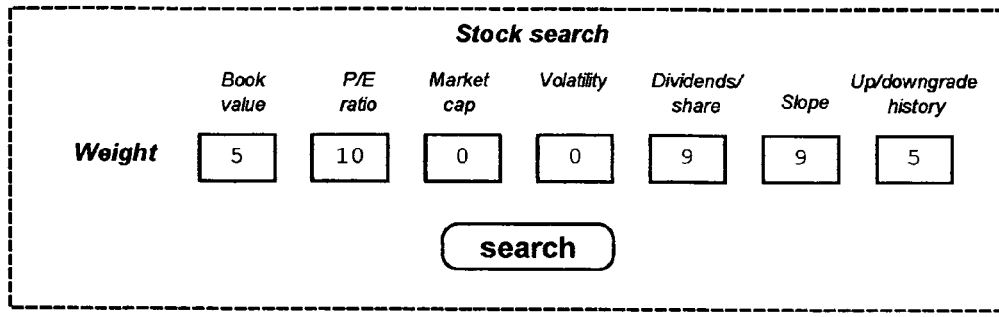

FIG. 77
USE Subsystem: Advanced USE (Level 1): Alternative Application (Example: Bond Search(Simple Comps. not pictured))

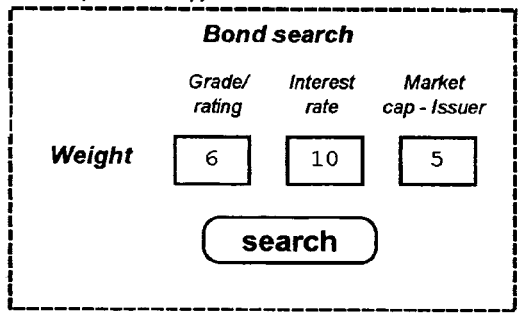

FIG. 78
USE Subsystem: Advanced USE (Level 1): Alternative Application (Example: Mutual Fund Search(Simple Comps. not pictured))

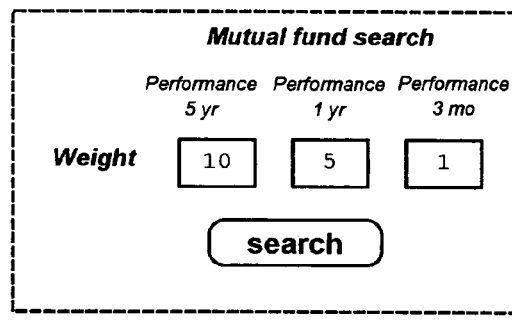

FIG. 79  USE Subsystem: Advanced USE (Level 1): Alternative Application (Example: Mutual Fund Search (Simple Comps. not pictured))

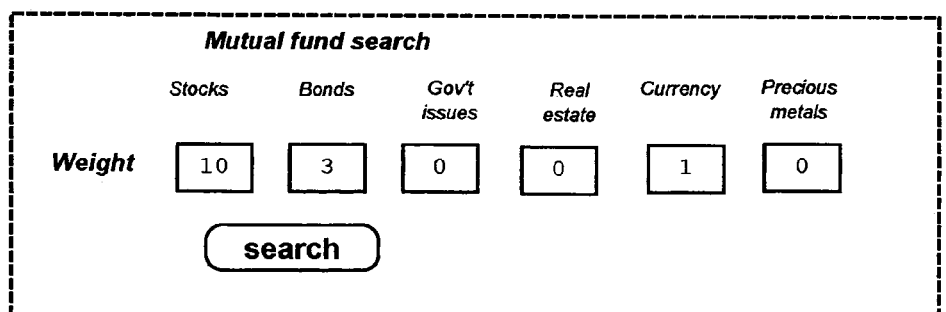

FIG. 80  USE Subsystem: Advanced Level 2: Simple Components (not pictured) + Compound Component with User-Assigned Intracomponent Weights and User-Defined "Ideal" or "Standard" (Example: Real Estate Search)

*Real estate search*

|  | Baths | Bedrooms | Acreage | Sq. Ft. | Price (thousands) |
|---|---|---|---|---|---|
| *Ideal* | 3 | 3 | 1 |  | $300 |
| *Weight* (10=Mandatory 0-9=Strength of Preference) | 10 | 10 | 5 |  | 3 |

FIG. 81  USE Subsystem: Advanced Level 2 USE: Alternative Application (Example: Job Search)

*Job search*

|  | City | Position | Hours/wk | Start date | Salary (thousands) |
|---|---|---|---|---|---|
| *Ideal* | Rome |  | 40 |  | $150 |
| *Weight* | 10 |  | 5 |  | 10 |

FIG. 82  USE Subsystem: Advanced Level 2 USE: Alternative Application (Example: Car Search)

*Car search*

|  | Year | Price (thousands) | MPG | Doors | Passengers |
|---|---|---|---|---|---|
| *Ideal* | 2004 | $5.5 | 65 | 4 | 4 |
| *Weight* | 10 | 5 | 10 | 5 | 2 |

*Send the search results to me by email:* user@example.com

FIG. 83  USE Subsystem: Advanced Level 2 USE: Simple Components (not pictured) + Compound Components Including User-Assigned Intracomponent Weights, User-Defined "Ideal" or "Standard", and User-Assigned Intercomponent Weights (Example: Personal Ads)

*Personals search*

| | | Height (ft) | Hair color | Eye color | Weight (pounds) | Age (years) |
|---|---|---|---|---|---|---|
| Weight of Physical Traits | Ideal | 6.0 | brown | brown | 200 | 35 |
| 4 | Weight | 10 | 1 | 2 | 2 | 8 |

| | | Education | Religion | Profession | Myers-Briggs | Income (thousands) |
|---|---|---|---|---|---|---|
| Weight of Personal Traits | Ideal | MD | | | ESFP | $150 |
| 10 | Weight | 10 | | | 5 | 8 |

( search )

FIG. 84 USE Subsystem: Advanced Level 3 USE: Simple Components + Compound Components Including User-Assigned Intracomponent Weights, User-Defined "Ideal" or "Standard", and User-Assigned Tolerances for Variation from Ideal (Example: Articles Search)

*Article or document search or subscription*

| | Weight | Search term | S1 | S2 | S3 | S4 | S5 | S6 | S7 |
|---|---|---|---|---|---|---|---|---|---|
| A | 50 | Lincoln | ○ | ○ | ● | ○ | ○ | ○ | ○ |
| B | 25 | emancipation /5 slaves | ● | ○ | ○ | ○ | ○ | ○ | ○ |

*Article, author, publication attributes*

| | | | Language | Length (words) | Author rating (1-5) | Publication rating (1-5) | Freshness (weeks) |
|---|---|---|---|---|---|---|---|
| | | Ideal | Eng., Span. | 400 | 5 | 3 | 2 |
| | Weight | Weight | 10 | 5 | 5 | 3 | 10 |
| C | 50 | Tolerance | | +50%/-5% | 0 | + | |

( search )

FIG. 85 USE Subsystem: Advanced USE Level 2 Variation Combining Filter Component and Scoring Component (Example: Airline Flights Search)

*Travel search*

| | Airport From | Airport To | City From | City To | Airline | Date Depart | Date Return | Window | Aisle |
|---|---|---|---|---|---|---|---|---|---|
| MUST HAVE | | | SF | Nash | | 3/23 | | | |

| | Airport From | Airport To | City From | City To | Airline | Date Depart | Time Depart | Window | Aisle |
|---|---|---|---|---|---|---|---|---|---|
| PREFER TO HAVE | | | | | | | | | |
| *Ideal* | SFO | | | | United | | 11AM | Y | |
| *Weight* | 7 | | | | 4 | | 7 | 10 | |

FIG. 86 USE Subsystem: Primary USE: Single Input Field Variation

*Search string*

```
finger-picking (25, linksto) instruct! (40, lexivote) guitar (!)
```

( search )

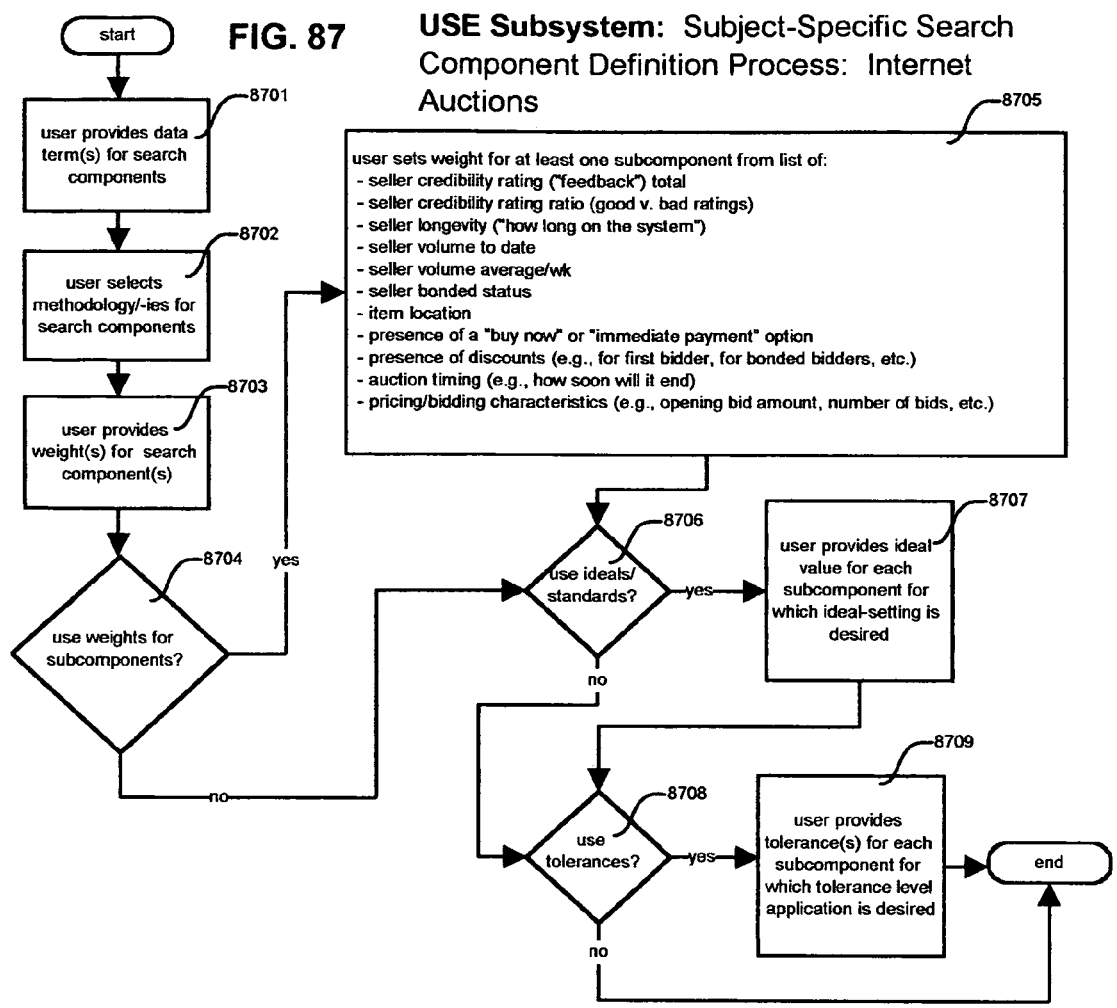
FIG. 87 USE Subsystem: Subject-Specific Search Component Definition Process: Internet Auctions FIG. 88  USE Subsystem: Email Integration:
Example of EQML-Enabled Search Engine
Query via Email
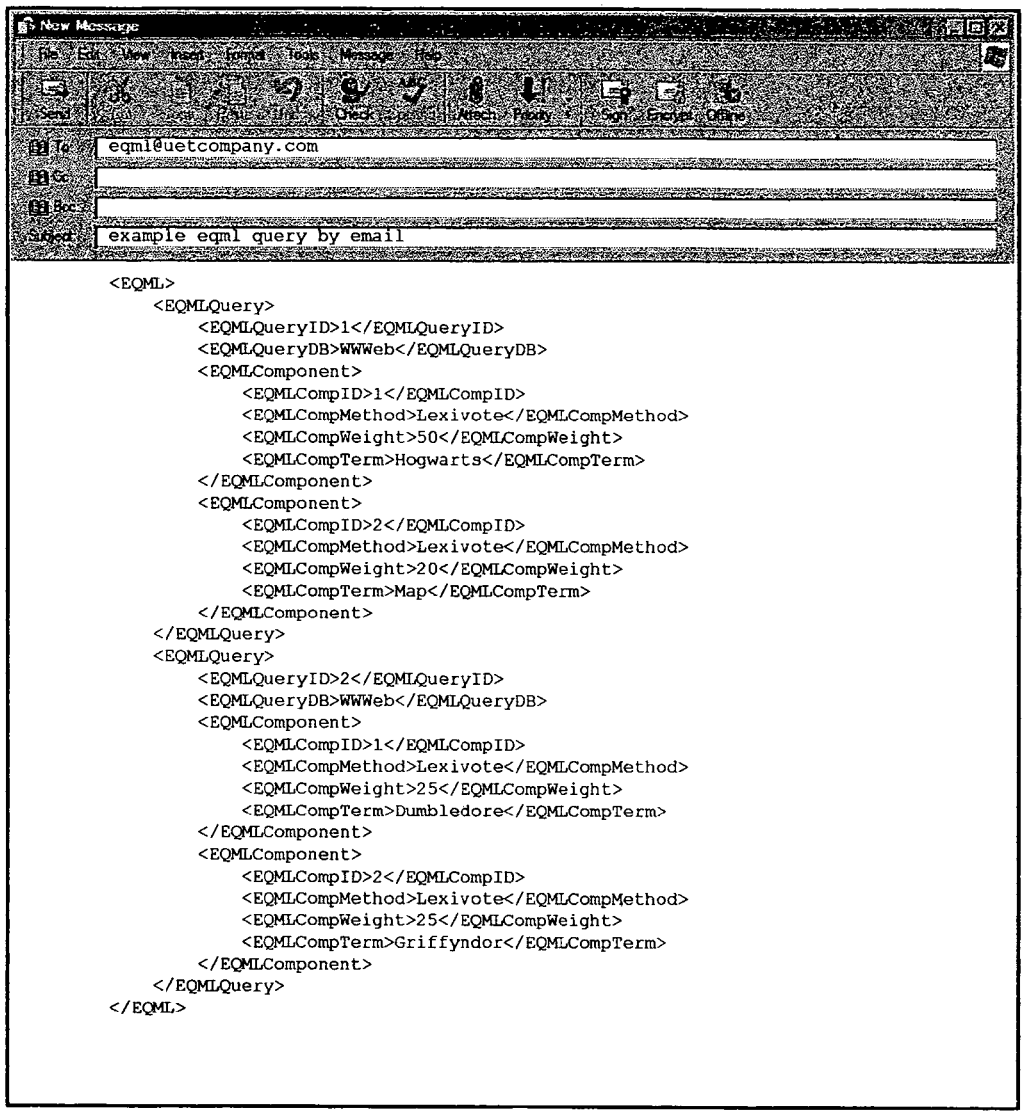

FIG. 89 USE Subsystem: Email Integration Cont'd: Example of EQML Query Results
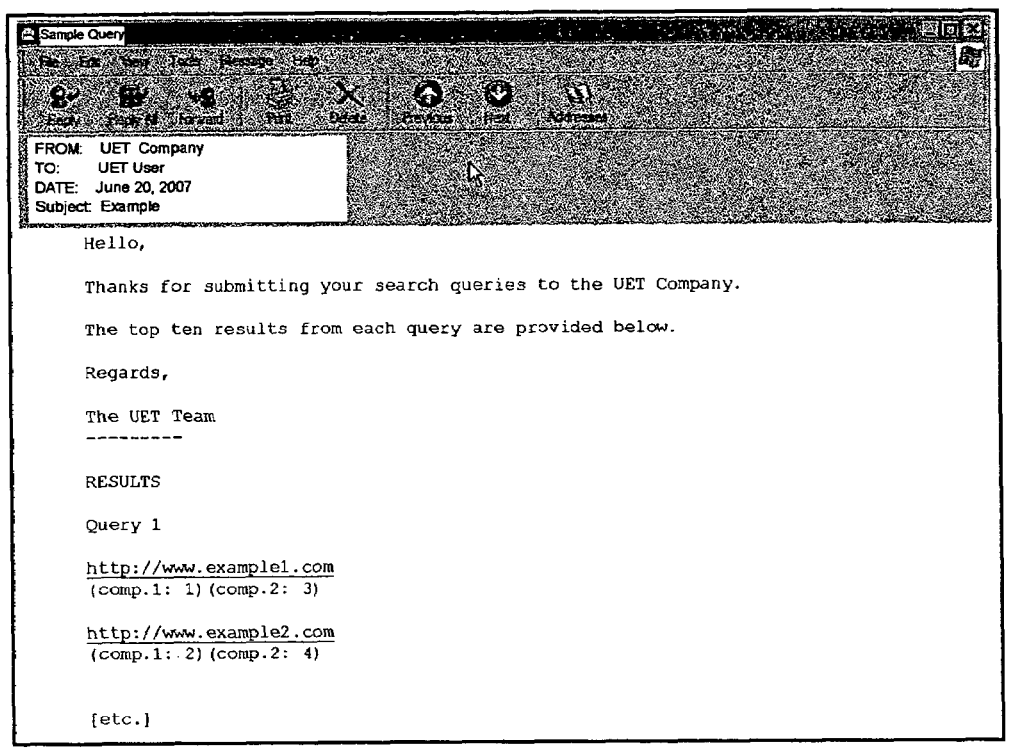

USE Subsystem: Email Integration Process

FIG. 91  USE Subsystem: Excerpt from Sample Web Submission Form for Creation of a Submission Form for Display in Toolbar

9101

Account: MyFlowers23    Build Your Own Search Engine!

Which database would you like your search engine to search?

| auct. | cars | coins | comp. | web | [etc.] |
| --- | --- | --- | --- | --- | --- |
| ☐ | ☐ | ☐ | ☐ | ☐ | ☐ ☐ ☐ ☐ ☐ |
| ☐ | ☐ | ☐ | ☐ | ☐ | ☐ ☐ ☐ ☐ ☐ |

Number of Simple Search Components   ☐

Methodology Menu Choices per Simple Search Component

| S1 | S2 | S3 | S4 | S5 | S6 |
| --- | --- | --- | --- | --- | --- |
| ☐ | ☐ | ☐ | ☐ | ☐ | ☐ |

Number of Compound Search Components   ☐

Auction-Related Methodology Options

| PS1 | PS2 | PS3 | PS4 | PS5 | PS6 |
| --- | --- | --- | --- | --- | --- |
| ☐ | ☐ | ☐ | ☐ | ☐ | ☐ |

Real Estate-Related Methodology Options

| PS7 | PS8 | PS9 | PS10 |
| --- | --- | --- | --- |
| ☐ | ☐ | ☐ | ☐ |

Stock-Related Methodology Options

| PS13 | PS14 | PS15 | PS16 | PS17 | PS18 |
| --- | --- | --- | --- | --- | --- |
| ☐ | ☐ | ☐ | ☐ | ☐ | ☐ |

Car-Related Methodology Options

| PS19 | PS20 | PS21 | PS22 |
| --- | --- | --- | --- |
| ☐ | ☐ | ☐ | ☐ |

| Allow Inter-Component Weighting? | Allow Intra-Component Weighting? | Allow user ideal-setting? | Allow user tolerance-setting? | Display search component performance gauge? |
| --- | --- | --- | --- | --- |
| ☐ | ☐ | ☐ | ☐ | ☐ |

( Submit )

USE Subsystem: Build-Your-Own Search Engine Features Selection Process

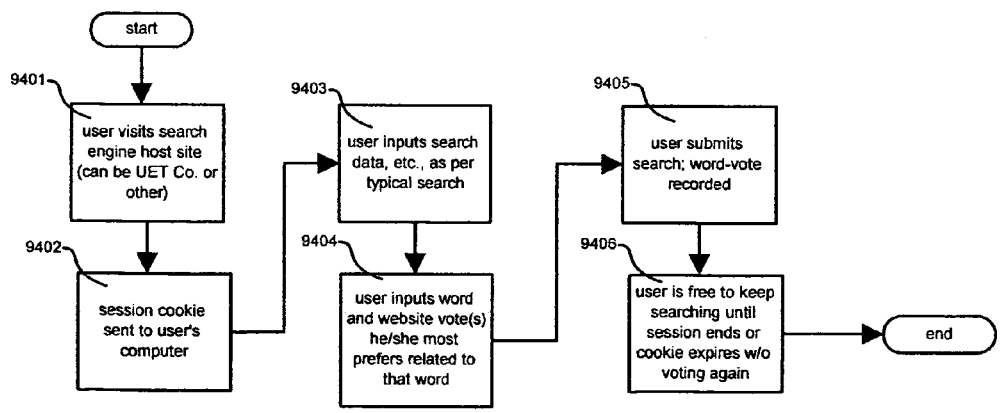

FIG. 95  USE Subsystem: Lexivote: Use Process (Account-Holding Users Embodiment - Preferred)

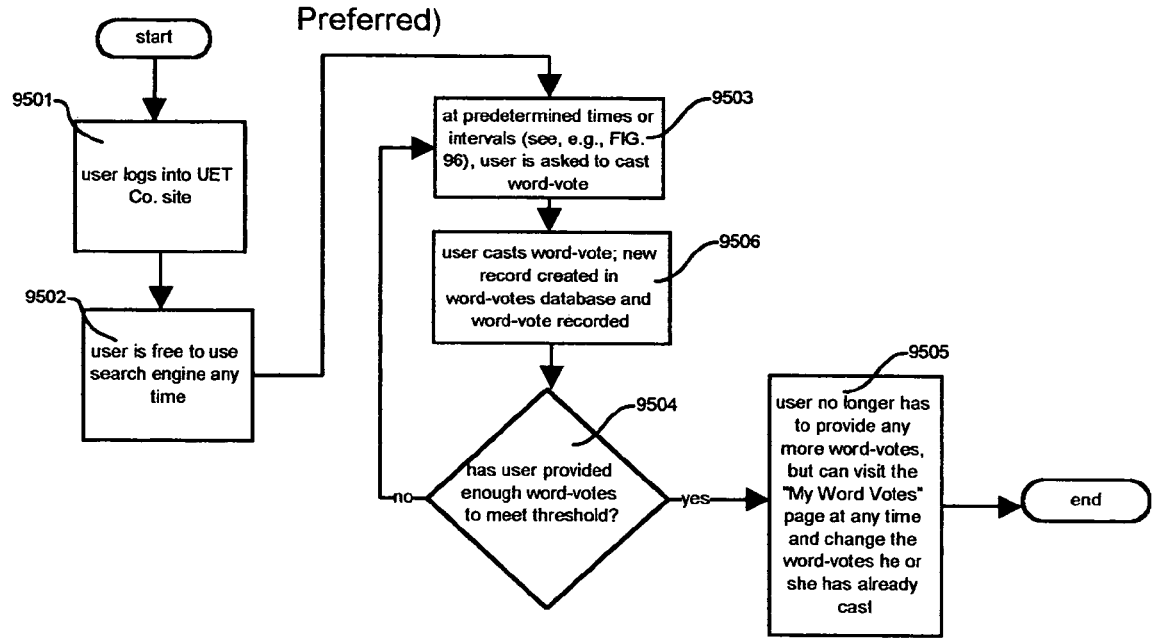

FIG. 96  USE Subsystem: Lexivote: Sample Timing Events for Request That Registered Users Cast Word-Votes 1. Require user to provide a word-vote every third time he/she logs in until threshold met
2. Require word-vote every fifth search performed until threshold met
3. Require word-vote once per month until threshold met

FIG. 97

USE Subsystem: Lexivote: Sample Word-Vote Weighting Schedule

First place vote: 5 points
Second place vote: 3 points
Third place vote: 2 points FIG. 98A  USE Subsystem: Lexivote: General Lexivote Search & Ranking Process (User Account Scenario)
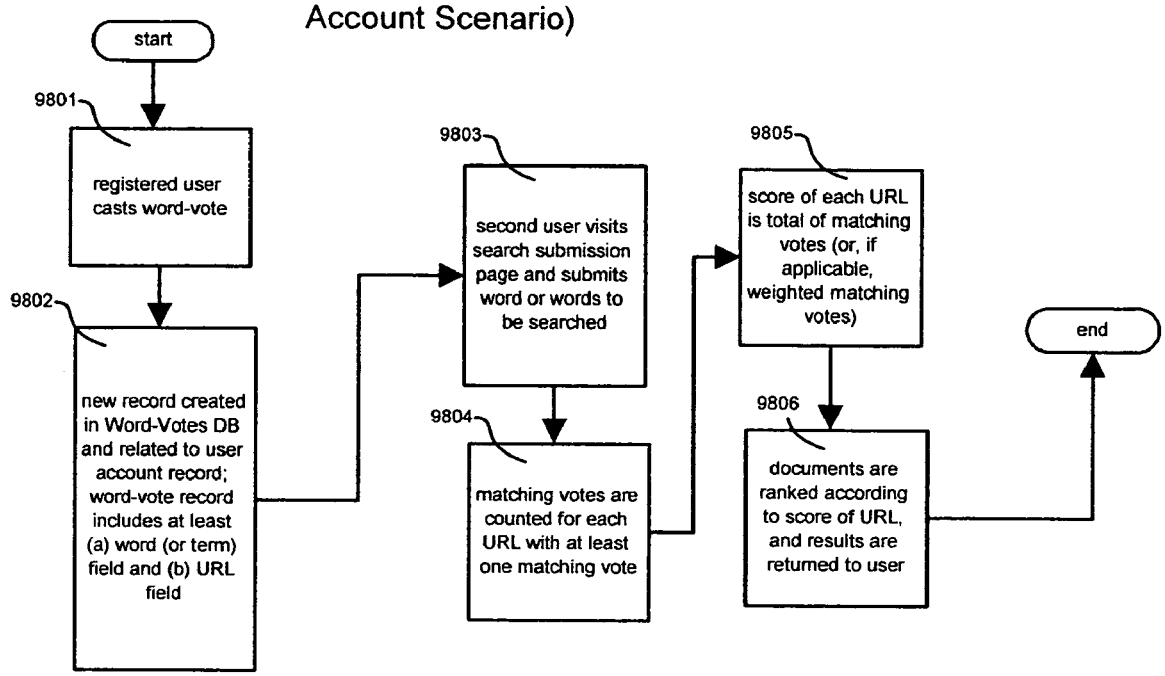
FIG. 98B  USE Subsystem: Lexivote: Scoring Equation when Weighted Word-Votes Are Used
$$r_1(A) = w_1(v_1(A)) + w_2(v_2(A)) + w_3(v_3(A))$$

FIG. 99 USE Subsystem: Lexivote: Sample excerpt form "My Word-Votes" page for viewing and altering votes

9901

Account: MotorVoter3

My Word-Votes

1. Word       Votes cinderella       First place   http://www.disney.com

Second place

Third place

2. Word       Votes stamps           First place   http://www.philatelist.org

Second place  http://www.philatelife.com

Third place

Submit changes

FIG. 100 USE Subsystem: Lexivote: Database Relationships for Lexivote & Lexary Integration
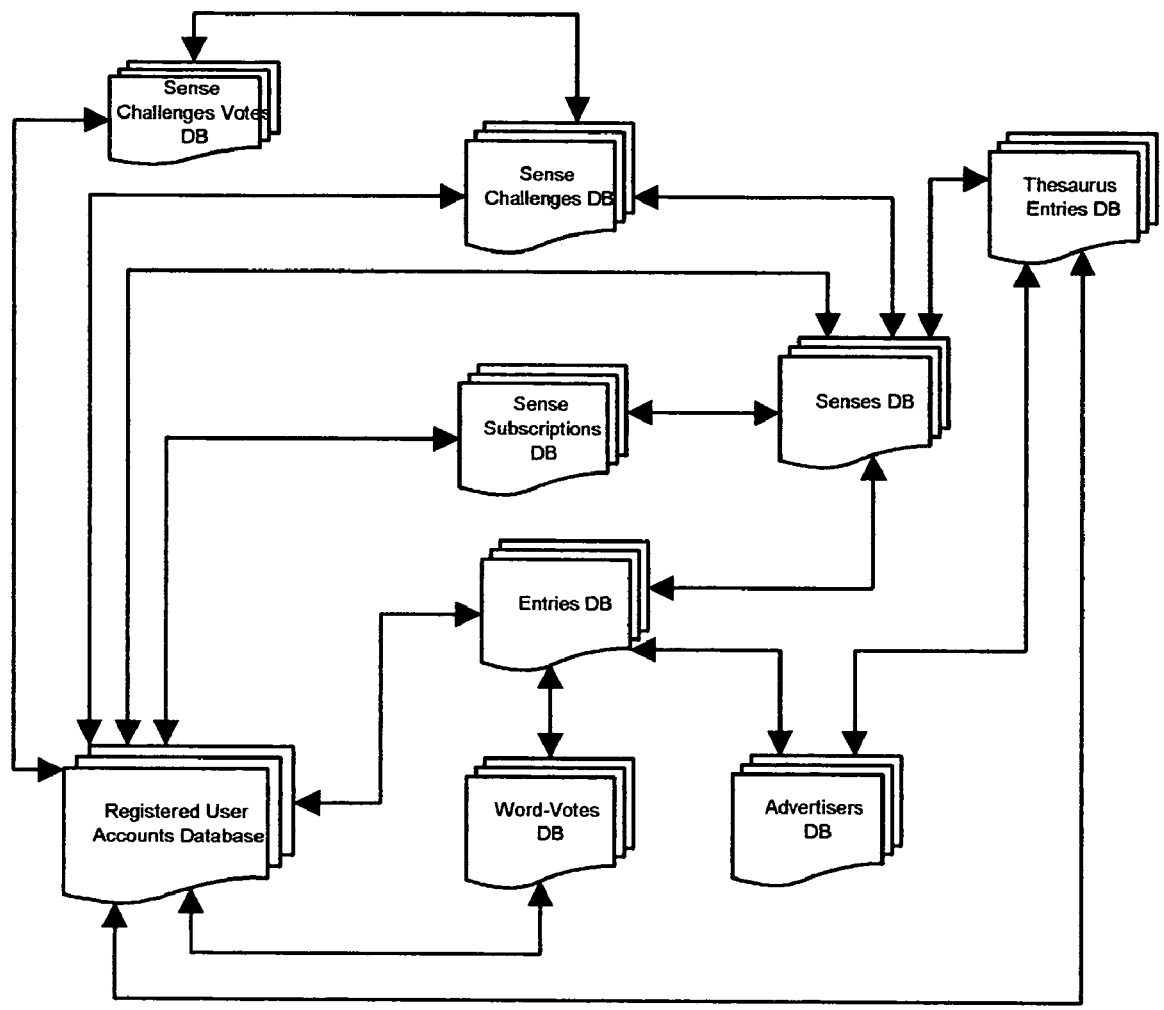

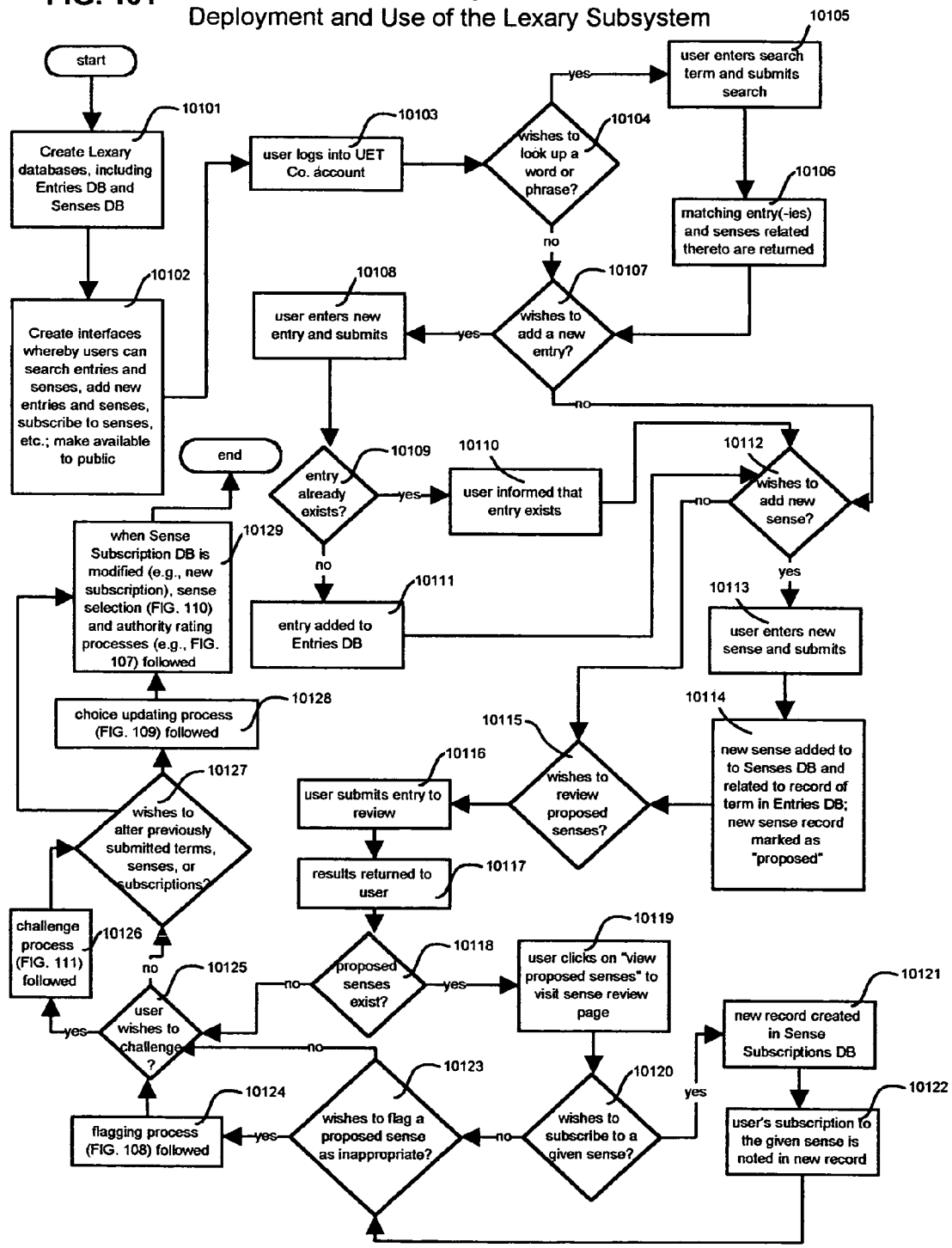
FIG. 101 USE Subsystem: Lexary: Method of Creation, Deployment and Use of the Lexary Subsystem FIG. 102  USE Subsystem: Lexary: Interface for User Look-Up from the Lexary
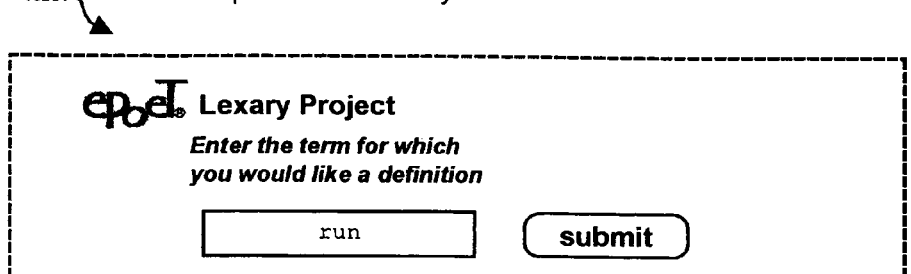
FIG. 103  USE Subsystem: Lexary: Example Results Page Displaying Entry and Related Senses
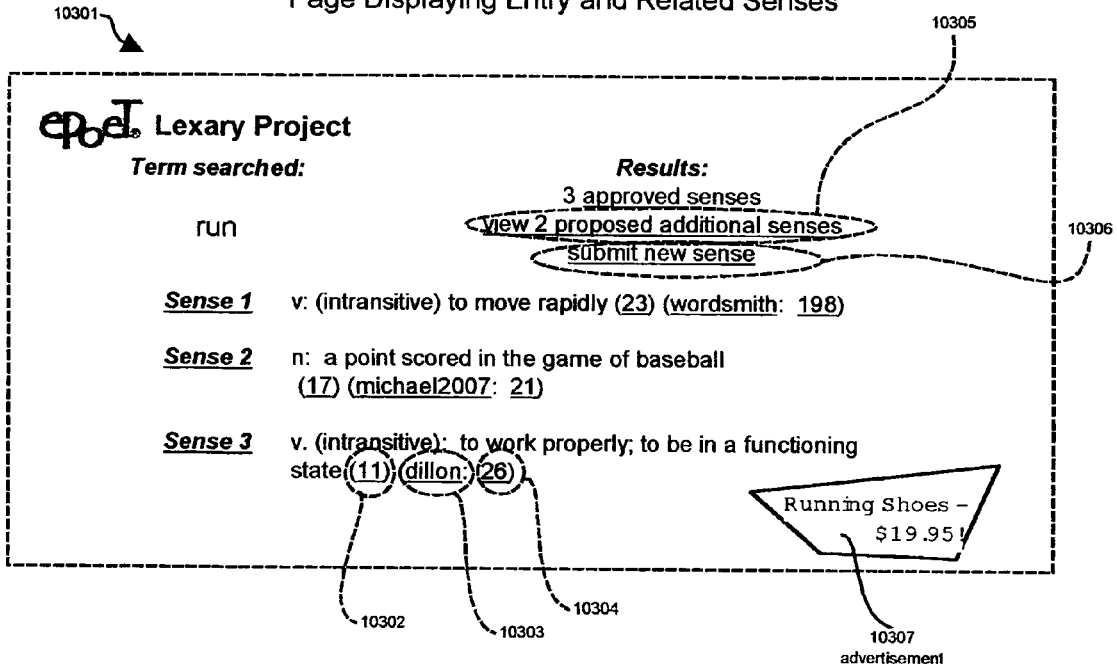

FIG. 104 USE Subsystem: Lexary: Submit New Sense Page

Lexary Project

Term searched:      *Submit New Sense* run     Part of Speech     Qualifier

New Proposed Sense    | verb |    | intransitive |

*Definition for this sense of the word* to bleed; in reference to colors, to seep into surrounding material

*Etymology (if known, not required)*

*Usage notes, including, if possible, usage in a sentence.*

The dye in this fabric is known to run when exposed to hot water.

( submit )

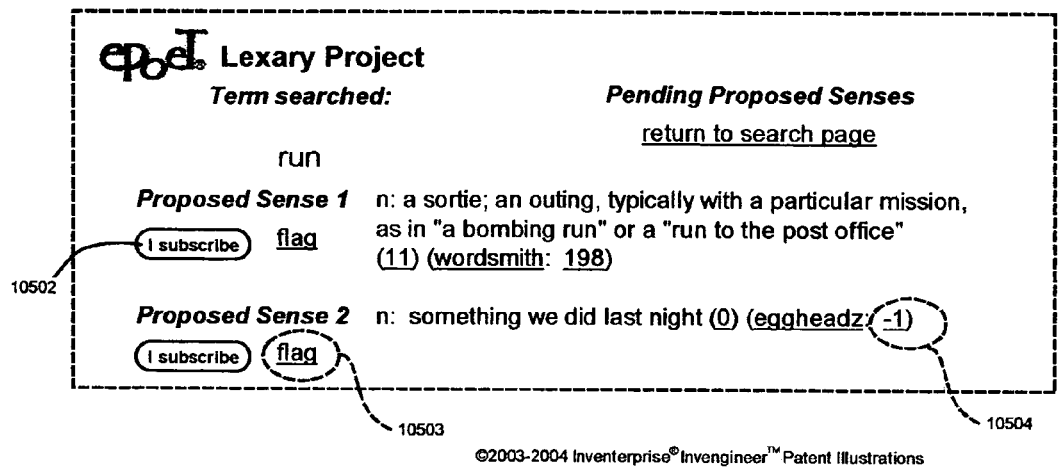
FIG. 105 USE Subsystem: Lexary: Review "Pending Proposed Senses" Page
FIG. 106 USE Subsystem: Lexary: Excerpt from Example Sense Challenge Submission Form

USE Subsystem: Lexary: Authority Rating Process

USE Subsystem: Lexary: Flagging Process

USE Subsystem: Lexary: Choice Editing Process

FIG. 110   USE Subsystem: Lexary:   Sense Selection Process
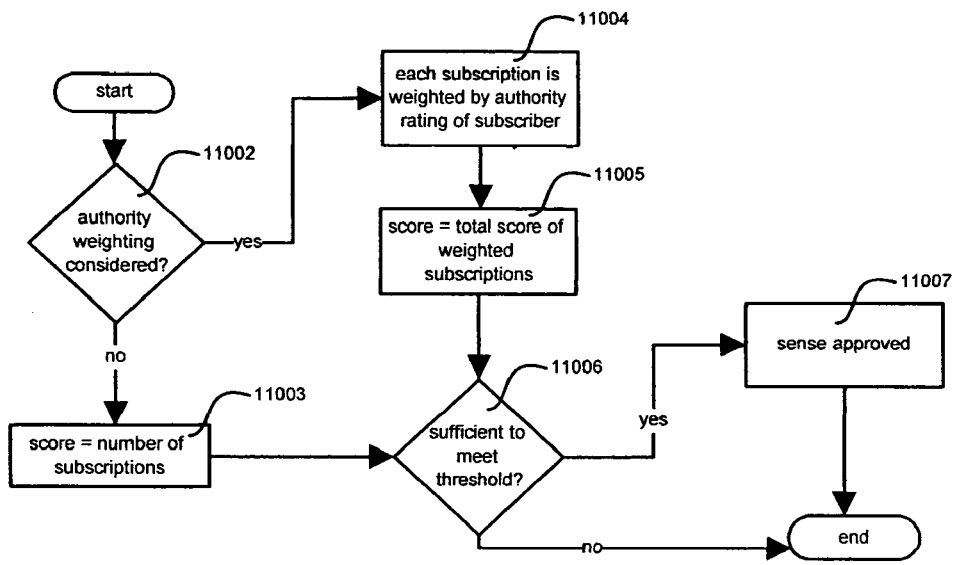
FIG. 111
USE Subsystem: Lexary:   Sense Challenge Process
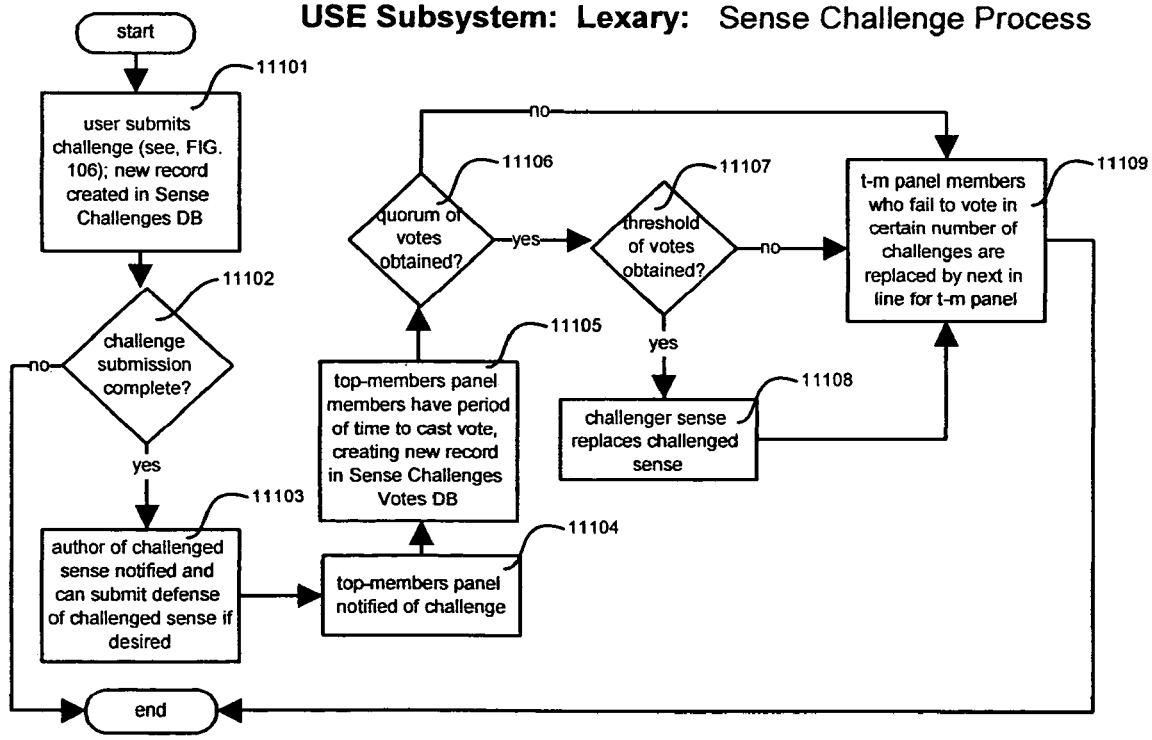

11201 FIG. 112 USE Subsystem: Lexary: Simple Component USE Search Submission Form for Integration with Lexary

| Weight | Search term | Search methodology | | | | | | |
|---|---|---|---|---|---|---|---|---|
| | | links to | links from | Lexivote | pay-per-placement | title or URL | popularity | freshness |
| 50 | rubber | ● | ○ | ○ | ○ | ○ | ○ | ○ |
| 10 | stamp | ● | ○ | ○ | ○ | ○ | ○ | ○ |

( search )

11301 FIG. 113 USE Subsystem: Lexary: Secondary Selections Page for Lexary-Integrated USE

*The search term(s) entered have multiple meanings. Please select the sense in which you mean the word:* rubber

☐ Sense 1 n: an elastic material (29) (wordsmith: 198)

☐ Sense 2 n: a device planted into a pitcher's mound in the game of baseball (21) (pitchingBill: 41)

11302 stamp

☐ Sense 1 v: (transitive) to make an impression upon an object by forceful impact (73) (wordsmith: 198)

☐ Sense 2
n: a small piece of paper affixed to a piece of mail to indicate that postage has been paid (107) (postboy: 31)

( bypass this step )  ( search according to my selection(s) above )

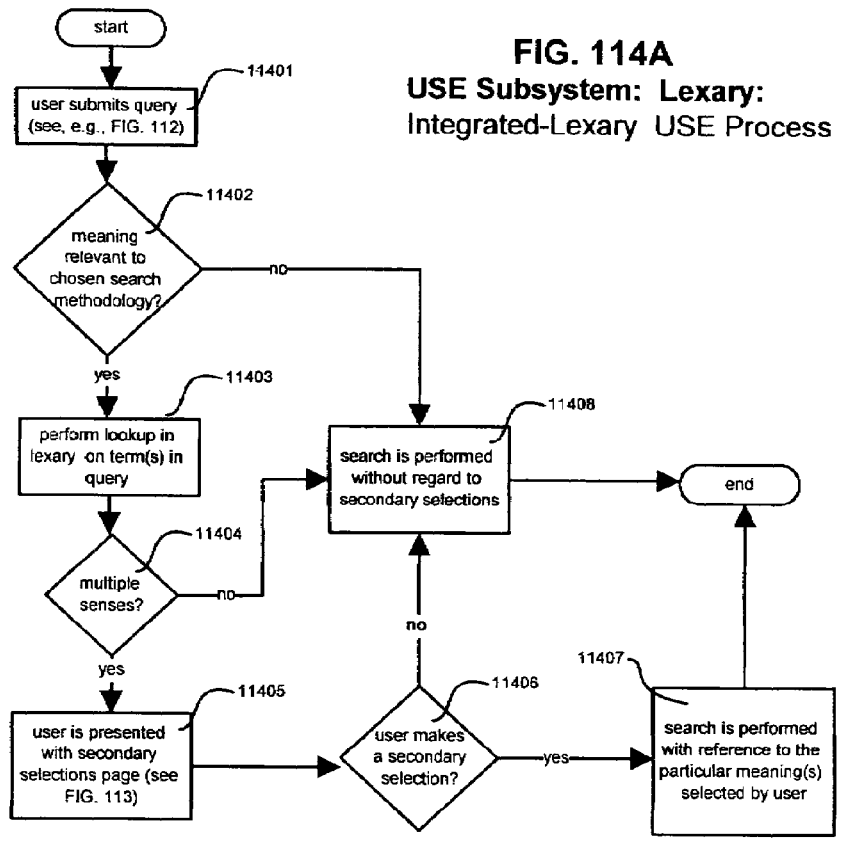
FIG. 114A
USE Subsystem: Lexary:
Integrated-Lexary USE Process
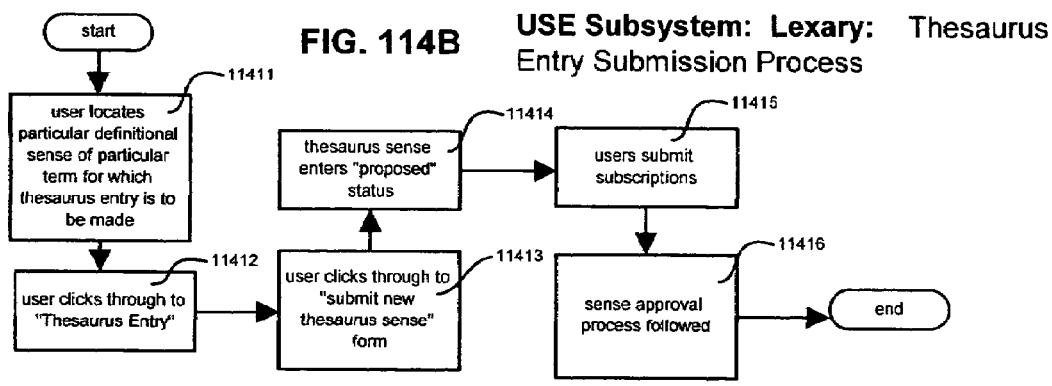
FIG. 114B USE Subsystem: Lexary: Thesaurus Entry Submission Process
FIG. 114C USE Subsystem: Lexary: Excerpt from Sample Sense Display Page with Link to Thesaurus Entry for the Given Sense
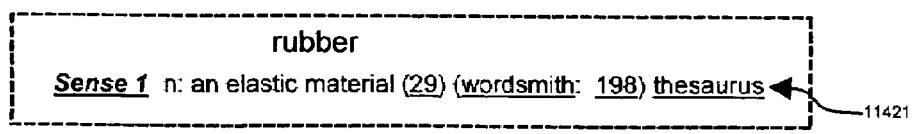

UTOU Subsystem: Creation and Deployment Process under Basic "Open Subscription" Model FIG. 116  UTOU Subsystem: Excerpt from Example Web Page Hosted by Promulgator Displaying a Given UTOUA Version

11601

UNIFORM TERMS OF USE AGREEMENT
VERSION 1.0

1. This web page comprises the Official Text of the Uniform Terms of Use Agreement Version 1.0 (UTOUA-1.0). The exact text hereof is also recorded in Copyright #XXX-XXX.

2. When properly referenced, all terms of this document may and shall be fully incorporated by reference into the terms of use agreement of a Subscribing Entity so that the terms herein govern in part the use of the Subscribing Entity's website(s) and/or service(s). A Subscribing Entity is one that controls a website in which the terms of use agreement thereof (hereinafter, the "Local TOU") is constructed and displayed in conformance to the standards set forth herein. When so incorporated by reference, this document and the terms hereof shall govern the parties to the Local TOU, EXCEPT THAT each such Local TOU shall display a section of text entitled "Identification, Localization and Opt-Out Provisions" (hereinafter, "ILO Section), the terms of which ILO Section may differ from the terms hereof and shall take precedence over the terms of this document in any conflict between the two. No terms outside of said ILO Section shall take precedence over the terms of this document in the event of a conflict.

3. In order to be considered in conformance with the standards set forth herein, each Local TOU shall be entitled "UTOU-CONFORMING TERMS OF USE AGREEMENT" and provide a hyperlink as described below. The Local TOU shall then comprise the following inital provision: "1. This Terms of Use Agreement governs the use of this Website and all related Services. Visitation or use of Website and/or Services signifies agreement by You, the visitor or user, to this Terms of Use Agreement. Provider subscribes to Uniform Terms of Use Version 1.0, which document is incorporated in its entirety into this Agreement and the terms of which are binding upon You and Provider, except as specified in Section 2, 'Identification, Localization and Opt-Out Provisions,' below." A second hyperlink shall be provided as described below....

[etc.]

FIG. 117   UTOU Subsystem: Example Excerpt from Local
Website Terms of Use Page of a Website Provider
Who Subscribes to UTOU

11701

Inventerprise®

UTOU-CONFORMING
TERMS OF USE AGREEMENT

1. This Terms of Use Agreement governs the use of this Website and related Services. Visitation or use of Website and/or Services signifies agreement by You, the visitor or user, to this Terms of Use Agreement. Provider subscribes to Uniform Terms of Use Version 1.0, which document is incorporated in its entirety into this Agreement and the terms of which are binding upon You and Provider, except as specified in Section 2, "Identification, Localization and Opt-Out Provisions," below.

2. IDENTIFICATION, LOCALIZATION, AND OPT-OUT PROVISIONS.

2.1 IDENTIFICATION: Provider means *Inventerprise*.
2.2 IDENTIFICATION: Website means *www.inventerprise.com*.
2.3 LOCALIZATION: **Interpretation and all disputes arising out of this Agreement shall be governed by the laws of the state of *California*.**
2.4 OPT-OUT: *Subscription fee for newsletter is $25/month. If a user is found to have spammed other users, the offending user shall reimburse Provider $250 per offending email. Provider holds regularly scheduled maintenance of Website on.....*

[etc.]

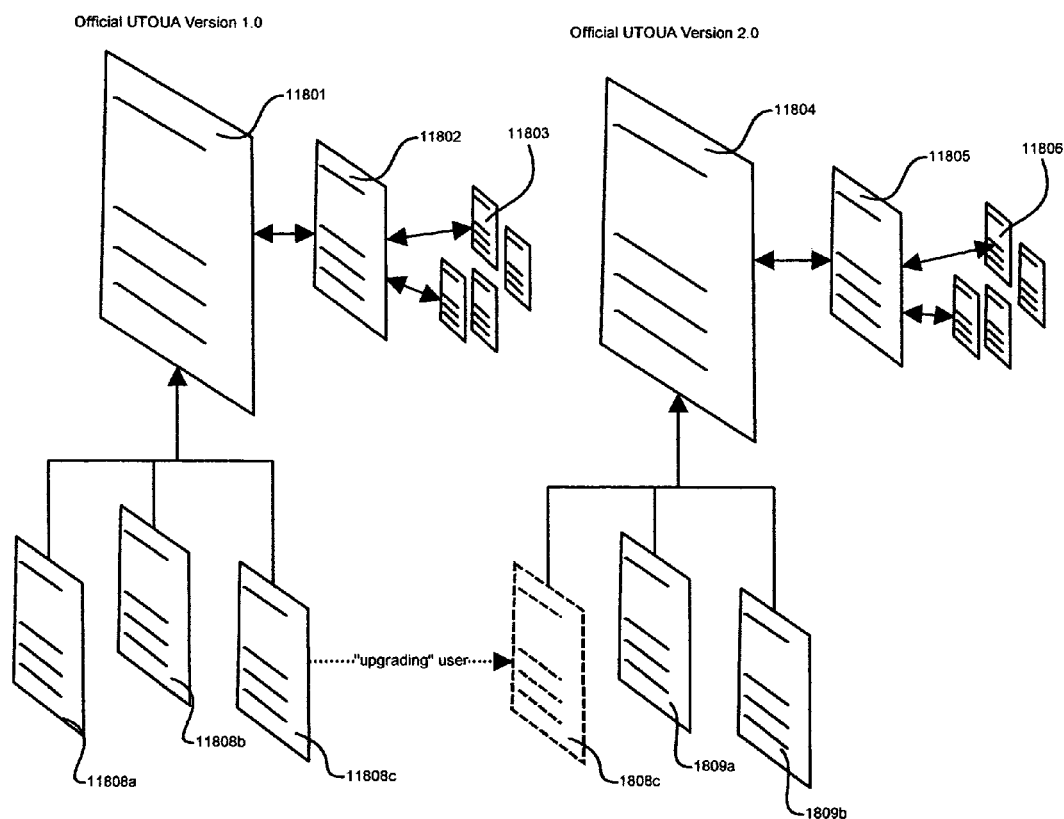
FIG. 118  UTOU Subsystem: Document Linking Overview

FIG. 119 UTOU Subsystem: "Registered Subscriber" Model Process, with UTU Integration
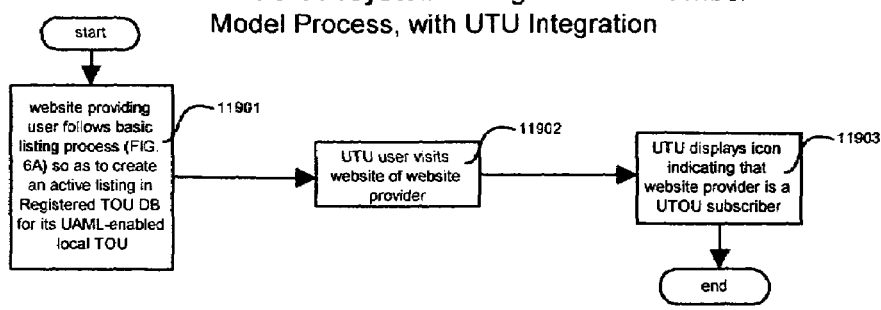
FIG. 120 UTOU-UTU Subsystems: Example UTU under "Registered Subscriber" Model
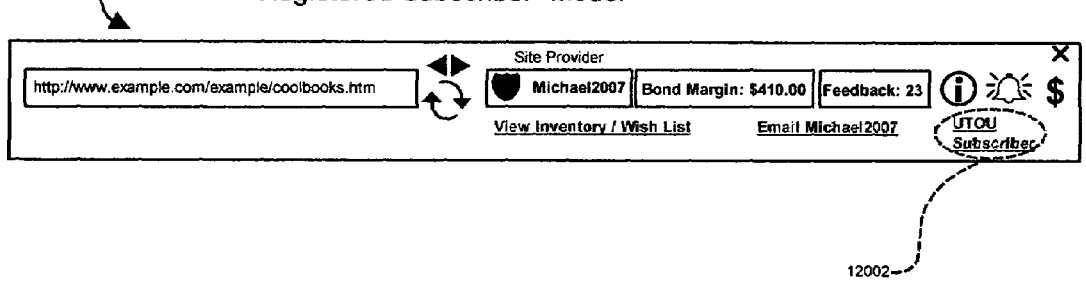

UTOU Subsystem: UFC:
Method Overview

FIG. 122 UTOU Subsystem: UFC: Sample UFC-Enabled Paper Page

FIG. 123

UTOU Subsystem:
UFC: Benefits

BENEFITS OF UFC USAGE:
1. Reduction in usage and storage of paper and ink
2. Reduction in ease of making and filing back-up hard copies or electronic copies, which translates to lower likelihood of loss of documents
3. Easier to transmit via fax, email, etc.
4. Uniform terms produce greater reliability in case law
5. Uniform terms become more familiar to legal professionals, reducing attorney time required for review
6. Multiple redundant means of recovering referenced terms, including: (i) web-accessible version; (ii) copyright office records; (iii) barcode UArb Subsystem:
Method Overview

UArb Subsystem:
PartyRelationships

LEGEND
Solid line = privity of contract relationship between named parties
Dotted line = third party beneficiary relationship

UArb Subsystem:
PartyRelationships

LEGEND
Solid line = direct privity of contract relationship
Dotted line = third party beneficiary relationship

FIG. 127
UArb Subsystem:
Benefits

INCENTIVES FOR USER PARTICIPATION

1. Discounted insurance premiums (if offered)
2. Lower risk of frivolous or extortionist litigation
3. Lower costs in the event of dispute
4. Avoidance of court backlog: quicker resolution

FIG. 128 UArb Subsystem: Excerpt from Example Web Page Hosted by UET Co. Displaying Universal Arbitration Agreement

UNIVERSAL ARBITRATION AGREEMENT
VERSION 1.0

1. This web page comprises the Official Text of the Universal Arbitration Agreement Version 1.0 (UAA-1.0). The exact text hereof is also recorded in Copyright #XXX-XXX.

2. By signifying your agreement to this UAA, you, the registering user, are establishing a contractual relationship with UET Company. In so doing you are entitled to certain benefits and obliged to perform certain duties as follows. Being a party to the UAA may also make you eligible for special discounts offered by insurance companies and/or other third parties.

3. THIRD PARTY BENEFICIARY. The primary purpose of this UAA is to establish a third party beneficiary relationship between you and any other users who also agree to the UAA. You and UET Company, the parties to this Agreement, have a direct relationship -- "Privity of Contract." But this agreement also obligates you to perform a specific duty with respect to third parties: when a third party has entered into an identical contract with UET Company, i.e., when said third party has agreed to the UAA, you promise to submit to binding arbitration any disputes of the type specified below and arising between you and said third party. Said third party will, by virtue of entering into an identical UAA with UET Company, also owe this same duty to you.....

[etc.]

FIG. 129    UArb Subsystem: Example Certificate of User Participation in UArb System

---

UNIVERSAL ARBITRATION AGREEMENT
VERSION 1.0

Certificate of Party Status

1. TO WHOM IT MAY CONCERN: This document certifies that John Q. Party has entered into a binding agreement with UET Company, the terms of which are essentially identical to the terms known as the Universal Arbitration Agreement Version 1.0., which can be found at the following URL _____ and in U.S. Copyright Reg. # _____ and, in encoded form, in the barcode above.

[etc.]

Signed

_____    _____
Bill Q Uet             date
CEO
UET Co

FIG. 130 UArb-UTU Subsystems: Example UTU-UArb Integration
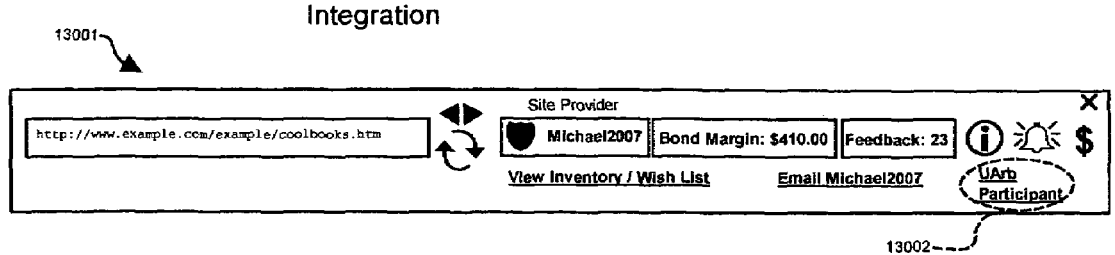

SOCIAL NEWS GATHERING, PRIORITIZING, TAGGING, SEARCHING, AND SYNDICATION METHOD

CROSS-REFERENCE TO RELATED APPLICATIONS

Priority filing of U.S. provisional patent application 60/486,630, filing date Jul. 11, 2003, entitled "Information Management System, Method and Device", is claimed. Said provisional patent application is hereby incorporated by reference in its entirety into the present disclosure.

A portion of the disclosure of this patent document contains material which is subject to copyright protection. The copyright owner has no objection to the facsimile reproduction by anyone of the patent documents or patent disclosure, as it appears in the patent trademark office patent file or records, but otherwise reserves all rights whatsoever.

STATEMENT REGARDING FEDERALLY SPONSORED RESEARCH AND DEVELOPMENT

None.

REFERENCE TO SEQUENCE LISTING, A TABLE, OR A COMPUTER PROGRAM LISTING APPENDIX

None.

BACKGROUND OF THE INVENTION

1. Field of the Invention

The invention relates to electronic informational and commercial transactions and interactions, specifically, to facilitating such transactions and interactions through the use of computers and the Internet.

2. Description of Related Art

A. Related Art: The Need for a Universal Electronic Transaction System

Two of the most frequently used Internet and World Wide Web services are (I) electronic commerce services, particularly, the buying and selling of goods and services wherein a portion of the transaction is conducted via the World Wide Web, and (II) information search services, particularly, providing a customized list of websites and Web-accessible documents in response to an inquiry submitted by a user to a Web search engine, whereby an index of Web pages is searched. While effective technology for each of the aforementioned services exists, its usefulness is severely limited by a number of technical factors as follows.

B. Related Art: Internet Auction Systems

Under the related art, dynamically priced e-commerce transactions are offered to Web users through the use of dynamically generated web pages that incorporate data drawn from the auctioneer's databases. Current providers of such services include eBay, Amazon, and Yahoo. This approach is not ideal in that such "deep Web" data cannot be readily indexed and catalogued by external search engine providers; thus, searching Internet auctions for a particular item requires that a user visit each individual auction site and search through that given website's search interface or have an intermediary do so.

Moreover, auction site providers typically frown upon attempts to index, analyze, or otherwise make use of information in the auctioneer's databases for purposes other than bidding, and these website providers may use their control of the information therein to prevent competition by other companies. Thus, obtaining accurate and complete market data pertaining to Internet auctions is more difficult than it would be in a transparent marketplace.

If an Internet user does not wish to list his or her auctions on a major site and pay the fees-charged by the given Internet auctioneer, a user can start his or her own auction site. This alternative is not ideal in that it involves a great deal of time and expense and offers a low chance of success: to launch a new Internet auction site, one must purchase (or write), install, run and maintain expensive auction site software on expensive computer hardware, incur all the other risks and expenses associated with starting a business, and then come up with a way to draw bidders and sellers away from the existing major companies' sites. Very few people are up to the task.

What is needed, therefore, is an Internet auction system and method that allows (I) any person with a web page (II) to host an Internet auction on that web page (III) without requiring this person to purchase any software (IV) while yet allowing the person's auction to be searchable through any Web search engine and (V) also allowing data from all such Internet auctions in the world to be easily and freely gathered, analyzed and disseminated by anyone who wishes to do so.

C. Related Art: Internet Search Systems and Methods

Web search engines under the related art allow users to input terms and operators of their own choosing. Current providers of search engines include Google, MSN, and Ask Jeeves. However, the search function itself is still conducted according to the particular algorithmic approach established by the service provider. Such a "paternalistic" approach presumes that computer engineers or business owners are better equipped to create a search algorithm than are the people doing the searching, e.g., users at large. These systems are not ideal in that such a one-size-fits-all service is unlikely to yield results that are better than—or even equal to—those that could be obtained through the use of individual algorithms that have been uniquely tailored to meet the individual needs of a particular person with a particular search inquiry at a particular point in time.

What is needed, therefore, is a mechanism that allows Internet users to select the search methodology used in a particular search term, to combine the results of a search under one methodology with another search under another methodology, to assign how much weight is allotted to each methodology, to set standards against which each indexed item (e.g., document or record) is measured, to set maximum levels or tolerances for variations from such standards, and to otherwise define the way a search is performed rather than be reliant upon an a priori definition set by someone else.

D. Related Art: Internet Classified Ad Systems

Dynamically priced transaction vehicles (e.g., auctions) are not the only type of Internet classified ad. Numerous websites devoted to a given type of classified ad—personal ads, real estate ads, job listing ads, vehicle ads, and others—have been developed to meet such demand.

Current providers of such services include Craigslist, Zip Realty, and Matchmaker.com. Again, however, in order to allow user posting and editing of such classified ads, these sites also rely upon database-driven, dynamic web page generation. Thus, most of the limitations described above in reference to Internet auctions apply to these classified ad systems as well: indexing by third parties is difficult and may cause legal battles with website providers who believe that user-provided content is their property; compilation and analysis of such data is difficult.

What is needed, therefore, is a new Internet classified ad system and method that allows all classified ads of a given type on the entire World Wide Web to be searchable through a single search engine with field-by-field precision, that allows anyone with a web page to participate in this worldwide classified ad system without requiring any special advertising or database software on the part of the participant, and for all the data in such classified ads to be accessible to anyone with Web access for the purposes of information gathering and analysis.

E. Related Art: Internet Legal Vehicles

Under the related art, legal relationships between website providers and website users are governed by individual terms of use agreements that vary from website to website such that there are literally millions of different terms of use agreements in effect with respect to the millions of different websites available at the time of this writing. This approach is not ideal in that careful reading of each individual website's terms of use agreement is prohibitively time-consuming for a user of multiple websites, and the duplicative legal work associated with the creation of each individual terms of use agreement is wasteful. Meanwhile, resolution of disputes arising under seemingly infinite varieties of terms of use agreements leads to unpredictability in the case law.

Uniform codes (e.g., Uniform Commercial Code or "UCC") are known and have been effective in reducing inter-jurisdictional uncertainty. These uniform codes suggest standards for lawmaking bodies, such as state legislatures, to follow so that businesses operating in multiple states do not have to learn multiple legal systems. Unfortunately, the Internet, replete with millions of separately owned and operated private websites, has no such uniformity. Each website is essentially its own little fiefdom.

What is needed, therefore, is a system and method whereby uniformity in terms of use agreements can be advanced so as to allow greater efficiency and reliability for both website providers and website users.

Moreover, numerous contracts that are paper-based under the related art are extremely duplicative as well. Many common agreements, such as purchase or rental agreements, contain large numbers of very similar terms which vary slightly from one agreement to another, which situation again requires excessive legal review by the parties themselves as well as third parties such as consumer advocacy groups and the courts, and again thwarts predictability in the law. Meanwhile, millions of pieces of paper and millions of dollars are unnecessarily spent each year in the creation, documentation, and storage of these terms in contract form.

What is needed, therefore, is a system and method whereby essentially duplicative portions of contracts can be standardized and recorded more efficiently.

Even in situations where the law is well-settled, however, dispute resolution through the courts typically takes anywhere from several months to several years, as backlogs continue to grow. Alternative dispute resolution methods, such as arbitration (e.g., American Arbitration Association), mediation, and religious courts such as the Jewish Beis Din court system, are known and are preferred by many businesses, organizations, and individuals, since protracted legal battles are expensive and time-consuming, and for many litigants the adage "justice delayed is justice denied" holds true. These alternative dispute resolution methods, however, are still only employed in a fraction of cases, since arrangement for such proceedings is done on a case-by-case or contract-by-contract basis. Moreover, many unsophisticated parties have little or no knowledge of the benefits and availability of alternative dispute resolution methods.

What is needed, therefore, is a system and method whereby the benefits of alternative dispute resolution may be made available to and more readily accessed by a larger portion of the population.

F. Related Art: HTML, Order Forms, and Contact Forms

Under the related art, contacting the provider of a website through the website itself relies upon a Web contact submission form (e.g., "<FORM ACTION= . . . ">) or purchase form. This approach is not ideal in that, since each website is designed completely differently from the next, a Web visitor must learn to navigate through the peculiar layout of each individual website in order to find the given site's order form or contact submission form.

Moreover, the Web order form concept itself is less than ideal in that, every time a user begins purchasing from a vendor through its website, the user must register with this vendor, providing credit card information, e-mail account address, and other sensitive data. Each time this data is circulated to a new party, the user's exposure to the risk of identity theft, fraud, and spam increases. Ideally, Internet users would be able to purchase from website providing vendors without having to register separately with each vendor and to fill out a separate purchase order form for each individual vendor website.

What is needed therefore, is a superior communication system and method that allows users to interact with and purchase from all website providers through a single common interface, thus requiring no website navigation, no per-site registration, and no per-purchase order form submission.

Meanwhile, HTML itself is simply a language for defining the structure of a document, such as which part of the document is a title, which part is a paragraph, which part should be emphasized, and so on. HTML is silent about what the document actually says, i.e., HTML does nothing to tell us about the content or subject matter of a given paragraph, sentence, or phrase. Given this reality, under the related art, elaborate content analysis software has been developed, such as that of Applied Semantics, to "read" web pages in an attempt to ascertain the subject matter thereof without human participation. Such an approach is, at best, approximate. Thus, World Wide Web search engines, relying upon highly uncertain approximations, oftentimes return results that are highly variable in terms of relevancy. Ideally, the World Wide Web would be searchable with the field-by-field precision commonly seen in bookkeeping software applications or contact management software, in which programs users can easily search for a particular term, such as a last name, in a particular field, such as a last name field.

What is needed, therefore, is a method of constructing and parsing a web page so that the exact meaning and content thereof can be immediately and reliability ascertained and so that a group of web pages can be searched with field-by-field granularity.

G. Related Art: Internet Search Engine Methodology

Also, under the related art, one commercially successful methodology for searching and ranking the relevancy of web pages is that of citation ranking, e.g., U.S. Pat. No. 6,285,999 to Page. This method ranks pages in part according to the number and nature of other Web pages that link to the given page. This method is not ideal in that it provides no means whatsoever for capturing the difference between a "positive" reference and a "negative" reference. In other words, under this method, a link from an article that ridicules the linked document counts just as much as a link from an article that praises the same document.

What is needed, therefore, is a ranking methodology based upon the actual opinions of the user community rather than upon hit-or-miss surrogates for these opinions.

H. Related Art: Internet Dictionary, Stylebook and Grammar Book Technology

Dictionaries, literary stylebooks, and grammar books have heretofore been the province of elite editors and academicians at publishing companies and universities. Language, however, evolves faster than such institutions. In order to speed up the pace at which such reference materials are updated, some attempts have been made to create limited-function, on-line dictionaries—such as dictionaries for computer terms—that allow user-submission of definitions, but these attempts are not ideal in that these dictionaries must still be edited by someone so that false or frivolous submissions do not get published. Such attempts, in the absence of a superior approach, would be even more futile in the more subtle areas of language, such as grammar and style.

One approach is that used in Wikipedia, an online "encyclopedia," in which all the content is user-created and user-maintained. While the apparent democracy of such an approach seems attractive at first blush, the actual performance of such an approach is disappointing: a novice in a field can delete the work of an imminent scholar in the same field and replace this work with nonsense. Endless retaliatory deletions, re-writings, and political squabbles ensue. Meanwhile, someone trying to use the Wikipedia as a reference tool does so at his or her own risk, since the content thereof may or may not be accurate at and any given time and changes from day to day.

What is needed, therefore, is an effective and efficient means by which a dictionary, stylebook, grammar book or other reference material can be created, maintained, and used as an authoritative reference tool by anyone with Internet access without the need for content-editing institutions.

I. Related Art: Web Browser Toolbar Technology

Software commonly called "toolbars", such as the NetZero, AOL, and Yahoo Companion toolbars, whereby features are included in or added to a Web browser, such as Microsoft Internet Explorer, are known. These toolbars typically feature advertisements or convenient access to a certain function, such as a Web search engine, that the given toolbar provider wishes to offer users.

One noteworthy variation on this theme is a toolbar feature used by Gain.com, which displays advertisements based upon a user's browsing habits, such as the websites he or she visits. This approach to the toolbar is not ideal in that the toolbar essentially exists to generate ad revenue for the toolbar maker at the expense of website providers themselves. In fact, as alleged in a recent lawsuit, this toolbar mechanism may be used to display ads for competitors of the website provider whose website is being browsed. Ideally, instead of working against website providers, the toolbar would actively serve the purposes of both website providers and visitors—without requiring each individual website provider to build and distribute its own toolbar.

What is needed, therefore, is an effective and efficient means through which the toolbar serves to enable easy, direct interaction between the toolbar user and virtually any provider of a website being browsed.

I. Related Art: Additional Technologies

Computers—which term is meant to include for purposes of this document all manner of computer and telecommunication hardware and software, including CPUs, RAM, ROM, disk drives, removable data storage media, ports, cables, routers, switches, interface devices, keyboards, point-and-click devices, wireless transmission/reception hardware, audio and video display monitors, modems, cards, power supplies, networks, networking equipment, operating systems, etc.—are known. Software comprising instructions stored on digital media whereby information is processed and steps are performed is known. Protocols for the storage and retrieval, both locally and remotely, of information using electronic devices are known. A URL (Uniform Resource Locator), a URI (Uniform Resource Identifier), a file name and a file path are known.

Markup languages (e.g., SGML, HTML, XML) and methods for accessing and manipulating markup language documents (e.g., DOM, SAX) are known, as are methods for displaying information in such documents (e.g., Web browsers, CSS, XSLT) and identifying individual vocabularies used therein (e.g., Namespaces). Database management systems (e.g., Oracle, Sybase), database query languages (e.g., SQL) and means of dynamically generating web pages which incorporate material drawn from a database (e.g., ASP, PHP) are also known. Techniques and software for mapping data from one type of database to another are known. Internet bonding and instantaneous electronic payment systems (e.g., U.S. patent application Ser. No. 09/848,639 by Harrison) are known.

Instant messaging services, such as AOL Instant Messenger, whereby a real-time or near real-time data connection is established between an Internet user and the service operator so that real-time delivery of text exchanges between users can be affected, are known.

Public recordation of information such that said information is assigned, indexed, and can be retrieved by a unique alphanumeric identifier, such as copyright registration, is known. Techniques for encoding data on paper for machine retrieval, such as bar codes and high-density bar codes (2D), are known. Means for hosting an image file and updating this image file each time the data in a database field is changed (e.g., Web Page hit counters) are known.

Third-party-beneficiary contracts are known. A "third-party-beneficiary contract" is "a contract between two or more parties, the performance of which is intended to benefit directly a third party ["one not a party to an agreement"], thus giving the third party a right to file suit for breach of contract by either of the original contract parties." Black's Law Dictionary, 6th edition, page 1480 (West publishing Co., St. Paul, Minn., 1990).

BRIEF SUMMARY OF THE INVENTION

Disclosed is a Universal Electronic Transaction (UET) system, method, and device comprising several subsystems and submethods/subprocesses as well as the physical apparatus of a computer network configured to execute certain steps. An entity called the UET Company is assumed to be the implementer of the UET system. Elements include:

The URLIT identifier. A "URLIT" identifier is a result of a process whereby a given URL is registered and access privileges established. The URLIT can be manipulated into multiple forms so as to serve multiple functions. It serves as a security measure to ensure that a registered user to whom a URL is registered has access to the content of the web page at the given URL, and that the party controlling the content of the web page has access to the password-protected registered user account to which the given URL is registered. The URLIT serves as a key code in relating records between databases in a relational database complex. The URLIT serves as a transaction identifier by which auctions and other transactions can be tracked. The URLIT serves as part of file names that identify image files intended for display in association with the aforementioned web page.

UAML. The URLIT is a crucial part of a markup system called the Universal Advertisement Markup Language or "UAML." The UAML allows an Internet auction, classified ad, or other material for which indexing might be useful, such as poems or songs, to be embedded in any static web page. The resulting "UAML-enabled" web page can be parsed, UAML-tagged data extracted and imported into the fields of a relational database record, and the resulting record searched so that UAML-enabled auctions, ads, and other listings across the entire World Wide Web can be found, ranked, and analyzed with field-by-field precision.

UTU. The URLIT further enables a system and software program called a "Universal Toolbar Utility" (UTU). The UTU appears as a toolbar in a Web browser and serves to establish a data connection (push or pull) between a client computer on which the UTU is being used and the UET Company. A current URL being browsed is transmitted to the UET Company which in turn requests a file so identified. If the web page to which the URL points is properly UAML-enabled and the URL is properly registered, a variety of content can be transmitted for UTU display, including a contact or order form whereby interaction with or purchasing from a website provider directly through the UTU, processed by the UET Company, is made easy.

Userithm Search Engine. A "Userithm Search Engine" (USE) (from "user-defined" and "algorithm") allows users to design their own unique search algorithms. A "search component" is defined by a user's data input. A given methodology for the search component is selected from a menu of different search methodologies. A weight is assigned to the search component for use in combining the results of the search component with another search component. A standard for data within a field is set, along with a tolerance for variation from the standard. Search results are combined according to user-assigned weights, and a resulting rank list is returned to the user, along with a performance indicator for each search component so that the user can immediately discern which search technique is most effective for the particular case.

Lexivote search methodology. A "Lexivote" system provides a mechanism whereby a user submits an opinion regarding which website is most relevant to a word or phrase. The opinion—essentially a vote—is then used in a method of ranking search results.

Lexary. A "Lexary" is an electronic reference tool which provides access to an entry that is created and maintained by a community of users at large. Specifically, the Lexary is an on-line dictionary, thesaurus, style book, and grammar book, wherein users can submit, edit, rate, and challenge definitions of terms, grammar notes (punctuation, syntax, etc.), and style conventions for English or another language.

Uniform Terms of Use. A "Uniform Terms of Use" (UTOU) system provides a mechanism whereby a "terms of use agreement" that governs use of an individual website can be created, reviewed, maintained, and interpreted efficiently and predictably.

Universal Form Contract. A "Universal Form Contract" (UFC) system is an extension of the UTOU system into off-line settings, providing a mechanism whereby a written contract document can be created, executed, stored, and interpreted efficiently and predictably.

Universal Arbitration. A "Universal Arbitration" (UArb) system provides a mechanism whereby a UET user can make alternative dispute resolution arrangements efficiently.

BRIEF DESCRIPTION OF THE DRAWINGS

FIG. 1 provides a flowchart of the method by which the Universal Electronic Transaction (UET) technology is created, deployed, and used.

FIG. 2 provides a diagram of the UET system and its component subsystems.

FIG. 3 depicts a diagram of the physical apparatus of the UET technology.

FIG. 4 depicts a flowchart of a method by which the UAML subsystem is created and deployed.

FIG. 5 depicts a flowchart of the process by which users of the UAML subsystem are registered and their accounts created.

FIG. 6A depicts a flowchart of a process by which UAML advertisements/listings are made available.

FIG. 8 depicts a flowchart of a process by which UAML-enabled web pages are created.

FIG. 9 depicts an example UAML-enabled web page.

FIG. 10 depicts an example of an HTML submission form whereby information can be submitted to a code generator program so that UAML tags can be automatically generated to describe the submitted information.

FIG. 11 depicts an example of an excerpt from source code of the UAML-enabled web page.

FIG. 12B depicts a flowchart of a UAML security check process.

FIG. 13 depicts a chart of sample data that could be described by a particular UAML tag, a "UAML type" tag, so as to identify a particular database.

FIG. 14 depicts a chart of some fields that could be contained in a record within a relational database complex for use in the UET system.

FIG. 15 depicts a diagram of extracting PCDATA within a particular element within the UAML-enabled document and inserting the data into a record in the relational database complex.

FIG. 16 depicts a diagram of some databases and relationships in the relational database complex.

FIG. 17 depicts a diagram of an effect of having content of a listing hosted on two servers, one under control of the UET Company and the other under control of the user.

FIG. 18A depicts a flowchart of a process by which images hosted by the UET Company and appearing in listings are updated when database information changes.

FIG. 18B depicts a temporal diagram of an image at a first moment in time and an image at a second moment in time.

FIG. 19A depicts a flowchart of a process whereby continuing validity of a listing is confirmed.

FIG. 19B depicts a chart of different scheduling options for executing the process in FIG. 19A.

FIG. 24 depicts a flowchart of an auction bidding process.

FIG. 25 depicts a flowchart of an auction completion process.

FIG. 26 depicts an excerpt from an example "My Registered URLs" page.

FIG. 27 depicts an excerpt from an example auction review and bid submission page related to an auction listing.

FIGS. 28C, 28D, and 28E depict excerpts from web pages displaying data extracted from listings.

FIGS. 29 through 36 depict revenue models for the UAML subsystem.

FIG. 37 depicts an example of the Universal Toolbar Utility in use.

FIG. 38 is a flowchart of steps for using the UTU.

FIG. 39 depicts an example of the Universal Toolbar Utility in use, in expanded form.

FIG. 40B depicts an excerpt from an example web page hosted by the UET Company displaying lists of a given registered user's inventory lists and wish lists.

FIG. 40C depicts an excerpt from an example web submission form through which a user can modify a given inventory list.

FIG. 41 is a flowchart of the process whereby a user uses the UTU universal shopping cart feature.

FIG. 42A-42B is a diagram depicting a one-to-one relationship between a URLIT and a UAML-enabled listing in contrast to a one-to-many relationship between a URLIT-stem and successive-iterations of a document at a particular URL when used strictly for UTU purposes.

FIG. 43 is a diagram depicting a web page and databases involved in displaying information associated with the web page through the UTU.

FIG. 44 is a diagram depicting relationships between data in a shopping cart record of a UTU user and inventory lists associated with web pages under the control of other users from whom the UTU user is purchasing.

FIGS. 45 and 46 depict an example of an alternative embodiment of the UTU, configured to facilitate automatic contributions to nonprofit organizations.

FIG. 51 depicts an excerpt from an example web submission form used in the creation of a UTU submission form.

FIG. 52 depicts an excerpt from an example web submission form used in the creation of an auction to be displayed through the UTU.

FIG. 53 is a flowchart of a process through which users participate in use an iTicker feature of the UTU.

FIG. 54 depicts an example of a UTU embodiment displaying scrolling iTicker headlines.

FIG. 55 depicts a chart of example UAML tags common to all listings.

FIG. 56 depicts a template for a subject-specific tag names used in the present disclosure.

FIG. 57A depicts a chart of example subject-specific tags, corresponding to the fields of the UET Company database record in a database, for use in UAML-enabled listings for collectible coins.

FIG. 57B through FIG. 57H depict other subject-specific vocabularies.

FIG. 58 is a flowchart of a process through which variable data in dynamically generated web pages can be tagged for use within the UAML system.

FIG. 59D depicts an example e-mail to be sent to the UET Company, where it is parsed and a search performed according to search criteria specified in the e-mail.

FIG. 59E depicts an example e-mail sent by the UET Company to a user in response to a query such as that depicted in FIG. 59D.

FIG. 60 is a flowchart of a process through which the Userithm search engine is used.

FIG. 61 depicts a template for web pages for use in submission of search queries under the Userithm search engine subsystem.

FIG. 62 is a flowchart of a process by which search components are defined on-the-fly in real time by a user of the Userithm search engine subsystem.

FIG. 63 is a flowchart of the Userithm search and ranking process.

FIG. 64 is a flowchart of the subcomponents search and ranking process.

FIG. 65 depicts an excerpt from a sample submission form through which a user submits a Userithm search query.

FIG. 66 depicts an excerpt from a sample search submission form with predefined methodology which still allows entry of intercomponent user assigned weights.

FIG. 67 depicts a chart of different search methodologies that can be used within the Userithm search engine system.

FIG. 68A is a flowchart of the normalization process.

FIG. 68B depicts an equation whereby an overall score of a document is produced by combining weighted scores of the document under various search components.

FIGS. 69 through 71 are charts of scores of a group of hypothetical web pages.

FIG. 72 depicts a template for display of search results along with performance gauges associated with each result.

FIGS. 73 and 74 depicts excerpts from example results pages including performance gauges.

FIGS. 75 through 86 depict excerpts from alternative example submission forms through which a user may submit a Userithm search query.

FIG. 87 is a flowchart of the process whereby search components are defined in a subject specific database search.

FIG. 88 depicts an example e-mail in which a user submits Userithm search queries via e-mail.

FIG. 89 depicts an example e-mail wherein results of a Userithm search query submitted by e-mail are provided to a user.

FIG. 91 depicts an excerpt from an example submission form through which a user can submit choices to the UET Company regarding-a customized search engine.

FIG. 93 depicts an excerpt from an example web page through which word-votes are submitted for use in the Lexivote search system and methodology.

FIG. 94 is a flowchart of a process through which word-votes can be obtained from users of a search engine.

FIG. 95 is a flowchart of an alternative process through which word-votes can be obtained from users.

FIG. 96 depicts a chart of options for requiring users to submit word-votes.

FIG. 97 depicts a sample weighting schedule for weighting word-votes.

FIG. 98A depicts a flowchart of a Lexivote ranking process.

FIG. 98B depicts an equation used in the Lexivote ranking process.

FIG. 99 depicts an excerpt from a sample submission form through which a user can modify his or her word-votes.

FIG. 100 depicts an overview of databases and database relationships involved in the Lexivote and Lexary subsystems.

FIG. 101 depicts a flowchart of the process of creation, deployment and use of the Lexary subsystem.

FIG. 102 depicts an excerpt from a sample submission form through which a user can look up a definition in the Lexary.

FIG. 103 depicts an excerpt from a sample document in which approved senses of a given term are displayed.

FIG. 104 depicts an excerpt from a sample submission form through which a user may submit a new sense for consideration for approval by the user community for inclusion in the Lexary.

FIG. 105 depicts an excerpt from a sample document displaying pending proposed senses.

FIG. 106 depicts an excerpt from a sample submission form through which a user may submit a sense challenge.

FIG. 110 is a flowchart depicting a process whereby a sense is approved by the user community for inclusion in the Lexary.

FIG. 111 is a flowchart depicting a sense challenge process.

FIG. 112 is an excerpt from a sample submission form through which a user can submit a query to a Lexary-enabled USE system.

FIG. 113 is an excerpt from a sample secondary selections page for use in a Lexary-integrated USE.

FIG. 114A use a flowchart of a process whereby the Lexary-integrated USE is used.

FIG. 114B is a flowchart of a process whereby a thesaurus entry is submitted for consideration for approval by the user community for inclusion in the Lexary.

FIG. 114C depicts an excerpt from a sample document in which approved senses of given term are displayed along with a link to a document displaying thesaurus entries related to the given sense of the term.

FIG. 116 depicts an excerpt from an example document wherein a version of a UTOU agreement is displayed.

FIG. 117 depicts an excerpt from an example document wherein a UTOU-conforming local terms of use agreement is displayed.

FIG. 118 is a diagram of a link relationships between the official UTOUA and various other documents.

FIG. 119 is a flowchart depicting a process by which a "Registered Subscriber" model of the UTOU system is integrated with the UAML and UTU systems.

FIG. 120 depicts a sample UTU displaying that a website provider is a subscriber to the UTOU system.

FIG. 122 depicts an excerpt from a sample UFC-enabled document.

FIG. 123 depicts a chart of benefits of the UFC system.

FIG. 124 is a flowchart depicting a process by which the UArb subsystem is created, deployed, and used.

FIG. 125 is a diagram depicting relationships between the UET Company and two users of the UArb system.

FIG. 126 is a diagram depicting an alternative embodiment of the UArb system that includes an insurance company.

FIG. 127 is a chart of benefits of the UArb system.

FIG. 128 is an excerpt from an example web page that displays terms of a version of a Universal Arbitration Agreement.

FIG. 129 depicts an excerpt from an example certificate certifying that a user is a participant in the UArb system.

FIG. 130 depicts an embodiment of the UTU configured to display that a given website provider is a participant in the UArb system.

Figure 6B:
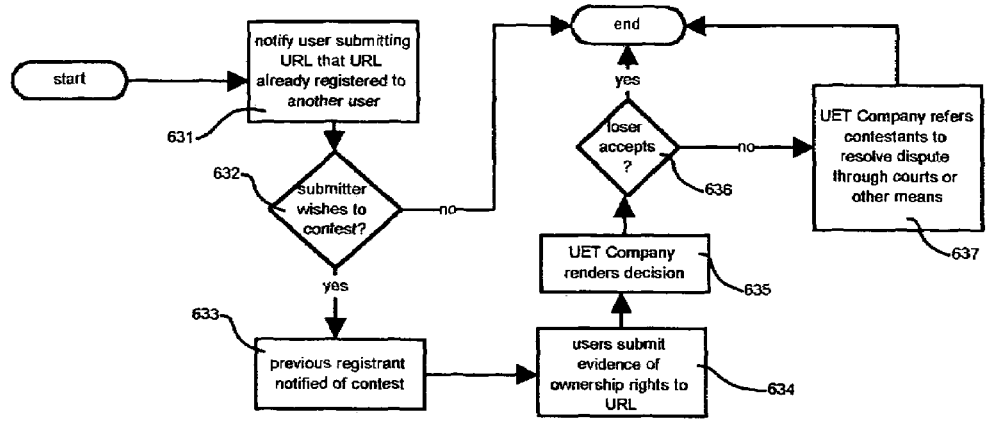
FIG. 6B depicts a flowchart of a URL conflict resolution process.

DETAILED DESCRIPTION OF THE INVENTION WITH REFERENCE TO THE DRAWINGS 1.1 Preface The Present Disclosure As is clear from the following detailed description, the disclosed invention is a subtle and complex one, including both technical innovations and broad syntheses. Every attempt has been made to render the text highly readable, avoiding lengthy restatements of known material. Toward that end, many simple examples and specific details have been provided for the sole purpose of illustration. As will be apparent to anyone of ordinary skill in the art, the disclosed invention lends itself to rich variation and alteration, yet such modification remains within the scope of the invention. Therefore, the following embodiments of the invention do not serve to limit the claimed invention but rather to teach its generality through the use of particulars.

For instance, several new markup language techniques are disclosed below. For the sake of simplicity of explanation, certain tag names are used in depicting embodiments of the invention. However, it should be clear to one of ordinary skill in the art that the disclosed techniques can be used with other tag and field names being substituted for the particular names used in this description, and that the invention can be implemented so as to conform to one or more sets of standards as established by the World Wide Web Consortium or other standards-making bodies. Since these standards change through time, this disclosure has been drafted to explain the invention itself without limiting the invention to any particular set of standards or currently popular conventions. Where possible, functional and descriptive names have been used so that this document can be most easily understood by the reader and can be translated easily and effectively into other spoken languages.

The inventor wishes to thank Brucene, Shelton, and Camille Harrison; Scott Colby Hollifield; Brad Conder; Andy Willis; Tom Brown; and the faculty, staff, and students of Memphis University School, Stanford University, and the University of Virginia School of Law.

1.2 Introduction The Universal Electronic Transaction System

Disclosed is an invention called a "Universal Electronic Transaction" (UET) system, which is to be operated by a UET Company. The UET system comprises computer hardware and software configured to execute certain steps of a disclosed UET method, which method includes both computer-implemented and human-implemented steps.

The UET system makes possible a new way of using the Internet and World Wide Web. Certain processes that were heretofore considered essential to the World Wide Web are rendered largely unnecessary, and certain inefficiencies that were heretofore considered inherent are eliminated.

Each of the four major building blocks of the UET system—namely, (I) the URLIT/UAML/UTU subsystem, (II) the Userithm/Lexivote/Lexary subsystem, (III) the UTOU/UFC subsystem, and (IV) the UArb subsystem—are modular, i.e., each building block can be successfully implemented individually without reference to the other building blocks. However, when combined to form the complete UET system, the resulting whole enjoys multiplicative advantages as the individual modules support, complement, and enhance each other.

1.3 URLIT/UAML/UTU Subsystem Overview

A central feature of the first subsystem is an innovation called a "URLIT" (a term derived from "URL" and "iteration"). The URLIT is a tool used by the UET Company and its customers ("users") to establish identity, security, and communication. Typically, a user requests a URLIT for use with respect to a specified URL, and this URLIT is embedded in a web page at the given URL. The URLIT, combined with the system within which it works, fundamentally alters the ways in which the World Wide Web can be used.

In order to be effective, the URLIT is described in markup language tags embedded in a web document. These tags are part of a disclosed "Universal Advertisement Markup Language" (UAML).

The UET Company parses the user's web page, and if this page meets certain requirements, it is accepted as a "listing." The listing can be virtually any type of advertisement—a personal ad, real estate ad, used car ad, want ad—and can even be an Internet auction listing.

When a listing is accepted, a record is created in the UET Company's relational database complex, and fields of the record are populated with UAML-tagged data in the user's web page.

Once the record has been created and populated, the user's listing can be easily found by other users. Other users can visit the UET Company website and perform a search of the UET Company's databases, which includes the record associated with the given user's web page. Since the record contains individual fields corresponding to individual UAML nodes in the user's web page, the record contains much more specific information about the given user's web page than could be extracted from an HTML page that was not UAML-enabled. Thus, a search through the UET Company site is much more precise than a search through a conventional Web-search engine.

One special type of listing deserves particular attention: the Internet auction. A UAML-enabled Internet auction listing displays real-time information, such as the current high bid, even though the web page itself is static. Display of this dynamically updated information is made possible by reference to image files hosted by the UET Company which are specific to the given listing and are overwritten each time the variables they represent change.

The URLIT also serves a crucial role in a disclosed "Universal Toolbar Utility" (UTU). The UTU is part of or works in conjunction with a Web browser such that, when a user is browsing a properly URLIT-enabled web page, the UTU serves as a communication conduit whereby the browsing user can view the web page provider's inventory and wish list, can purchase from the website provider, or can submit information to the website provider via a submission form—all through the toolbar known as the UTU. In this way, the UTU renders Web submission forms and Web purchase forms largely obsolete. It also makes possible a "universal shopping cart" such that purchases from many different websites can all be added to a single shopping cart, making time-consuming registration with each different website provider unnecessary and navigation to the website's purchase form or contact form unnecessary.

1.4 Userithm Search Engine/Lexivote/Lexary Subsystem Overview

The second subsystem provides users the power to define their own search algorithms. To achieve this effect, data input fields are grouped into clusters called "search components." In a basic embodiment, three distinct pieces of data are input by a user for each search component: (I) the term or terms to be searched, (II) a search methodology selection, and (III) a weight. Additional fields may also be included in a search component as discussed below.

When a user defines two or more search components, a separate search of the UET Company databases is performed for each component, and results of each search are scored according to the given search methodology. Then, the multiple results lists are combined into a single list according to the weights assigned to each component by the user, i.e., the results of a search under a higher weighted component have a greater effect on the final list ranking than do the results of a search under a component that has been assigned a lower weight by the user.

The Userithm search engine may also include additional fields for user input of data. For instance, users may set their own standards for a particular variable. This technique is most useful for Userithm search engine embodiments that are geared for a particular subject matter, such as real estate. For instance, in a Userithm search engine devoted to real estate, a user may assign a value of "3" to set the standard for the number of bedrooms. Units with three bedrooms score the maximum under this criterion, while units with two bedrooms or four bedrooms score lower, while units with one bedroom or five bedroom score even lower.

Users may also set their own tolerance levels for variation from standards. Thus, the user may set, in the above example, a tolerance of plus or minus one bedroom, such that units with two, three, or four bedrooms are not filtered out of search results, but units with one bedroom or five bedrooms are.

Userithm search engines devoted to specific subject matter, such as stocks, mutual funds, vehicles, real estate, personal ads, etc., may also include intracomponent weighting fields in addition to intercomponent weighting fields.

While the Userithm system has been designed to accommodate multiple pre-existing search methodologies—as well as any methodologies developed after the time of this writing—a particular novel search methodology, called a "Lexivote" method and system, is also disclosed. The Lexivote system provides a mechanism through which users can submit a word or phrase along with a website address that the user believes is a valuable resource pertaining to that word or phrase. Then, when another user submits a search query including that word or phrase, search results are scored according to such user preference submissions or "votes" such that websites receiving more votes with respect to a particular word or term are ranked higher than websites receiving fewer votes or no votes with respect to the searched word or phrase.

To take more advantage of the Lexivote system, the UET Company may also use a disclosed method and system called a "Lexary". The Lexary is an online reference tool—specifically, a combined dictionary, thesaurus, stylebook, and grammar book—in which entries and senses are submitted, maintained, and evaluated by the user community per disclosed processes.

1.5 Uniform Terms of Use/Universal Form Contract Subsystem Overview

The third subsystem streamlines UET participation while also establishing a foundation for beneficial developments in Internet law. It should be noted, however, that it is beyond the power and scope of this document and this technology to alter statutory or case law in any jurisdiction. Thus, deployment of technologies disclosed herein does not guarantee any particular judicial interpretation.

Under a disclosed "Uniform Terms of Use" system, the UET Company hosts a web page that comprises a number of generic terms that have been established collaboratively with the legal community and the user community. A website provider can, in its own terms of use agreement, "subscribe" to the UTOU version displayed in that web page, thereby incorporating by reference the terms thereof. Having done so, the website provider needs only to articulate a handful of terms that are unique to its specific website. Visitors to the subscribing website, once they have reviewed the UTOU version referenced, need only review the site-specific terms of use. Over time, numerous beneficial effects accrue to the website provider and website user communities: legal fees are saved, time is saved, and the law governing Internet usage develops in a more cohesive, predictable fashion.

One extension of the UTOU system is a disclosed "Universal Form Contract" method and system. Under the UFC system, paper contracts are written to incorporate by reference uniform terms that are hosted online by the UET Company, again creating savings in terms of legal expense, paper usage and storage, and efficient development of case law.

1.6 Universal Arbitration Subsystem Overview

The fourth subsystem streamlines UET participation by offering users broad and convenient access to the benefits of alternative dispute resolution. Users agree with the UET Company to submit disputes to alternative dispute resolution when these disputes arise with other users who have also so agreed. External parties, such as insurance companies, can also participate in the system by offering special incentives to users who participate and thereby diminish the insurance companies' exposure to litigation costs.

1.7 Subsystem Interaction

When the four subsystems are deployed together, numerous beneficial synergies arise: For instance, listings created under the UAML subsystem can be searched under the Userithm search engine subsystem; Web pages comprising these UAML-enabled listings can be provided by users who participate in the UTOU and UArb subsystems such that disputes arising out of UET usage can be handled reliably and efficiently.

1.8 General Introductory Drawings

The present invention may be more fully explained through reference to the drawings.

FIG. 1 provides an overview of the current invention construed as a method. Specifically, the present document discloses a four-step process: creation and deployment of the Universal Advertisement Markup Language (UAML) subsystem 101, including major parts such as the URLIT mechanism and the Universal Toolbar Utility (UTU); creation and deployment of the Userithm Search Engine (below) 102, including the Lexivote search methodology subsystem and the Lexary subsystem; creation and deployment of the Uniform Terms of Use (UTOU) and Universal Form Contract (UFC) subsystems 103; and creation and deployment of the Universal Arbitration (UArb) subsystem 104. Each of these steps is described in greater detail below.

FIG. 2 depicts an overview of the current invention construed as a system, wherein interaction between subsystems serves to produce a greater whole.

FIG. 3 depicts an overview of the current invention construed as an apparatus.

2.1 Detailed Description of URLIT and UAML

FIG. 4 depicts the steps necessary for creation and deployment of the UAML subsystem. As will be clear to anyone of ordinary skill in the art, the depicted steps can be performed in an order that differs from that depicted. URLIT software for processing URL submissions and assigning URLITs is developed 401 so as to execute steps depicted in FIG. 7A and exemplified in FIG. 7B. UAML vocabularies and standards for well-formed UAML and valid UAML documents of different types ("UAML listing document type definitions" or "LTDs") are established 402; example vocabularies appear in FIGS. 55 through 57H. A complex of relational databases needed to manage information used in the UET system is created 403; major databases and relationships are depicted in FIG. 16. Next, a validating UAML parser and related software for mapping data extracted from UAML-enabled documents to appropriate fields in records in the UET Company's relational databases as exemplified in FIG. 15 are created 404.

Although it is not necessary for the UTU to be included in the UAML subsystem, the benefits of this feature are significant and desirable. If the UET Company chooses to include the UTU 407, then software for performing functions such as those depicted in FIGS. 37 through 54 is developed 406. An electronic payment and bonding system such as that disclosed in U.S. patent application Ser. No. 09/848,639 by Harrison (hereinafter, "Harrison bonded payment system") is developed or integrated with the remainder of the UET system 405.

Next, internal and external interfaces for UET Company staff and the general public of users respectively are created 408, including integration with, inter alia, the Userithm Search Engine and the EQML techniques discussed below Thereafter, the UAML subsystem is made available to the public, and standards for the use of UAML and participation in the UET system in general are disseminated 409. Finally, the UAML subsystem is continually improved through experience and suggestion 410.

Usage of the UET system by the public begins with a user registration and account creation process depicted in FIG. 5. Visiting the UET Company website 501, the user submits required information 502, including first and last name, address, e-mail address, password, and other contact or identification information, and, presuming the submission is complete, a new record is created in the registered users database to establish the new user's account 503. If the user wishes to buy and/or sell through the UET system 504, he or she may also be required to submit financial information, such as credit card numbers, Social Security numbers, bank account information, electronic funds transfer information, and credit references, and, for larger transaction volumes, purchase a bond through a mechanism such as the Harrison bonded payment system 505.

A process for listing an ad (e.g., an Internet auction, job listing, real estate listing, registered UTOU listing, or other listing) through the UET system is depicted in FIG. 6A. A user logs into his or her account with the UET Company 601. If the listing is to appear at a URL that has not previously been registered to the user's UET account 602, the user submits the exact URL of the page where the listing is to appear 603. This URL is compared to all URLs currently registered in the UET system 604, and if a conflicting registration exists 605, a URL conflict resolution process is followed 606 as depicted in FIG. 6B. If the URL submitted is not currently registered to someone else 605, the submitted URL is added to the user's account as a registered URL 607.

Next, a unique alphanumeric character string called a "URLIT-stem" is assigned to the newly registered Web address 608. The URLIT-stem may be randomly generated or can be the product of a predetermined URL-conversion algorithm, but no two URLIT-stems should be identical to each other.

When the user is ready to use the registered URL for a listing, the user requests a URLIT for use in the new listing 609. The URLIT is produced by adding a serial number to the URLIT-stem 617, and the URLIT is provided to the user 617. The serial number added to the URLIT-stem to produce a URLIT must be unique with respect to that URLIT-stem but need not be unique with respect to other URLIT-stems. Thus, the first serial number to be applied to the URLIT-stem can simply be a "1". The second time a URLIT is requested for the same URLIT-stem, the serial number applied to the URLIT-stem can be simply "2".

Figure 12A:
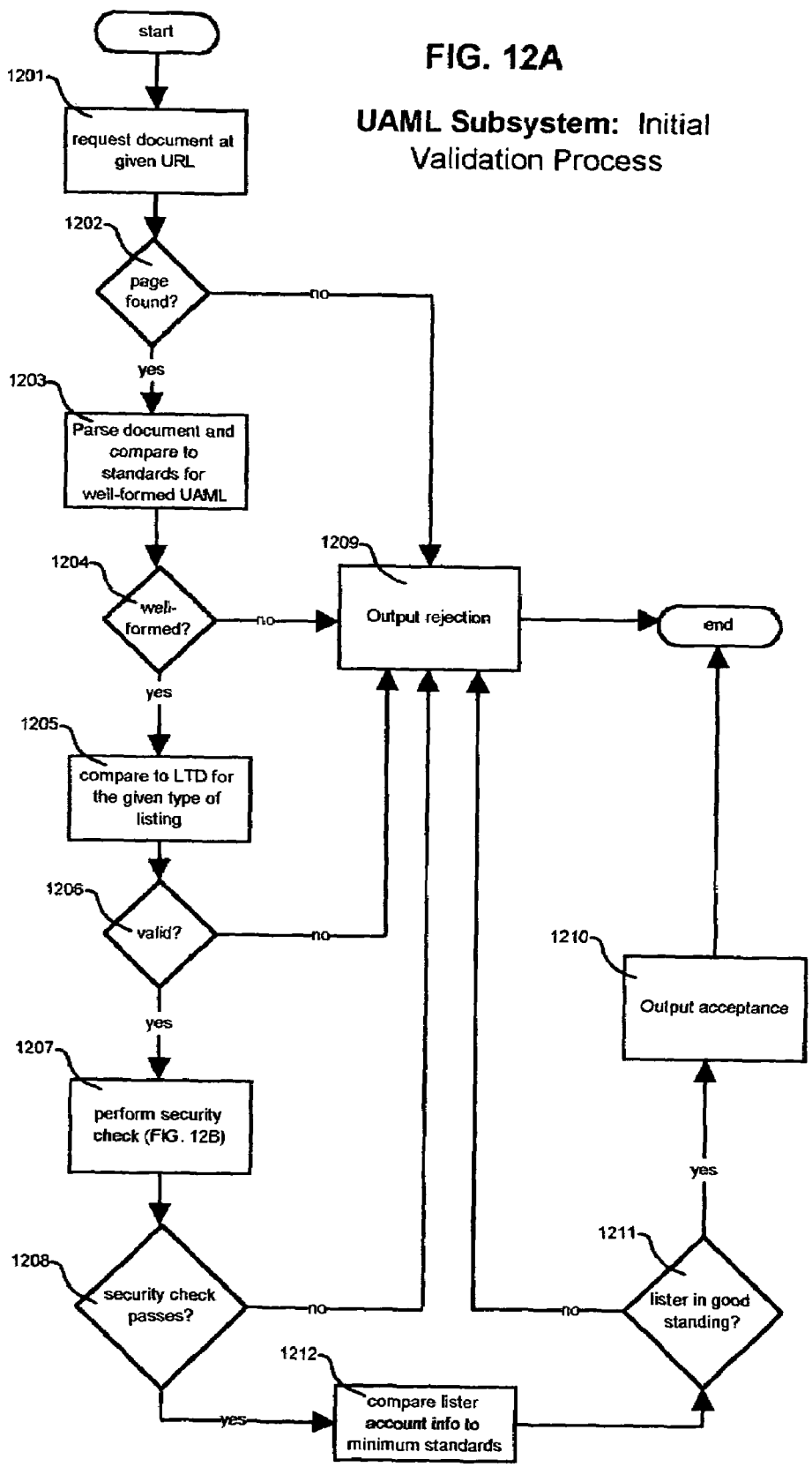
FIG. 12A depicts a flowchart of a process whereby documents submitted for use within the UAML subsystem are validated.

Equipped with the new and unique URLIT, the user creates a UAML-enabled Web page (an HTML document) in which the URLIT is included per UAML standards 618. The user then uploads this page to his or her website 619. The user then logs into his or her UET Company account and submits the listing for activation 620. An initial validation process, depicted in FIG. 12A, is followed to determine whether the listing is accepted for inclusion in the UET system 621. If accepted 610, a new record is created in a Central Listings Database 613, this record including fields such as those depicted in FIG. 14. The UAML parser software then extracts the UAML-tagged data and maps this data to corresponding fields in the Central Listings Database and a subject-specific database that corresponds to the particular type of listing 614, if any, specified in the listing. The subject-specific database and the LTD applicable to the listing are identified in a "UAML type" element, for which example data appears in FIG. 13. Data in UAML elements are extracted and entered into the corresponding fields in the UET Company database as exemplified in FIG. 15.

An identical copy of the page in which the new listing appears is stored in the snapshots database 615 for use in a later comparison, such as a comparison used in a process for confirming continued validity of the listing, depicted in FIG. 19A.

Since the listing appears on the user's own website, the user is free to promote the web page and listing by whatever means he or she deems appropriate, including submission of the given URL to search engines not affiliated with the UET Company 616. In this way, the easy capturing of a static web page is combined with the power of field-by-field searching and the database-driven flexibility of dynamically generated content as described below.

FIG. 6B depicts the steps of the URL conflict resolution process. First, the user who has submitted a URL already registered to another user is notified of the conflict 631. If the submitting user indicates that he or she wishes to contest the prior registration 632, the prior registrant is notified of the contest 633. Both parties may then submit evidence of their ownership rights in the URL 634 to the UET Company. The UET Company then renders its decision 635 based on the evidence submitted. If the loser accepts 636 the decision of the UET Company, the conflict has been resolved. If not, the UET Company refers the opposing parties to resolve the dispute by other means 637. Such disputes can often be resolved by simply testing access: a person who is unable to access a given URL—by uploading a URLIT-enabled web page, for instance—is not likely to be the rightful owner thereof, especially if the opposing user does have such access. However, it is possible that two conflicting parties could have access to the same URL, a situation which renders the "access test" unhelpful.

Figure 7A:
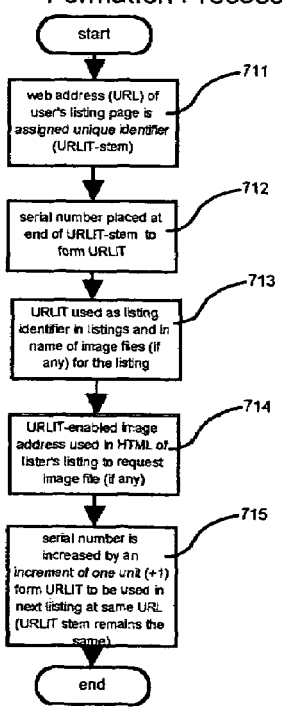
FIG. 7A depicts a flowchart of a process by which a URLIT is assigned to a Web address, used in an image location, and otherwise used to enable the UAML system.

The URLIT formation and usage process is separately depicted in FIG. 7A. First, after the user has submitted the URL of the document in which a listing is to appear, a unique identifier is assigned to this location 711. This unique identifier is the URLIT-stem. When the user wishes to activate a listing at the URL, he or she requests a full URLIT for use in the listing; this full URLIT is created by adding a serial number to the given URLIT-stem 712. The user then embeds the URLIT in UAML tags per UAML standards so that his or her listing can be validated and made active 713. The URLIT also serves as a portion of the filename for any image files required for a valid document of the chosen type of listing 713. For instance, typically five image files are required for an auction listing; the names of these five image files can simply be the URLIT plus a letter (e.g., a, b, c, d, and e). The URL of each image is used in the web page that includes the listing so that when this web page is called, the image is also served 714. When the user decides to remove the listing and put a new listing up at the same Web address, he or she requests a new URLIT, which is created by replacing the prior serial number with the next incremental serial number 715.

Figure 7B:
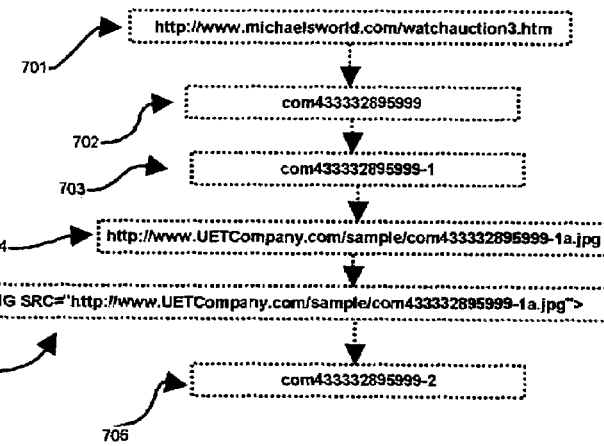
FIG. 7B depicts an example URL and URLIT information associated therewith.

FIG. 7B illustrates the process in FIG. 7A through example. Here, an example URL has been submitted by a user 701. A unique identifier, the URLIT-stem, is then assigned to this URL 702. When the user requests a URLIT for use in a listing, a serial number is added to the URLIT-stem to produce a complete URLIT 703. This URLIT is then, in some cases, used in the name of a unique, dynamically updated image file that resides on the UET Company's servers 704 such that the user has no control over the content of this image. In such cases, when the user creates the web page in which his or her listing is to appear, he or she includes an HTML image reference to this file 705 so that it can serve as a dynamic indicator of the current high bid, number of bids, or other variable content as described in more detail below in FIGS. 18A and 18B. When the user subsequently decides to reuse the given URL for publishing a different listing, he or she requests a new URLIT, which is provided 706 by replacing the serial number of the previous URLIT with the next incremental serial number. The new URLIT serves to uniquely identify the new listing. Creation of a UAML-enabled web page can be handled in many ways, as depicted in FIG. 8. If a user wishes to tag data by hand 801, he or she may do so 808. Otherwise, the user may visit the UET Company website 802 where he or she may choose 803 between downloading a UAML editor for stand-alone use on a local computer 805, such as a laptop or desktop, or simply entering all data to be included in his or her listing into a form on the UET Company site and submitting it 804. An example 1001 of such a submission form appears in FIG. 10. This Web-accessible UAML generator returns a UAML-enabled web page to the user 807 by whatever means is preferred, either providing the marked up text on the Web or via e-mail. When properly submitted, UET Company software adds HTML and UAML tags to the user-submitted information so as to produce a document such as that which appears in FIG. 11. The stand-alone UAML editor serves as a typical HTML editor with the added functionality of generating UAML tags so as to produce a UAML-enabled web page 806. It may also include an automatic means of requesting URLITs, validating UAML documents, etc.

FIG. 9 depicts the end result of the process in FIG. 8: a basic UAML-enabled web page as displayed in a typical browser, such as Netscape or Internet Explorer. A link 901 to the UET Company through which the UET system is made possible is provided, as well as a link 902 to the UET Company web page that corresponds to the user's listing, e.g., FIG. 27 (a listing that is not an auction will be represented on the UET site by a page that is similar to that depicted in FIG. 27 in that it displays information drawn from the UET Company database records pertaining to the given listing except that no data entry fields through which a bid can be submitted appear in the page, being unnecessary to a non-auction listing). The listing user, identified by a registered user ID 908, has specified that payment will be processed through the UET Company 903. A link to the web page on the UET Company site through which a bidder can place a bid is also provided; such a web page is depicted in FIG. 27. Five URLIT enabled images—time remaining 910, sellers feedback rating and bond margin gauge 909, current high bidder 907, current high bid 904, and number of bids 905—also appear in the listing document, along with an item description and other information. An excerpt from the source code of the web page depicted in FIG. 9 appears in FIG. 11; such a document 1101, as is plain, includes both HTML tags and UAML tags. The disclosed UAML system takes advantage of the standard Web browser practice of ignoring unrecognized tags, so that the UAML functionality can be added to a web page without the appearance of the page being affected. The user ID of the seller 908 appears next to the feedback rating image 909, and a link 906 to a bid page 1001 appear in the listing page 900.

Note that the UAML tags describe only parts of the data, namely, that which is to be extracted for replication in the UET Company databases. Thus, much of the data in the document is "invisible" from a UAML perspective, just as the UAML tags themselves are ignored by a Web browser when displaying this page as shown in FIG. 9. By design, however, the data that is described within UAML tags also appears in some form in the web page as displayed by browser. UAML-tagged text is text that is also displayed as text in the browser, and the UAML-tagged image files are displayed as images in the Web browser. In other words, not all data that is relevant from an HTML perspective is relevant from a UAML perspective, but most if not all data that is relevant from a UAML perspective is also relevant from an HTML perspective in this document. Such is the preferred relationship between UAML data and HTML data; preferably, UAML tags should not include attributes, for instance. Data to be captured by a UAML parser should be visible through the Web browser so as to minimize the likelihood of a discrepancy between crucial information seen by a website visitor and that "seen" by a UAML parser. Thus, for instance, a validating UAML parser may be configured to ignore any UAML tags appearing in HTML "comment" tags, since the data within such tags may be ignored by a Web browser in displaying the document.

Since the web page 900 is hosted on the user's website—either on a computer owned and operated by the user or one which belongs to the website hosting company from which the user rents Web space—and therefore under control of the user, the user can modify the appearance of the web page 900 to suit his or her business branding needs and personal aesthetic preferences so long as the UAML standards for validity of a document are not violated. Such complete user control of the appearance of an auction listing is not possible under the related art systems in which the appearance of auction listings is set by the auctioneer.

While the web page is static, the image files serve as dynamically changing indicators by virtue of the process depicted in FIG. 18A, producing the effect depicted in FIG. 17. When a listing is made active 1801, the relevant fields of the database record in the auction listings database in the UET Company relational database complex are queried to retrieve the current values of the fields 1802.

Specifically, the current high bid field, the current high bidder field, and the other fields which can change during the course of the auction are queried, and the current values of each of these fields is converted to an image file 1803. Each resulting image is named per the URLIT filename step described above and stored at the appropriate image location 1804 so that when the user's auction listing web page is requested 1805, these dynamically updated images are returned for display in the requesting browser 1806.

Whenever a new bid is submitted, data in the relevant fields changes 1808. When the data in these fields changes, these fields are queried 1802, and a new image is created displaying the new value of the data in each of the relevant fields 1803. The old image is overwritten with the new image 1804 using the same file name and location. The process is repeated until the listing is no longer active 1807. For illustration, FIG. 18B depicts an image file 1813 (e.g., jpg or gif file) which displays the value of the current high bid field at time 1. After a higher bid has been submitted (time 2), the value of the current high bid field changes and a new image 1814 is created and replaces the old image 1813.

The net effect is that the features of a dynamically generated web page can be replicated through a static web page. As shown in FIG. 17, the static web page 1701 is hosted on the user's website host servers 1704, while each image 1702 serving as a variable real-time indicator is hosted on the UET Company's servers 1703. This image file is overwritten with a new image at the same file location each time the information it portrays changes as per the process depicted in FIG. 18A. Thus, each time the static web page is requested, the latest value represented by the image is presented to the user. The user cannot control the content of the image or delete the image 1702, since it is hosted on the UET Company's servers 1703. Also, while the information appears in an image file 1702 in the web page itself 1701, the underlying data is still stored as a value by the UET Company, a more searchable form.

FIG. 12A depicts the initial validation process used during the basic listing process of FIG. 6A to determine whether the listing submission is accepted or rejected 621. Specifically, UET Company software requests the file located at the submitted URL 1201. If the page is found 1202, then the document is parsed and compared to the standards for well-formed UAML 1203, which includes syntactical requirements as well as the requirement that a URLIT be present in the document and tagged as such. If well-formed 1204, the document is then compared to the LTD for the specified type of listing 1205. If the document is valid 1206 under the given LTD, the security check process of FIG. 12B is performed 1207. If the security check passes 1208, then the registered user account of the submitting user is compared 1211 to the minimum standards for acceptance of a listing 1212. For instance, if the submitting user currently has a past due balance owed to the Company or is otherwise delinquent in his or her responsibilities to the UET Company or another registered user, his or her submission will be rejected 1209. If all facets of the validation process are passed, then the listing is accepted 1210.

FIG. 12B depicts the UAML security check process used 1207 in the initial validation process of FIG. 12A. First, the URLIT appearing in the submitted web page is compared to the active URLITs in the UET Company databases 1221. If the URLIT in the submitted page is existent and active (e.g., not expired) 1222, the URLIT is compared to registered URL information in the UET Company databases 1223. If the web page in which the URLIT is being used appears at the same URL for which the given URLIT was issued 1224, then the user ID specified as that of the lister in the listing is compared to the user ID associated with the registered user account to which the URL is registered 1225. If the lister matches 1226, then the image names and locations in the web page are compared to the image names and locations associated with the given URLIT 1229 if applicable. If any security comparison fails, the security check fails 1227. If all succeed, the security check passes 1230.

FIG. 13 depicts a chart of sample data choices which may be appropriate for designation of a given type of listing in the "UAML type" element. Each of these choices typically specifies a different database within the UET Company database complex, a different LTD, and sometimes a different vocabulary that is used by valid documents of the given listing type.

FIG. 14 depicts some of the fields occurring in records of a specific database within the UET Company's relational database complex, the central listings database. These fields include the URLIT, the listing type, the user ID of the lister, etc. UAML-tagged data in a document is extracted by UET Company parsing software and input into the corresponding field in the appropriate database within the UET Company database complex as illustrated in abstract form in FIG. 15. The URLIT field may be used as the "key" field whereby records of the central listings database are related to records in other databases; the listing user field may serve as the key in other relationships.

FIG. 16 depicts the UET Company relational database complex such that primary databases and important relationships between certain databases are represented. As is plain to one skilled in the art, additional databases may and should be used to supplement those depicted in order to effectively serve the purposes of a given implementation of the disclosed UET system. Moreover, a limited deployment of the current system could be effectively implemented without reference to some of the depicted databases. For instance, the UET Company may not wish to serve user demand for personal ads and would therefore have no needs for a personal ads database.

Figure 20:
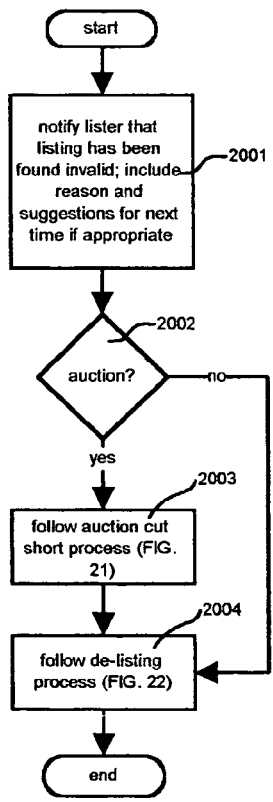
FIG. 20 depicts a flowchart of a process for invalidating a listing.
Figure 21:
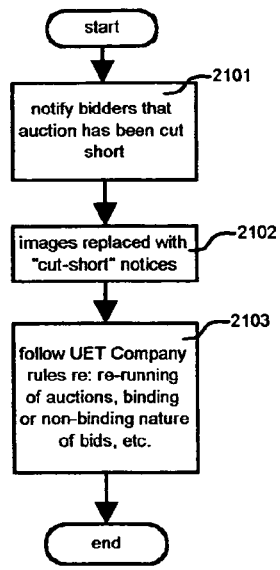
FIG. 21 depicts a flowchart of a process for cutting short an auction.
Figure 22:
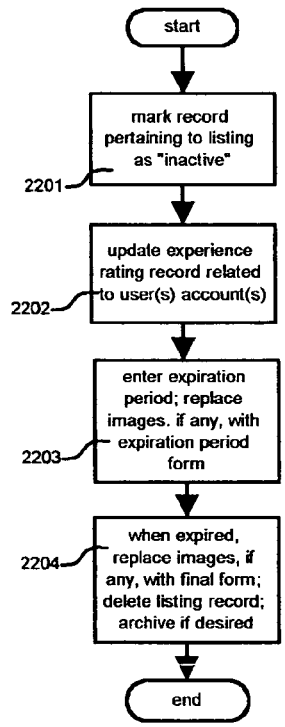
FIG. 22 depicts a flowchart of a process for delisting a listing.

FIG. 19A depicts the process by which the continued validity of a listing is confirmed. At predetermined times, such as those suggested in FIG. 19B, the URL associated with an active listing is requested 1901. If the page is found 1903, the page currently appearing at the URL is compared with the document stored in the snapshots database associated with this listing 1905. If the page cannot be found, is no longer well-formed and valid 1910, or one or more prohibited alterations have been made 1912, then the listing invalidation process depicted in FIG. 20 is followed 1911. Also, if a page is temporarily unavailable and later found but the temporary absence is considered unacceptable for the type of listing (e.g., an auction listing was unavailable during the hour prior to close) 1907, the listing invalidation process in FIG. 20 is also followed 1911. If the listing has expired (e.g., the auction has closed) 1909, then the delisting process depicted in FIG. 22 is followed 1906. Pages that are not initially found 1903 are requested 1902 again periodically for a predetermined period of time, and if not found 1904, the remainder of the invalidation process is followed 1911; pages that have not been altered 1908 need not be re-examined 1910 for well-formedness. If a listing has been found invalid through the process depicted in FIG. 19A, the lister is notified 2001; if the item is an auction 2002, the auction cut short process depicted in FIG. 21 is followed 2003; if not 2002, the delisting process depicted in FIG. 22 is followed 2004.

When an auction that is currently running is found to be invalid, special measures must be taken, since the contractual obligations undertaken by seller and any bidders were premised on a particular closing time, one which will not be reached when the auction is cut short. Thus FIG. 21 presents the process used in cutting short an auction. After the listing invalidation process depicted in FIG. 20 has been followed, bidders are also notified that the auction has been cut short 2101. All URLIT-enabled image files associated with the listing are overwritten with "auction cut short" notices so that any subsequent viewers can be so informed 2102. Business rules established by the given UET Company are applied regarding whether the auction can be restarted, etc. 2103.

All listings, whether delisted by the user's choice or by the UET Company for some reason, eventually go through the delisting process depicted in FIG. 22. Records pertaining to listings being delisted are marked as inactive so that they are no longer included in the records searched through user submitted search queries 2201. The lister's experience rating, such as that used in the Harrison bonded payment system, is updated to reflect any events that may have caused the delisting or may otherwise affect the registered user's experience rating 2202. The listing then enters a period of expiration during which period any image files, such as those used in an auction listing, display information indicating that the listing has closed but also displaying the final values (i.e., the winning bid) so that the parties to the auction can still refer to the images 2203. Finally, when the expiration period has ended, the listing is officially expired and the images, if any, are replaced with their final form, which can be whatever the UET Company chooses, such as a UET Company banner ad 2204. The relevant database records are deleted and archived or otherwise handled as the UET Company wishes 2204.

Figure 23:
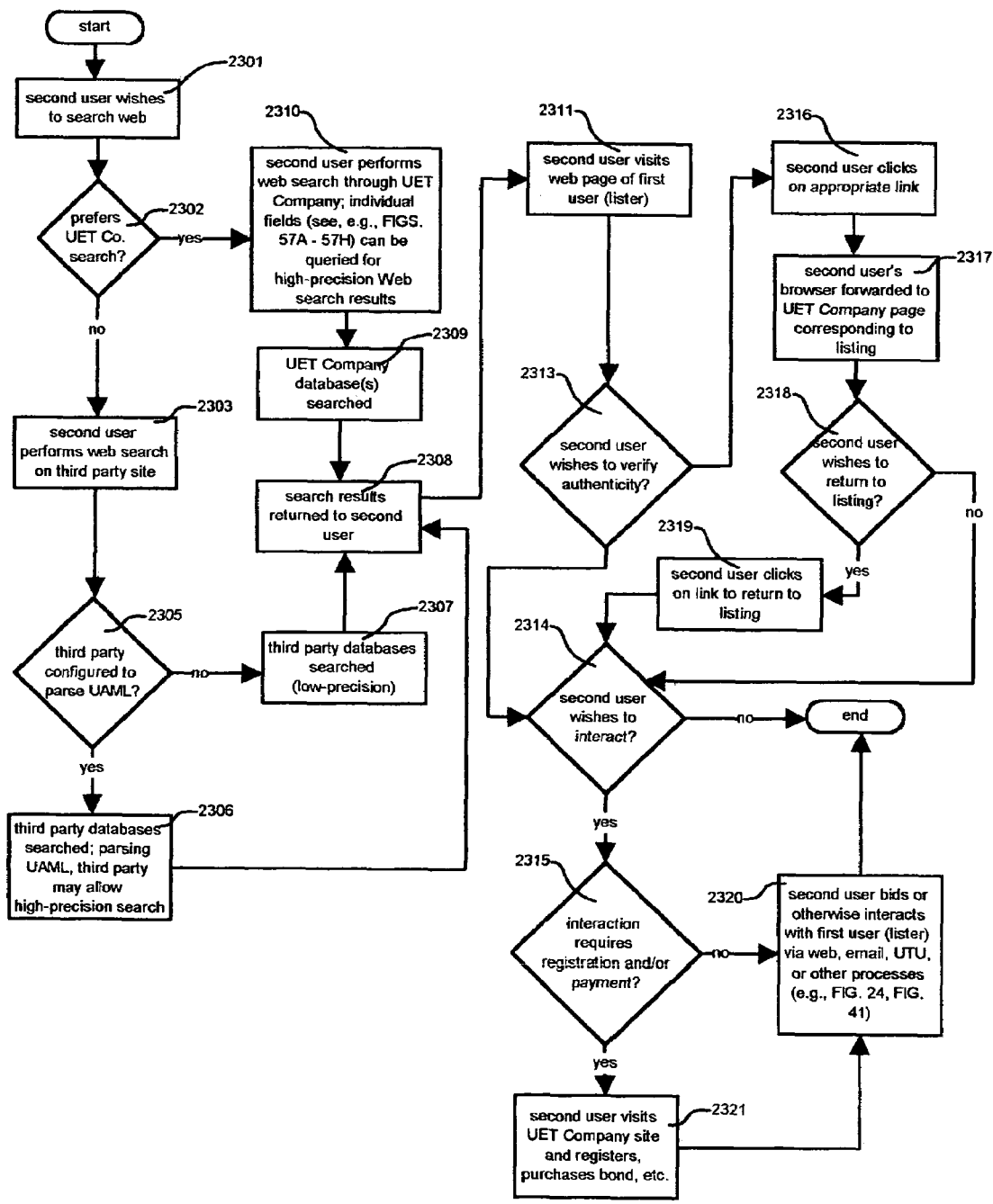
FIG. 23 depicts a flowchart of an example usage scenario.

FIG. 23 depicts the steps that may occur in a given usage case. For example, considering the lister to be a first user, a second user wishes to search the Web 2301. The second user chooses 2302 to perform a Web search through the UET Company 2310 so as to search the Company's databases 2309, or the user may search through a third party website 2303, which may or may not be configured 2305 to parse UAML. In either case 2306, 2307, search results are returned to the second user 2308 who then clicks through to view the lister's web page including the listing 2311 which includes UAML-tagged data, although the UAML will not be visible to a visitor unless he or she examines the actual source text of the given web page. If the second user wishes to verify the authenticity of the listing or find out more about the lister 2313, the second user clicks the appropriate link appearing in the web page 2316 and thereby visit the UET Company website, specifically, the dynamically generated web page associated with the given listing 2317 and incorporating certain information as stored in the UET Company databases. Thereafter, if he wishes 2314, the second user interacts 2320 with the lister via the web page by following the auction bidding process depicted in FIG. 24, for instance, or via the UTU, e-mail, or other mechanism or process 2320. The user may also return, if he wishes 2318, to the listing 2319. Some actions, such as bidding, may require registration and purchasing of a bond 2321.

FIG. 24 depicts an auction bidding process for use in the UET system. After having visited the listing page 2401, a potential bidder clicks through to the UET Company site 2403 where he or she views a dynamically generated web page, such as the example depicted in FIG. 27, that presents auction information as stored in the UET Company databases. Here the user reviews the auction information, and if he or she wishes to bid, the buyer registers if necessary 2405 and logs into his or her UET Company account 2409. Presuming that the buyer is in good standing 2408, the buyer then may submit his or her bid via a bid submission form such as that depicted in FIG. 27, which depicts an excerpt from the dynamically generated web page that displays content from a database record associated with the listing 2701; clearly, this web page resembles conventional Internet auction listings, since it, unlike a UAML-enabled static web page, is a dynamically generated page. Upon submission of a bid, the database record pertaining to the given auction listing is updated 2406 and images are replaced 2411 per the process depicted in FIG. 18A. Bid confirmation notices, outbid notices, etc., and other optional processes are followed 2412.

When the auction ends 2501, the auction completion process in FIG. 25 is followed 2413, namely: if there is no winning bidder 2502, the bidder is notified 2503 and the delisting process is followed 2506; if there is a winning bidder 2502, the parties are notified 2504, any disputes or process 2505, and the delisting process is followed 2506.

To summarize, the basic information flow for usage of a URLIT includes the steps:

The first user submits a URL to the UET Company

The UET Company assigns a URLIT-stem to the URL

The first user requests a URLIT

The Company adds a serial number to the URLIT-stem to produce a URLIT

The UET Company provides the first user the URLIT

The first user embeds the URLIT using UAML tags in a UAML-enabled HTML document

The first user uploads the document such that it appears at the URL associated with the URLIT The first user notifies the UET Company that the listing is ready The UET Company requests the document at the URL The UET Company parses, validates, and authenticates the document The UET Company inputs data extracted from UAML-tagged elements in the document into corresponding fields of database records the UET Company notifies the first user that the listing is active A second user performs a search through the UET Company Search results are returned to the second user The second user requests the document containing the first user's listing The document (hosted by the first user's hosting service) is served to the second user, along with any URLIT-enabled images (hosted by the UET Company), as in the case of a UAML auction If the second user is using a UTU and the first user has created a wish list, inventory list or other UTU content, this content is made available to the second user through the UTU (see below)

If the listing is a UAML auction and the second user wishes to bid, the second user requests the UET Company site page associated with the given listing, reviews the information therein, and submits his or her bid The URLIT-enabled images are updated to reflect the new high bid, number of bids, etc.

When the auction closes, the first and second users are notified that the transaction identified by the particular URLIT has been consummated If the first and second user are bonded and electronic funds transfer information is correct, payment is wired from the second user's account to the first user's account instantaneously upon the close of the auction If a dispute arises, the aggrieved user visits the UET Company site and opens a dispute claim specifying the transaction by URLIT If the first user wishes to reuse the URL for another listing, he or she requests a new URLIT for use with the URL and process begins again Note that this overview is meant to cover the highlights of a URLIT's lifespan. Various peripheral steps are not explicitly mentioned, such as the periodic revalidation of the UAML-enabled web page containing the user's listing, periodically updating the "time remaining" image file, etc. Additional URLIT-related processes and criteria can be established, such as automatic expiration of a URLIT after a predetermined period of time has elapsed.

Management of a user's listings is handled through the "My Registered URLs" page associated with the given user's account as depicted in FIG. 26. Information may be displayed as shown in columns, including a URL column 2601 where each item is linked to the given URL itself; a URLIT-stem column 2602; an active URLIT column 2603, where each item is linked to the record in the given UET Company central listings database associated with the given URLIT; and various columns associated with the UTU described below, including the inventory list column 2604, which displays which inventory list is assigned to the given URL; the wish list column 2605; the UTU contact form column 2606; and the UTU auction column 2607.

Figure 28A:
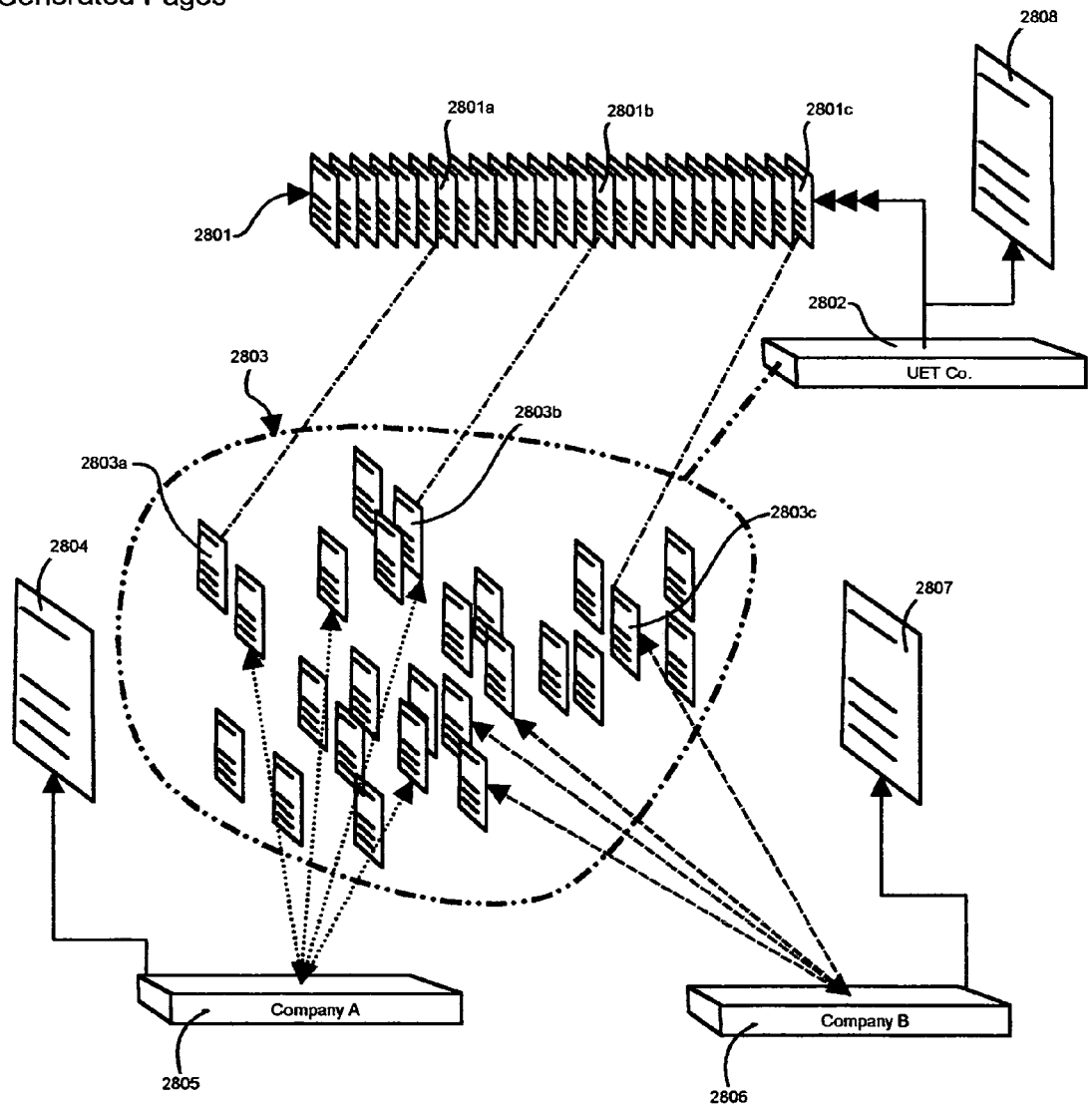
FIG. 28A is a diagram of a relationship between UAML-enabled listings under control of users and related pages under control of the UET Company, and a relationship between the listing pages and third party companies.

FIG. 28A depicts a diagram of the relationship between user-hosted UAML-enabled web pages containing listings and corresponding pages dynamically generated by the UET Company in response to browser requests. Depicted are a group of UAML-enabled pages 2803, each of which contains an active listing. These pages 2803 have been parsed and validated by the UET Company's computers 2802, and a record has been created in the UET Company's databases for each listing. The UET Company's databases can be searched through the UET Company's search page 2808.

For each listing 2803 a corresponding dynamically generated page 2801 can be requested through the UET Company site. For instance, suppose that a particular web page 2803a is an auction listing, similar to that depicted in FIG. 9. If a visitor wishes to bid, he or she requests the corresponding page 2801a on the UET Company site, which appears similar to the page depicted in FIG. 27.

Notice that other companies can also collect data from the UAML-enabled pages 2803, since the markup tags can be parsed by anyone. Thus, for example, Company A may collect and store some data on its computers 2805 from some UAML-enabled pages, while Company B catalogs other pages on its computers 2806. Each of these companies may in turn publish data pertaining to or links to these pages through its own Company website page 2804,2807. Examples of the types of web pages that could be effectively produced by third parties using information derived from UAML listings appear in FIGS. 28C through 28E.

Figure 28B:
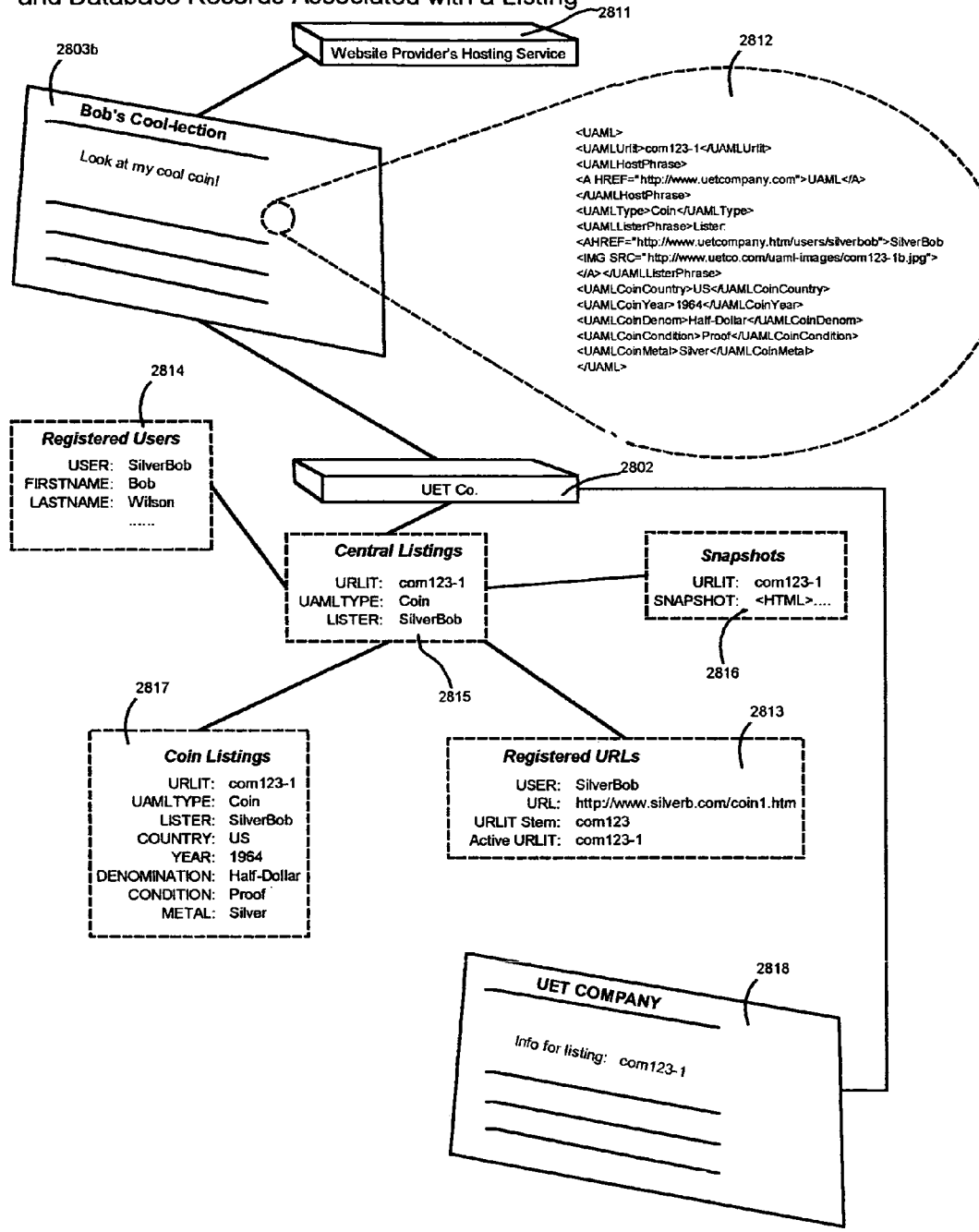
FIG. 28B is a diagram of an example UAML-enabled web page including a listing and various databases that include a record related to this listing.

FIG. 28B presents a more detailed view of information relationships underlying FIG. 28A. A given user's web page 2803b is hosted by a Company C's Web server 2811. Included in this user's web page 2803b are a number of UAML tags 2812 describing the data in the web page (most of the HTML within which these UAML tags are embedded is not shown for the sake of simplicity of this example; see FIG. 11 for fuller context). The UET Company computers 2802 request the web page 2803b and parse the UAML data 2812. Security check is made with reference to the registered URLs database record 2813 pertaining to the URL of the given web page 2803b and the given registered users database record 2814 pertaining to the registered user to whom the URL is registered. When the listing is approved, a record is created in the central listings database 2815, a copy of the web page is stored in the snapshot database 2816, and a record is created in the subject-matter-specific database 2817 (the coin listing database in the depicted example) and related to the central listings database record 2815 by the URLIT field. When requested, the UET Company computers 2802 serve a dynamically generated web page 2818 that incorporates the data stored in the company databases, e.g., FIG. 27.

FIG. 28C depicts an excerpt from a web page created by a third party, not the UET Company, that has parsed the UAML-tagged data out of various listings of a particular type, in this case, poems, that have been published by users through UAML-enabled web pages on their own websites. FIG. 28D depicts an excerpt from another third-party-published web page, in which data has been extracted and analyzed and then published in statistical form.

Although a third party would not have the full control and security benefits of the URLIT system, it is nonetheless fully possible for a third party to parse UAML-enabled pages, index them, publish its own site and provide its own high-precision search engine. FIG. 28E depicts an excerpt from a web page through which visitors can submit a query for such a search. Such transparency provides a significant advance over the "proprietary data" model used in the related art.

2.2 Revenue Models for Use with the UAML System

Several different revenue models are possible: FIG. 29 depicts a model in which listings are required to carry banner ads for which advertisers pay the UET Company 2903. FIG. 30 depicts a model in which users pay a fee for payment processing 3003. FIG. 31 depicts a model in which users pay a fee to search listings through the UET Company, paying either on a search-by-search basis or on a subscription basis 3102. FIG. 32 depicts a model in which users pay a fee to list a listing either on a per-listing basis or a subscription basis 3202. FIG. 33 depicts a model in which data gained about listings and users through the UET system is sold to third parties for research or marketing purposes 3303. FIG. 34 depicts a model in which revenues are generated through advertising related to the search engine, either through paid advertisements thereon, payments to be included in search results, or other methods 3404. FIG. 35 depicts a model in which sellers and/or bidders must purchase a bond through the UET Company before being allowed to place listings offering something for sale 3503. FIG. 36 depicts a model in which access to certain UET services is contingent upon user agreement to participate in opt-in marketing campaigns (e.g., to receive e-mail advertisements), for which advertisers pay the UET Company 3601.

2.3 The Universal Toolbar Utility (UTU) Subsystem

FIG. 37 depicts a "screenshot" of an embodiment of the Universal Toolbar Utility (UTU). The UTU can be integrated into a Web browser or operated in conjunction with a Web browser. The UTU leverages the URLIT system to provide a large number of services directly through the toolbar that have conventionally been provided only through web pages.

The UTU 3701 depicted in FIG. 37 shows the URL of a web page in the address field 3702 as in a typical Web browser. Additionally, however, the user name of the site provider 3703, the bond margin gauge 3704 corresponding to the site provider's UET Company account, and the site provider's feedback or credibility rating 3705 also appear. A link 3706 to display the given site provider's inventory list and wish list and a link 3707 to display a contact form through which the site provider can be contacted are also supplied.

In this way, several pieces of information that may or may not be available in the particular web page being browsed at a given time are nonetheless readily available through the toolbar.

FIG. 38 depicts steps whereby the UTU serves its function. A UTU user acquires and installs the UTU 3801. As in some common forms of toolbar or instant messenger software, the UTU establishes a-live data connection to the UET Company computers when the UTU user is online 3802. The UTU transmits the URL of a web page currently being browsed by the UTU user 3803. If the given URL is registered in the UET company databases 3804, the document at the URL is requested, parsed, and checked for continued validity 3805. Note that, as described below, a page need not include a listing in order to be valid for UTU purposes.

If the page is valid for UTU purposes 3806, the additional information such as that depicted in FIG. 37 is transmitted from the UET Company computers to the UTU installed on the UTU user's computer 3807. The user of the UTU can ignore the additional information in the toolbar and continue Web browsing as usual, or can click on one or more of the additional information links, so as to expand the toolbar 3809 and view the inventory list, wish list, submission form or other in-toolbar content associated with the given URL 3812. An example of the expanded UTU appears in FIG. 39. If the UTU user wishes to interact with the website provider 3811, he or she follows the appropriate process for contacting, purchasing from, or bidding on the auction of the website provider through the UTU 3810.

FIG. 39 depicts the UTU in expanded form. As shown, the inventory that the given website provider has associated with the given URL through the inventory/wish list creation process depicted in FIG. 40A appears, allowing the UTU user to check those items which he or she wishes to buy and add the checked items to the UTU "universal shopping cart" through the process depicted in FIG. 41. The total value of items currently in the UTU user's cart—items which have been added to his or her cart from other vendors' inventory lists that he or she has viewed earlier in the given browsing session—is also shown, and he or she can click the appropriate link to display the other items in his or her cart.

Also visible is a wish list that the given website provider has associated with the URL in the UET Company's databases. If the UTU user wishes to respond to the website provider's wish list, letting the website provider know that the UTU user has something that the website provider wants, the UTU user simply clicks the "offer your item" link to display the website provider's contact form.

Figure 40A:
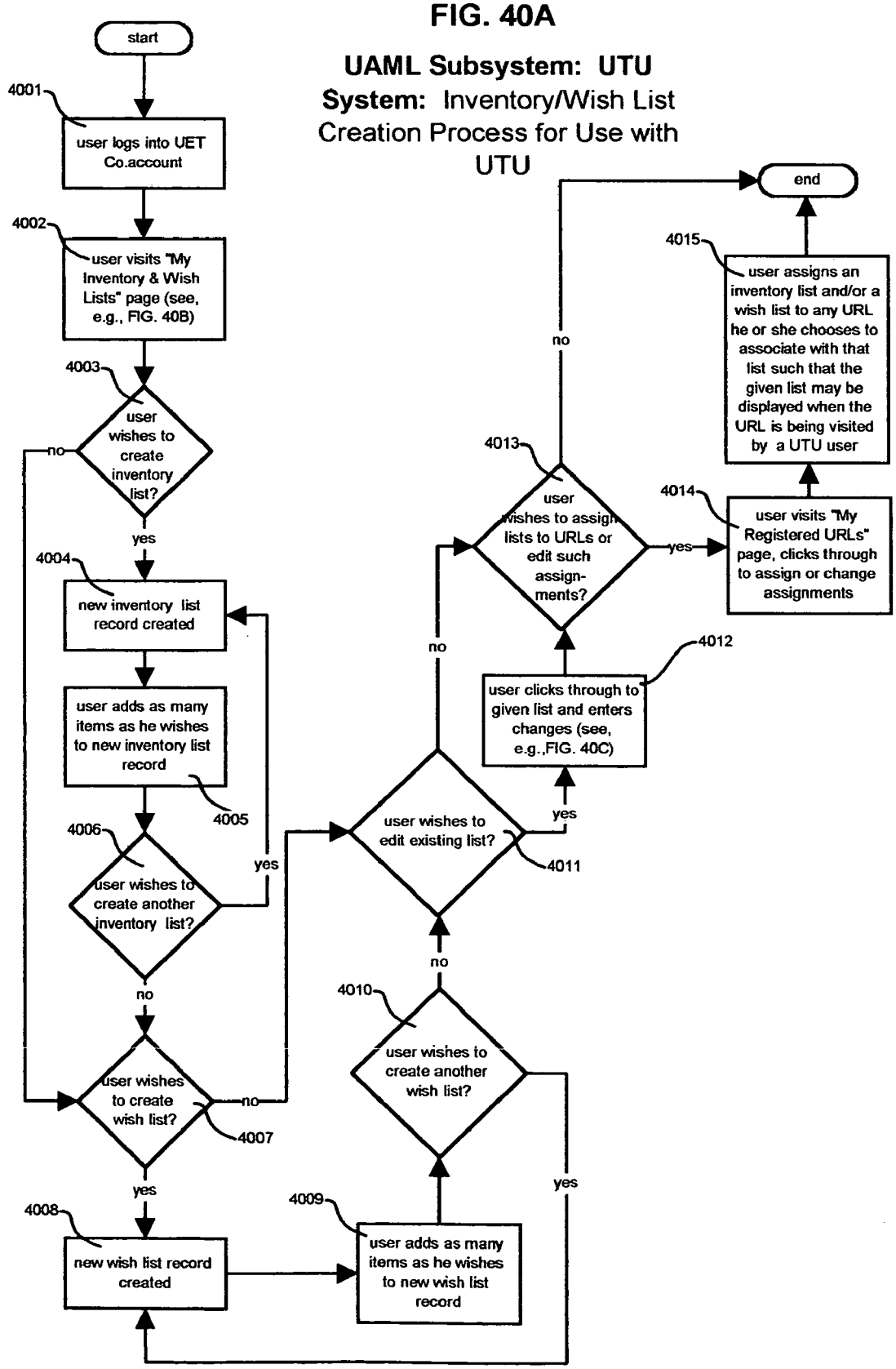
FIG. 40A is a flowchart of a process for creation of an inventory list or wish list for display through the UTU.

FIG. 40A depicts a process whereby a given website provider creates inventory and wish lists and associates these lists with registered URLs in the UET company database complex. The website provider visits 4003 the "My Inventory and Wish List" page 4021, an example of which appears in FIG. 40B. If the website provider wishes to create an inventory list 4003, he or she clicks the "create new inventory list" link to create a new record 4004 in the inventor list database and browse the "Create and Modify Inventory List" page 4031, such as the example depicted in FIG. 40C. From this page, the website provider submits items to be included in the particular inventory list record 4005, and/or removes any items that he or she no longer wishes to sell. If the website provider wishes to create additional inventory lists 4006, the process for creating an inventory list is repeated.

If the website provider wishes to create a wish list 4007, a similar process is followed: a new record is created 4008 and items that the website provider would like to acquire are added to the wish list 4009. The process is repeated 4010 as necessary. If the website provider wishes to edit an existing list 4011, he or she can also do so 4012.

Once at least one wish list or inventory list has been created, the website provider can choose to assign the list to a URL that has been registered with the Company 4013. This is done through the "My Registered URLS" page 4014, where assignments of lists to URLs are made 4015 by clicking on the name of the list currently assigned to the given URL (or "add" if no list is assigned) to visit another submission form (not depicted) through which he or she can choose from a list of available lists.

FIG. 41 depicts a process by which the UTU user uses the universal shopping cart utility function of the UTU. The website provider registers with the UET Company, gets bonded per the Harrison bonded payment system, and provides electronic funds transfer information for a receiving account into which funds collected from buyers will be deposited 4101. The UTU user registers, gets bonded and provides payment account information, such as a credit card account, bank account, or other account from which funds to pay for purchases made through the UTU are to be drawn 4102. The website provider creates an inventory list 4103 per the process in FIG. 40A. The UTU user logs into his or her account through the UTU and uses the UTU 4104 per the process in FIG. 38. If the UTU user wishes to purchase something in the website provider's inventory 4105, the UTU user checks the checkbox next to the item or items and clicks the "add to cart" button 4107. The selected items are then marked as "reserved" in the UET company database record pertaining to the given inventory list. When an item is reserved, it no longer is displayed when the given inventory list is displayed in the UTU but appears in the shopping cart of the UTU user who has reserved it.

If the UTU user wishes 4110, he or she can visit other websites and add more items to his or her shopping cart 4111 from other vendors unrelated to the aforementioned website provider. Thus, instead of filling out multiple purchase forms and registering with multiple web vendors, the UTU user can buy from any number of vendors through a single interface: the UTU.

When the UTU user is ready to checkout 4112 and confirm the purchases in his or her cart, he or she clicks the "checkout" button 4113, reviews a list of the items in his or her cart (not depicted), and clicks "confirm purchases". The UTU user's confirmation can be processed directly through the UTU, or, alternately, this last step of the process can be handled through a Web form on the UET Company website. Once the UTU user confirms the purchases, the amount due is charged to the payment account previously provided 4114. If the payment is not successful 4115, e.g., a credit card is declined, the UTU user is notified and instructed to contact the Company 4116. Otherwise, funds are then wired to the website provider's receiving account previously provided 4118, minus any processing fees charged by the UET Company, etc. If the electronic funds transfer is impossible for some reason 4119, the website provider's funds are held by the UET Company and the website provider is notified and requested to provide a valid receiving account 4120. In any case, once funds have been collected from the UTU user, the purchased item is marked "sold" and is no longer visible through the UTU nor available for purchase 4121. The website provider is then instructed to deliver the item immediately 4122. If the UTU user does not confirm his or her purchases before ending the UTU session during which they were reserved, these items are removed from reserved status so that other users may purchase them.

If there are problems 4108, the dispute resolution process is followed 4106. While in a buyer's cart, items are reserved from a seller's inventory 4109 so that the user can continue browsing 4111, if he wishes 4110; if he fails to check out 4112, these items are released 4117.

FIGS. 42A and 42B illustrate the difference between usage of a URLIT for UAML listings and usage of a URLIT-stem for UTU purposes. In the context of UAML listings, the URLIT serves both a security/authentication purpose and a transaction identification purpose. Thus, a given URLIT can only be used for one UAML listing. If a URL is reused for another UAML listing, a new URLIT must be used; usage of a URLIT that has already been used for a previous listing will result in rejection under the validation process depicted in FIG. 12A.

Meanwhile, however, transactions that take place through the UTU do not rely upon the URLIT as a transaction identifier. In this case, therefore, a one-to-many relationship is possible. Thus, within the context of the UTU system, a URLIT-stem can be reused for multiple iterations of a web page at the particular URL for which that URLIT-stem was generated and assigned, provided that this URLIT-stem is correctly tagged as such in the UAML embedded in the web page.

FIG. 43 depicts data relationships underlying the UTU system. The website provider's web page 4301 hosted by the website provider's computers 4304 includes embedded UAML tags identifying a URLIT-stem 4302. The UTU 4303 transmits the URL being browsed by the UTU user to the UET Company's computers 4305. This URL is compared to the registered URLs in the registered URLs database and provided that there is a match and that the URLIT-stem in the website provider's web page is the URLIT-stem assigned to the registered URL in the registered URL database record 4306, the inventory list or wish list from the inventory database or wish list database associated with the given URL is retrieved from the inventory and wish list database record 4307 and transmitted to the UTU 4303. The UTU user clicks to expand it and thereby view the inventory and/or wish list(s) that the website provider has associated with the URL.

The registered URL database record 4306 is related to a registered users database record 4308 that corresponds to the user to whom the URL is registered.

FIG. 44 depicts the data relationships between the various inventory lists that various website providers have assigned to registered URLs and the shopping cart that the UTU user uses to purchase from these website providers all through the same shopping cart vehicle hosted by the UET Company. The UTU universal shopping cart feature eliminates the need to register with individual website providers, to go through a different checkout process with each website provider, or otherwise undergo redundant steps. Avoidance of such redundancy not only saves time and makes online shopping easier, but, in reducing the number of separate site registrations and purchase transactions, minimizes the risk of improper usage of users' personal information, such as identity theft.

The UTU user visits a first website and through the UTU views the associated inventory list 4401, adding an item to his shopping cart 4402 as per the process depicted in FIG. 41. Then the user visits a second website and adds another item to his shopping cart 4402 from the inventory list 4403 associated with the second site. The user then visits a third website, views the inventory list 4404 associated with the given URL in the UET company database complex, and adds another item to his or her shopping cart 4402. Since both the inventory lists and shopping cart are hosted on the UET Company's computers 4405, when it is time to checkout, the UTU user can simply checkout but a single time and purchase thereby multiple items from multiple vendors.

FIG. 45 depicts an alternative embodiment of the UTU. This toolbar, geared toward the promotion and financial support of nonprofit institutions, provides both a "Site Provider Supports" field 4501 and an "I Support" field 4502. Participation in this mechanism is accomplished on the part of the website provider by way of a process depicted in FIG. 47. The UTU user, meanwhile, selects the organization that he or she supports directly from the UTU itself, which displays a pop-up menu 4601 for the "I Support" field as depicted in FIG. 46. The options available in the "I support" field are the names of the organizations that have successfully activated a record in the donees database through the process depicted in FIG. 47. The UTU user can select his or her preferred donee from the pop-up menu, and a portion of the proceeds from his or her purchases through the UTU goes to whichever donee is the selected donee at the time the given user checks out.

Figure 47:
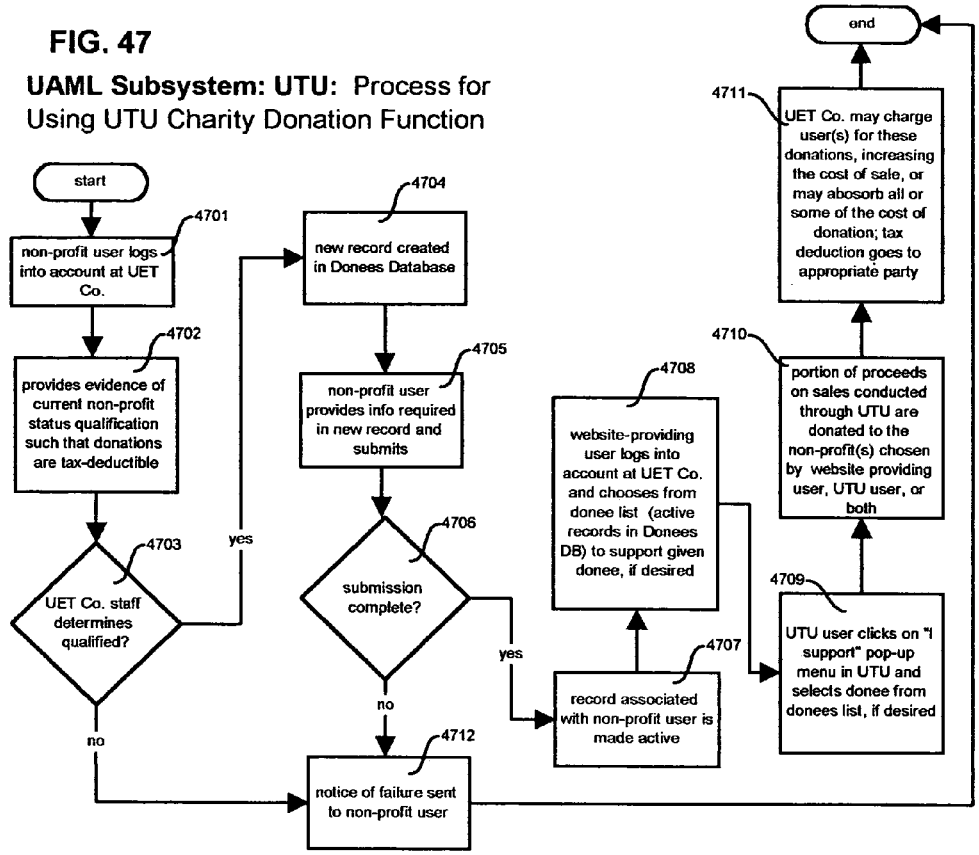
FIG. 47 is a flowchart of the process through which the UTU is used to donate to nonprofit organizations.

FIG. 47 depicts a process by which a donee database record is created and activated, the website provider designates a donee for UTU sales, and the UTU user designates a donee for UTU purchases. A nonprofit organization logs into its account at the UET Company 4701 and provides 4702 evidence of its nonprofit status, qualification as a 501(c)(3) corporation, etc. If the UET Company staff determines that the nonprofit organization is qualified 4703, a new record is created in the donees database 4704, the nonprofit organization is notified, and the nonprofit organization is requested to provide additional information as required in the new record 4705, such as electronic funds transfer information. If all required information is submitted 4706, the nonprofit organization's record in the donee database is made active 4707.

The website provider logs into his or her UET Company account, and if he or she wishes to have a portion of the proceeds of sales conducted through the UTU donated to a qualified nonprofit, selects a donee from the active donees 4708. As discussed in reference to FIG. 46, the UTU user can also select a donee from the active donees 4709. Thereafter, a portion of proceeds from sales and/or purchases conducted through the UTU are donated to the registered nonprofit user or users designated by the website provider, UTU user, or both 4710. Business rules established by the UET Company can fix the percentage of the transaction value donated, or the registered user account of a given donor can provide a field wherein a percentage is set by the donor correctly.

Business rules established by the UET Company can also provide that donors are charged for donations or an alternate scheme can be established, such as absorption of some or all of the cost of the donation by the UET Company, or matching of donations by the UET Company or by a third party 4711. The tax deduction is treated according to applicable law.

If an applicant is not qualified 4703, notice of failure is sent 4712 to the user.

Figure 48:
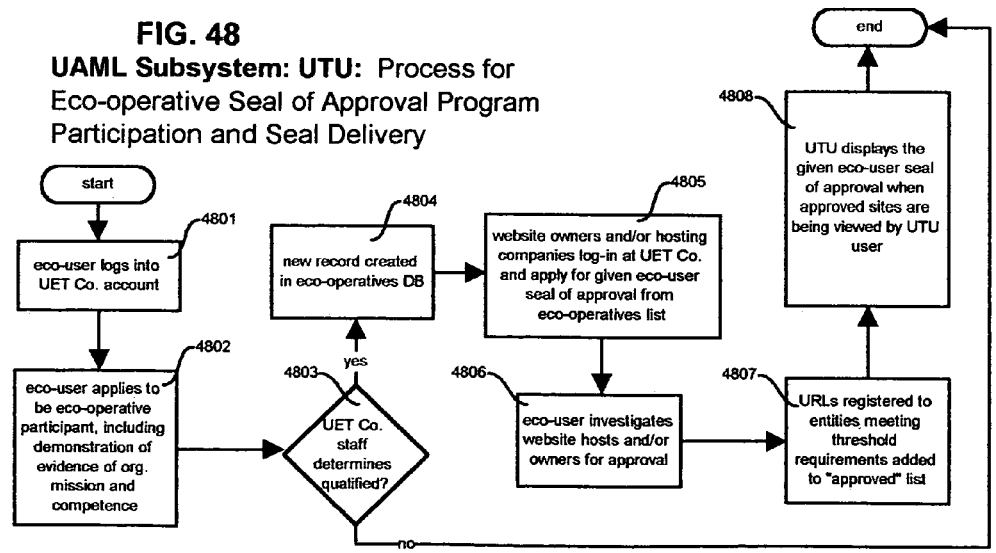
FIG. 48 is a flowchart of the process through which the UTU is used to benefit environmentally conscious website providers and hosting services.

FIG. 48 depicts a process whereby a "seal of approval" can be displayed by the UTU when environmentally friendly websites are being viewed. An "eco-user" who wishes to be approved as an "eco-operative" logs into its UET Company account 4801 and applies to be an eco-operative 4802. This application includes demonstration that the eco-user, such as a nonprofit or governmental agency, is competent to determine whether a website provider adheres to particular environmentally friendly standards. If the UET Company staff determines that the eco-user is qualified 4803, a new record is created in the eco-operatives database 4804, and the fields of the record are populated with information pertaining to the eco-user.

Thereafter, a website provider logs into its UET Company account and applies for a seal of approval from the eco-user 480-5. The eco-user then investigates the relevant practices of the website provider or the host of the website provider's website 4806. If the provider or its website hosting service meets the requirements for the given eco-user's seal of approval, the relevant URL or URLs are added to the given eco-user's approved list 4807. Then, when a UTU user visits the approved web page(s), the UTU displays the eco-user's seal of approval 4808 as demonstrated in FIG. 49.

Figures 49, 50:
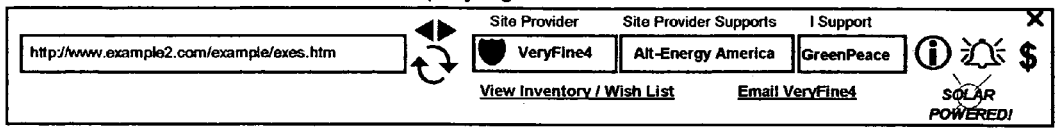
FIG. 49 depicts an example, of the UTU in use displaying a "seal of approval" that indicates that a website provider or hosting service has met standards set by a user that has been found to be qualified to evaluate environmentally conscious business practices.
FIG. 50 is a flowchart of a process for user creation of a submission form or auction that is to be accessible through the UTU.

FIG. 49 depicts a UTU embodiment that includes the eco-operative seal of approval feature. As shown, a "Solar-Powered" icon appears in the toolbar, indicating that the given URL is controlled by a website provider or hosted by a website hosting service that has been approved by the eco-user who offers the "Solar-Powered" seal of approval.

As demonstrated above, a wish list or inventory list can be created for display through the UTU when a given URL is being browsed by a UTU user. FIG. 50 depicts a process by which a contact form or auction can alternately be created for display in the UTU. The website provider logs into his or her account at the UET Company 5001 and visits an "In-toolbar options" page 5002, where he or she can choose to create an in-toolbar submission form 5003 or in-toolbar auction 5004. If the website provider chooses to create a submission form, a new record is created in the in-toolbar submission forms database 5005 and the website provider specifies fields to be included in the submission form 5006 through a submission form such as that depicted in the example in FIG. 51. If the website provider chooses to create an in-toolbar auction 5004, a new record is created in the in-toolbar auctions database 5007 and the website provider provides information pertaining to the auction 5008 through a Web submission form, depicted in the example in FIG. 52. Finally, as with wish lists and inventory lists, the website provider then visits the "My Registered URLs" page and designates which URLs will allow display of the auction 5009. The contact form, however, will display through the UTU any time the "e-mail [user name of website provider]" link is clicked in the UTU. Alternately, this link can be a conventional "mail to" link, of which the e-mail address is that which the website provider designates, or a link to a Web submission form hosted on the UET Company site. If an in-toolbar contact form is used, the submission is processed through the UET Company servers and forwarded to the website providing user at the e-mail address associated with the website provider's registered user account.

FIG. 53 depicts a process by which another optional feature is used. The "iTicker" is a UTU function to which UTU users can subscribe so as to be presented with scrolling headlines that are provided by a chosen source. These headlines can be provided by any approved iTicker provider, and are especially well-suited for distribution of information to members of long-standing group affiliations, such as school alumni, club members, church members, and enthusiasts (sports team fans, etc.).

An iTicker provider logs into his or her account at the UET Company 5301 and applies for iTicker provider status 5302. This application may require demonstration of affiliation with the particular group to which the proposed iTicker headlines and content will be directed, i.e., if an iTicker provider wishes to provide headlines for alumni of a particular school, the UET Company may require the iTicker provider to demonstrate its official capacity to represent that school. If the iTicker provider is approved for iTicker provider status 5303, a new record is created in the iTicker provider's database 5304 and the iTicker provider inputs headlines and URLs to be associated with these headlines into the iTicker provider record 5305, which can be maintained and updated as often as the iTicker provider wishes so as to keep the content fresh. Although not necessary, the UET Company may wish to require that the URL associated with a given headline be the address of a web page that is properly UAML-enabled so as to be a valid "news" UAML listing 5306. If a user wishes to add/edit/delete headlines 5308, he or she does so 5305. If linked documents are not valid 5306, the user is notified 5311, and may correct 5312 the document.

After the iTicker subscription has been made available 5307, the UTU user can subscribe to the given iTicker provider's iTicker 5309 such that when the UTU is in use, the iTicker headlines provided by the iTicker provider are displayed in the UTU in scrolling form and can be clicked if the UTU user wishes to view the article associated therewith 5310. FIG. 54 depicts a UTU embodiment with iTicker function 5401.

FIG. 55 depicts a chart of example UAML tags or elements common to virtually all listings, including one element identifying the UAML markup language (or namespace, if XML is to be used to implement the invention); an element for declaring the LTD/type of listing; one describing the URLIT; one identifying the UET Co. through which the listing is to be processed (more than one UET Co. may exist), inc. a child element link (in HTML) to the UET Co.; and one describing the lister's user ID. Some elements are to contain only PCDATA; others should contain both prescribed data (e.g., "Seller:") and one or more child elements, including HTML elements to be captured for validation purposes, e.g., to verify that the lister ID links to UET Co. page associated with lister's UET account or that a proper image reference to URLIT-enabled image exists. Such validation of HTML elements (to appear in UAML "phrase" elements) is crucial to insure that listings display in browsers per UET standards. These common elements can only appear once in a valid UAML listing document, and omission or deviation from mandatory content (URLIT, link, etc.) is fatal to listing approval.

FIG. 56 depicts an abstract template of nomenclature used in figures pertaining to subject-specific vocabularies. Specifically, for this disclosure, each tag begins with "UAML" to denote that the tag element pertains to the present invention; a different name may be used in a given implementation. Each tag then names a subject-specific database which, in addition to the central listings database, is to store information extracted from UAML-described elements. For instance, a coin listing involves a record in the central listings database and a record in the coin listings database, the subject-specific database. Finally, each subject-specific tag includes the field name into which data described by that tag is to be entered.

FIG. 57A depicts a chart of an example subject-specific tag vocabulary for use with collectible coin listings. FIG. 57B depicts such a vocabulary for car listings. FIG. 57C depicts such a vocabulary for real estate listings. FIG. 57D depicts such a vocabulary for job listings. FIG. 57E depicts such a vocabulary for personal ads. FIG. 57F depicts such a vocabulary for book listings, which, preferably, rely primarily upon the ISBN of the given book for easy and reliable grouping and indexing, since book names and other identifiers may be often misspelled; notice that the database in these tags is called "ISBN listings" so as to distinguish from "ISBN reviews", a database and listing type for book reviews. FIG. 57G depicts two separate vocabularies, one for product listings which rely primarily upon the EPC of the given product, another for product listings which rely primarily upon the UPC of the given product for easy and reliable grouping and indexing, since product names and other identifiers may be often misspelled.

FIG. 57H depicts such a vocabulary for use in a listing for a lending institution. This vocabulary includes a special tag for use with web pages that include dynamically generated, variable content, the tag that includes the "Dyn" letters. Data described by this tag is not stored by the UET Company. Rather, when a search is done on this field, the data is looked up from the listing page itself in real time. In this way, the UAML technology, designed to enhance the functionality and searchability of static web pages, can also be used to search dynamically changing pages more effectively than the related art allows. This approach allows data that changes rapidly, such as interest rates offered by a lender, to be looked up for current values each time such is necessary.

FIG. 58 depicts the process of using UAML in dynamically generated pages.

A web site provider tags 5801 dynamic data using appropriate tags; thereafter, if a search query involves dynamic data 5802, the dynamically generated pages requested 5803, and a search is performed 5804 using the most recently extracted data. If not 5802, a search is performed without reference to dynamic lookup data 5805.

Figure 59A:
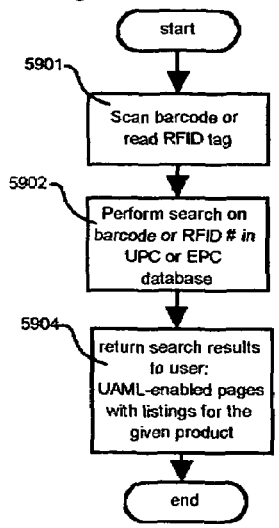
FIG. 59A is a flowchart of a process through which automatic data capture hardware, such as bar-code scanners and RFID readers, can be integrated into the UAML subsystem such that listings throughout the World Wide Web can be searched for a UPC or EPC.

Search results can also be obtained using nontraditional means of submitting search queries. FIG. 59A depicts the process through which automatic data capture hardware, such as a bar-code scanner or RFID reader, can be used to perform a search of UAML enabled listings throughout the entire World Wide Web. First, the automatic data capture mechanism, coupled to a computer including a computer monitor, is used to scan a product for its RFID tag or bar-code number, a UPC or EPC number 5901. This information is submitted to the UET Company, and a search is then performed in the appropriate field of the appropriate database 5902 on the given identification number. These results are then returned to the user 5904 in the form of a hypertext document that includes links to listings for the given identified product.

The barcode reader can also be used in an alternative embodiment (not shown) optimized for real estate. A URLIT can be encoded in barcode form, placed on a "For Sale" sign that is installed at a property, and then scanned by an interested party. The listing associated with the URLIT is then looked up for more information on the property.

Figure 59B:
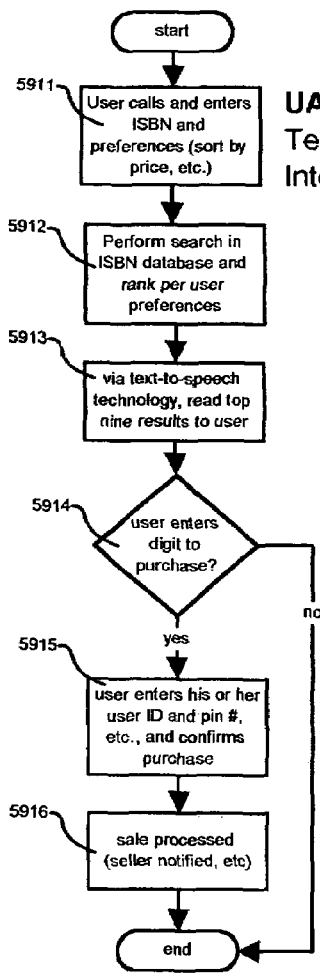
FIG. 59B is a flowchart of a process through which the UAML subsystem can be used through a telephone.

FIG. 59B depicts the process through which a telephone can be used to perform a search of UAML-enabled listings throughout the entire World Wide Web. A user calls a telephone number dedicated to this purpose and, when prompted, enters the ISBN number of a book for which he or she wishes to search 5911. Menu options the UET Company wishes to offer, such as sorting preferences, can also be selected 5911. A search is then performed in the ISBN listings database and the results are ranked according to the user selected preferences, if any 5912; default ranking is by price in ascending order. Text-to-speech technology is then used to read the nine top results to the user, each result (book title, price, seller ID) being identified by a digit 5913. If the user wishes to purchase 5914, he or she enters the digit corresponding to the results desired. The user then enters his or her user ID and personal identification number, etc., and confirms the purchase 5915. The sale is processed as other sales, with funds being drawn from the buyer's payment account and funds being wired to the seller's receiving account, the seller being notified by e-mail of the sale, etc. 5916.

Figure 59C:
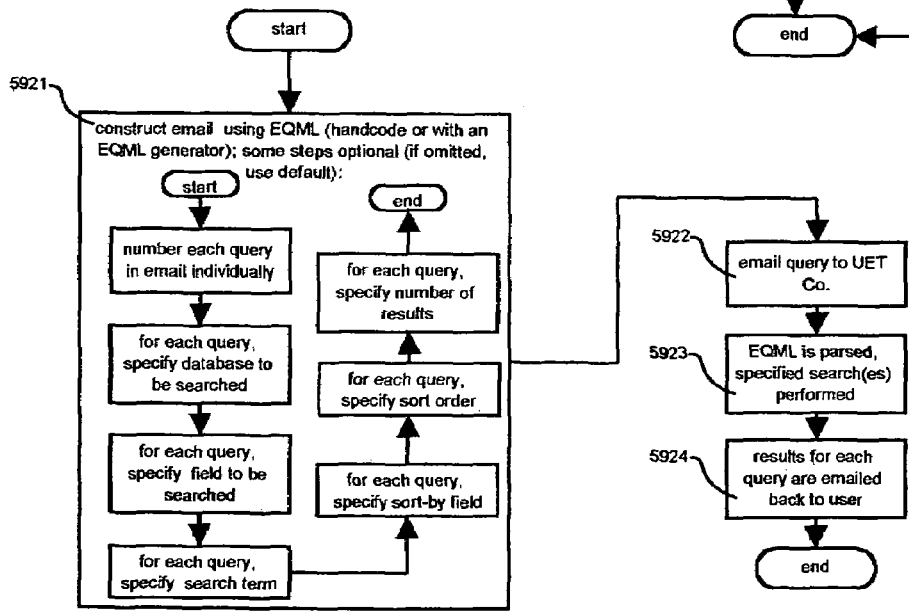
FIG. 59C is a flowchart of a process through which a search query can be composed and the UAML subsystem cap be used through e-mail.

FIG. 59C depicts the process through which an e-mail can be used to perform a search of UAML-enabled listings throughout the entire World Wide Web. First, the e-mail, using the disclosed markup language called "EQML", is written per the process depicted in step box 5921. The e-mail is then e-mailed to the UET Company at an e-mail address dedicated to this purpose 5922. The EQML text in the e-mail is then parsed and a search performed according to the criteria specified in the UAML-enabled e-mail 5923. The results for each search query defined in the user's e-mail are then e-mailed back to the user 5924. An example of an EQML-enabled e-mail 5931 appears in FIG. 59D. Note the structure of an EQML document: the EQML language (or root element, or namespace, where applicable) is specified, and then each separate query is defined in a separate element. Each query element includes child elements such as: an ID number element that identifies one query as opposed to other separate queries in the same document; a database element; an element specifying the field to be searched and the search string; an element specifying the field by which results should be sorted; an element specifying the sort order; and an element specifying the number of results desired. Additional or alternative tags can be used; some elements can be omitted and default values used.

FIG. 59E depicts an e-mail from the UET Company to the UET user in which the results of the queries submitted by the e-mail depicted in FIG. 59D are provided to the submitting user.

3.1 Userithm Search Engine (USE) Subsystem

The Userithm search engine (USE) system allows a user to design his or her own search algorithm in real time, on-the-fly. Although the USE system can be used with a wide variety of databases and database content, including databases of articles, court cases, statutory law, patents, dictionary or thesaurus entries, business records, etc., the illustrative case of the World Wide Web is used herein to demonstrate the function and benefits of the USE system.

Specifically, the USE system disclosed herein represents a superior technique for locating relevant documents in response to a search query by a user attempting to find information on the World Wide Web.

FIG. 60 depicts an overview of the process through which the user uses the Userithm search engine. The UET Company provides a search page through which clusters of information, called "search components," can be input by the user and transmitted to the UET Company. The user accesses the search function by visiting the search page on the UET Company website 6001. The user then defines one or more search components per the search component definition process 6002 and submits his query 6003. A search, including a separate search for each search component as described below, is performed and results are ranked according to the search and ranking process 6004. Results of the search are provided to the user 6005 along with gauges of the performance of each result under the individual search components 6006. The user can then view the search results and performance gauges and refine his or her search as necessary. A wide variety of additional steps can also be performed as described below.

FIG. 61 depicts an excerpt from a web page including a Web submission form whereby the user search query can be submitted. Included are three "search components" 6105a, 6105b, and 6105c. Each search component includes a weight field, a search term field, and a search methodology field. For instance, in search component A 6105a, a field is provided wherein a user can enter a weight 6102, a word or group of words to be searched 6103, and a selection 6104 from radio buttons provided in the depicted search methodology menu.

The process for defining search components through an interface such as the various example submission forms disclosed herein is depicted in FIG. 62. Provided that a search methodology selection is available 6201, the user selects the methodology from the given search methodology menu 6202 for the given search component. Provided that usage of a search term is applicable 6203, the user provides a search term or terms for the given search component 6204. Provided that intracomponent weight assignments are applicable 6205, the user provides intracomponent weights for subcomponents of search components 6206. Provided that intercomponent weights are applicable 6207, the user sets a weight for the given search component 6208. If ideal-setting is allowed 6209 as in the search interface depicted in FIG. 80, the user inputs an ideal 6210 pertaining to the given variable. Provided that the given search component allows user input of tolerances 6211, the user inputs a tolerance pertaining to the given ideal 6212. If the user wishes to define more search component 6213, the process is repeated 6214 for each search component. Once all search components have been defined 6215, the search is ready for submission.

FIG. 63 depicts an overview of the search and ranking process. If a given search component is "compound"—meaning that it contains subcomponents 6301, which are individual searches to be performed and then combined to establish the score of a document under the compound component—then the subcomponents search and ranking process is performed first 6302 and for each other compound search component 6303. If the search contains a simple component 6304, then a separate search is performed for each simple component 6305 under the algorithm described by the user-input criteria of that search component, i.e., the selected methodology, terms, etc. Each separate search component therefore yields a separate raw score list 6305. Each individual raw score is then normalized 6306 to a single scale, such as 0 to 100, where 0 represents the lowest performing page and 100 represents the highest performing page under the given search component, thereby producing a normalized score for each document for each search component. Normalization is accomplished through a process depicted in FIG. 68A. Each normalized score is then multiplied by the user-assigned weight for the given search component 6309, and the weighted values assigned to each page under each search component are combined to yield a single overall score 6309. Results are then ranked according to their scores.

Normalized scores for a given simple search component are multiplied by the weight assigned to the given component 6307 by the user, and the appropriate steps are repeated for the next simple search component if there is another simple search component 6308.

FIG. 64 depicts the subcomponents search and ranking process. An individual search is performed according to the specified or default methodology for each subcomponent 6401, yielding a raw score for each document for that subcomponent. Results for each subcomponent are then normalized 6402. The normalized results under each subcomponent are multiplied by the weight assigned to the given individual subcomponent 6403. The process is repeated for each other subcomponent 6404. The resulting weighted values are combined to form a single overall score for each document 6405. The overall scores for each document are then normalized again 6406 and then multiplied by the weight assigned to the whole compound component by the user 6407.

FIG. 65 depicts an example of a primary USE submission page, where "primary" means that the depicted interface provides only the fields necessary for simple search component definition; no compound components appear in this particular search definition interface. In the depicted example, the user has assigned a weight of "50" to the first search component, a weight of "10" to the second search component, and a weight of "10" to the third search component. The user-provided search term of the first search component is the word "guitar." The search methodology selected by the user for this first component is "pay-for-placement," a search methodology under which pages are ranked according to the amount bid by an advertiser, e.g., U.S. Pat. No. 6,269,361 to Davis.

The user has also input the term "guitar" as the search term for the second search component, but has selected the "links to" methodology for this search component. The links to methodology ranks pages according to the number of link citations to the given page, as per the methodology depicted in U.S. Pat. No. 6,285,999 to Page, or a similar interconnectedness-based ranking methodology.

The step of selecting a methodology can be broken out such that a user first selects a methodology and then inputs search terms and weights; FIG. 66 depicts a submission form for use in such an embodiment.

FIG. 67 depicts a chart of example search methodologies that can be offered as options in the search methodology menu available to each search component. This list is not intended to be exhaustive but simply illustrative.

FIG. 68A depicts the process of normalizing the scores of items being ranked to a single scale (0 to 100 in this case). Normalization is necessary so that scores from separate searches can be combined in a meaningful way.

The score of a page A according to the present invention can be defined, as depicted in FIG. 68B, as $$r_1(A) = w_1(r_2(A)) + \ldots + w_{n-1}(r_n(A))$$

where $r_1(A)$ is the overall score of page A; $r_2(A) \ldots r_n(A)$ are the normalized scores of A under each individual search component; and $w_1, \ldots, w_{n-1}$ are the weights individually assigned to each search component by the user.

This formula is applied in the examples depicted in FIGS. 69 through 71. FIG. 69 provides an example of a normalized score list and a resulting weighted score list of a hypothetical set of ten pages under a hypothetical first search component with a user assigned weight of "50", such as the first search component depicted in FIG. 65. FIG. 70 depicts an example of a normalized score list and a resulting weighted score list of the hypothetical set of 10 pages under a hypothetical second search component with the user assigned weight of 10, such as the second search component depicted in FIG. 65. FIG. 71 depicts a final ranking of these ten pages, wherein the weighted value of each page under the first search component is combined with the weighted value of that page under the second search component to produce a final value, the score of the given document. Documents are ranked according to their scores as depicted in the overall rank list in FIG. 71.

In order to maximize the utility of allowing users to define their own search algorithms, users may also be provided with immediate feedback on the performance of the search components they have designed. FIG. 72 provides a template for such a feedback mechanism. In this abstract search results page, a first column from the left displays the URLs of ranked documents in order of their overall rank. A next column displays document scores under the first search component's search criteria. Another column displays document scores under the second search component's search criteria. Another column displays document scores under the third search component's search criteria, and so on.

FIGS. 73 and 74 depict the search component gauge in an example usage. Referring to FIG. 73, a URL 7301 of a document is displayed in the first column; the rank of the document under the first search component is displayed in the second column 7302; and the rank or the document under the second search component is displayed in the third column 7303. Referring to FIG. 74, an example results page geared specifically for searching auctions, gauges of the performance of each document under certain subcomponent searches are displayed. For instance, in a search where the user has allotted some weight to longevity and feedback scores of sellers, ranks of the sellers of the searched items under these criteria are provided, specifically, the longevity ranking 7401 and the feedback ranking 7402 (different from a feedback rating) of a given seller.

FIG. 75 depicts an excerpt from an example web page containing a Web submission form through which an advanced USE search can be performed, "advanced" referring to a USE embodiment which provides one or more compound search components. The embodiment in FIG. 75, optimized for use with an Internet auction system, provides two simple search components as well as a group of subcomponents that together form a third "compound" search component, "compound" signifying that a search component is enabled for processing that occurs at the intracomponent level—between subcomponents—prior to processing at the intercomponent level. Specifically, as depicted, a number of fields are provided into which a user can put a weight on a particular attribute associated with a seller or item in an auction environment, such that the weight is used to place relative importance upon one subcomponent as opposed to another subcomponent. Thus, for instance, in the depicted example, the user has input a weight of 10 into a "bonded or insured" field 7501, a weight of 5 in a "feedback total" field 7502, and a weight of 10 in a "feedback ratio" field 7503, thereby establishing the relative importance of search results obtained under searches performed for these three subcomponents relative to each other.

FIG. 76 depicts an example of a compound search component that includes subcomponents optimized for searching stocks. As depicted, this advanced USE allows user entry of an individual weight for each subcomponent. Thus, a user can assign the relative emphasis to be placed upon the results of each search under one subcomponent relative to the results under other subcomponents. Note that a user does not have the option of selecting a search methodology for each subcomponent; the search performed under each subcomponent is performed according to a default methodology that is specific to that subcomponent, e.g., a "book value" subcomponent searches records pertaining to stocks and scores them according to book value; a "P/E ratio" searches stock records and scores them according to price-earnings ratio. The user simply defines which variable is more important to him or her.

FIG. 77 depicts an alternative embodiment of a compound search component optimized for searching bonds, including subcomponents with default methodologies for ranking bonds by grade, interest rate, etc.

FIG. 78 depicts an alternative embodiment USE optimized for searching mutual funds, including subcomponents with default methodologies for ranking mutual funds according to their performance over different time periods.

FIG. 79 depicts another alternative embodiment USE optimized for searching mutual funds, including subcomponents with default search methodologies for ranking mutual funds according to the types of assets in which the given mutual invests.

FIG. 80 depicts a "level 2" advanced USE. In a level 2 advanced USE, the subcomponents can be assigned not only a weight but also an ideal, i.e., a value that sets the standard against which other values are measured within the given subcomponent's search results. For instance, a user may assign a value of "3" to set the standard for the number of bedrooms. Given this value as the standard, units with three bedrooms score the maximum under this subcomponent, while units with two bedrooms or four bedrooms score lower, while units with one bedroom or five bedrooms score even lower. Meanwhile, emphasis on search results from this subcomponent relative to those from other subcomponents is established by user-assigned weight.

FIG. 81 depicts a level 2 advanced USE embodiment optimized for searching job listings. Here, the user sets his or her ideal value for numbers of hours of work per week, for instance, and available positions are ranked under a "hours per week" subcomponent according to how close each listed position comes to the user's ideal. Intracomponent weighting is again performed according to weights input by the user.

FIG. 82 depicts a level 2 advanced USE optimized for searching an automobile ad database, again providing data entry fields through which a user can assign an ideal and a weight to a given subcomponent. In this particular example, a field is also included whereby a user can submit an e-mail address where search results can be sent.

FIG. 83 depicts a variation of the level 2 advanced USE embodiment that provides two search components having subcomponents, optimized for searching a personal ads database. In this example, the results from each of two depicted compound components can be weighted relative to each other. Specifically, a given record is ranked according to each subcomponent in a "physical traits" compound component and these results are weighted and combined to produce a single score for that compound component. The same is done for a "personal traits" compound component. Then the result of the physical traits component is combined with the result of the personal traits component according to the user assigned weights of each compound component so as to produce a single overall score for the given record.

FIG. 84 depicts a level 3 advanced USE. In a level 3 advanced USE, not only can a weight and an ideal be assigned to a subcomponent, but also a tolerance level with respect to variation from the ideal can be assigned. The tolerance level essentially serves as a filter mechanism as opposed to a scoring mechanism. In other words, records falling outside of an acceptable level of variation get no score under the search component. Alternately, at the choice of the given UET Company, records that exceed the tolerance set by the user can be excluded from search results altogether.

In either case, the syntax a user uses to enter a tolerance level that can be properly processed can take whatever form the UET Company chooses to support. For instance, the tolerance level can be specified using a percentage accompanied by a plus (+) or minus sign (−); an integer that simply indicates how many units away from the ideal threshold an item can fall before exclusion; a greater than/less than relationship; or any other relative or absolute indicator that will serve to establish a meaningful boundary for acceptable variation.

Thus, in FIG. 84, a search algorithm input form is depicted that includes two simple search components, A and B, and one compound search component, C. The compound search component provides subcomponents whereby searches on language, length, author rating, publication rating, and freshness of an article can be defined. Each subcomponent provides a data entry field for ideal, weight, and tolerance assigning for the given subcomponent. As shown, for the length subcomponent, the user has input "+50%/−5%" to indicate a willingness to accept articles that are up to 50 percent longer than the user-established ideal length (400 words in the depicted example) and down to 5 percent shorter than this ideal length. The user has entered a "0" in the tolerance field for author rating to indicate that no variation from the ideal is acceptable in this subcomponent. The user has entered a "+" in the tolerance field for the publication rating to indicate that variation of any magnitude is acceptable provided that this variation is positive, i.e., values greater than the user-established ideal are acceptable and values less than the ideal are not.

FIG. 85 depicts a variation of the level 2 advanced USE in which one search component, labeled "must have", serves as a filter, while the second component, labeled "prefer to have", serves to rank results that have passed through the filter. The particular example is a USE optimized for searching airline flights.

FIG. 86 depicts a primary USE with but a single field. This particular embodiment, of course, is attractive for its simplicity. Rather than having separate fields for selection of a search methodology and input of user-assigned weights and search terms, all three characteristics of a simple search component are input using operators that are parsed by the UET Company computers after submission by the user.

Thus, in the depicted example, the first search component is defined via two main parts: (I) a search term ("fingerpicking") and (II) some information in parentheses. The information in parentheses identifies a search methodology to be used in the search under the given search component and a weight to be assigned to results of the given search component relative to other search components. Specifically, a number appears first and then is separated by a comma from a methodology selection. Thus, following the first search term in the depicted example is the information "(25, linksto)". This information puts an intercomponent weight of "25" on the first search component and selects "linksto" as the search methodology for the first search component. Two more search components as input by the user are included in the depicted example.

A user Provides data terms 8701, methodologies 8702, weights 8703, and, if weights are used for subcomponents 8704, sets weights for at least one subcomponent 8705. If ideals/standards are used 8706, the user also provides an ideal value 8707. If tolerances are used 8708, the user provides a tolerance 8709.

3.2 USE Subsystem EQML Integration

FIG. 88 depicts an example of an e-mail through which a USE query can be submitted to the UET Company, thereby providing the same power and flexibility afforded by the submission form embodiments depicted above while using e-mail as the submission medium. As depicted, EQML tags are used to denote a database to be searched, a search methodology for each component, an intercomponent weight for each component, a search term for each component, and so on.

FIG. 89 depicts an example of an e-mail returned to the UET user by the UET Company in response to a search query submission submitted by an e-mail such as that depicted in FIG. 88. Results are returned to the user, including the Web address of each result and performance gauge information pertaining to each result.

Figure 90:
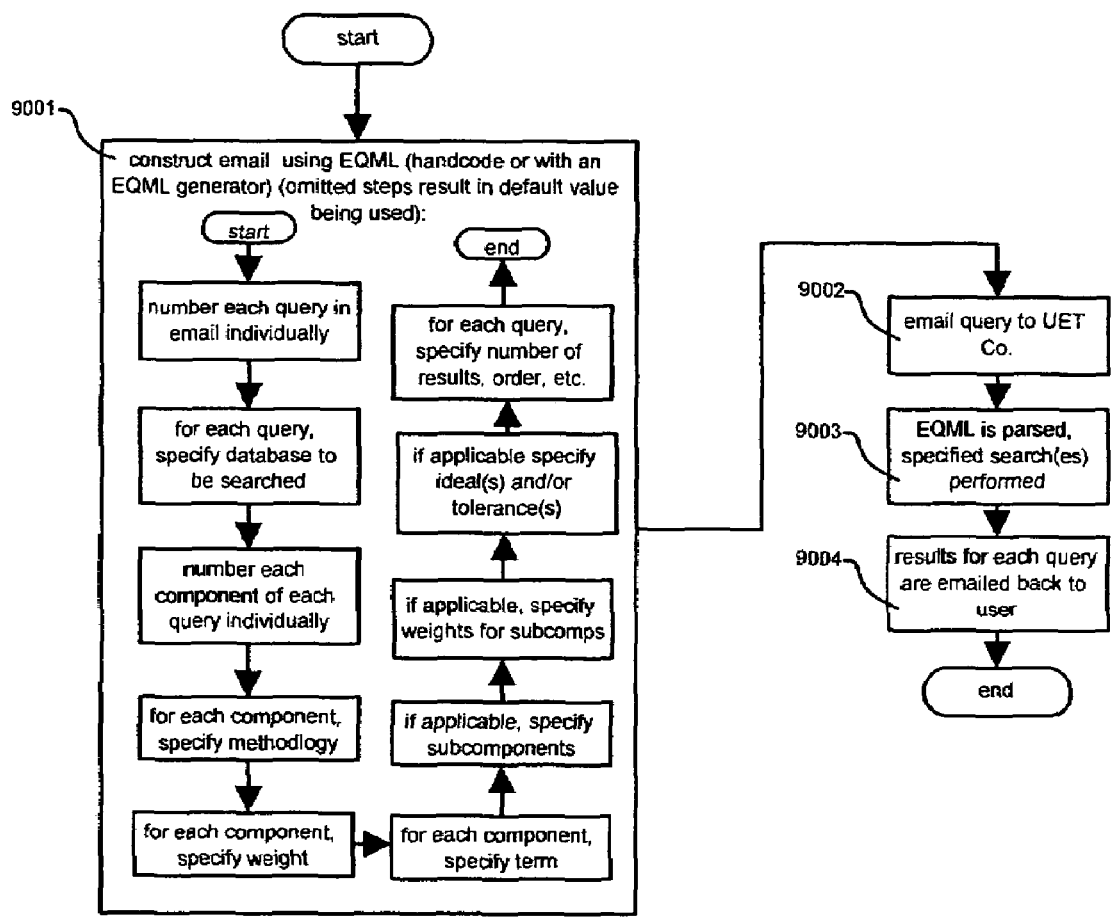
FIG. 90 is a flowchart of a process whereby the USE subsystem is accessed via e-mail.

FIG. 90 depicts the process by which e-mail is used to tap the USE subsystem.

3.3 USE Subsystem The "Build-Your-Own Search Engine" Feature

FIG. 91 introduces an extension of the USE concept: the "Build Your Own Search Engine" system. FIG. 91 depicts an excerpt from a sample web page that includes a Web submission form through which a user can select features to be included in a search engine interface that the user can then embed in his or her own website. The search itself is still conducted through the UET Company computers, but the user can pick and choose what features will be included in the particular search engine interface.

Figure 92:
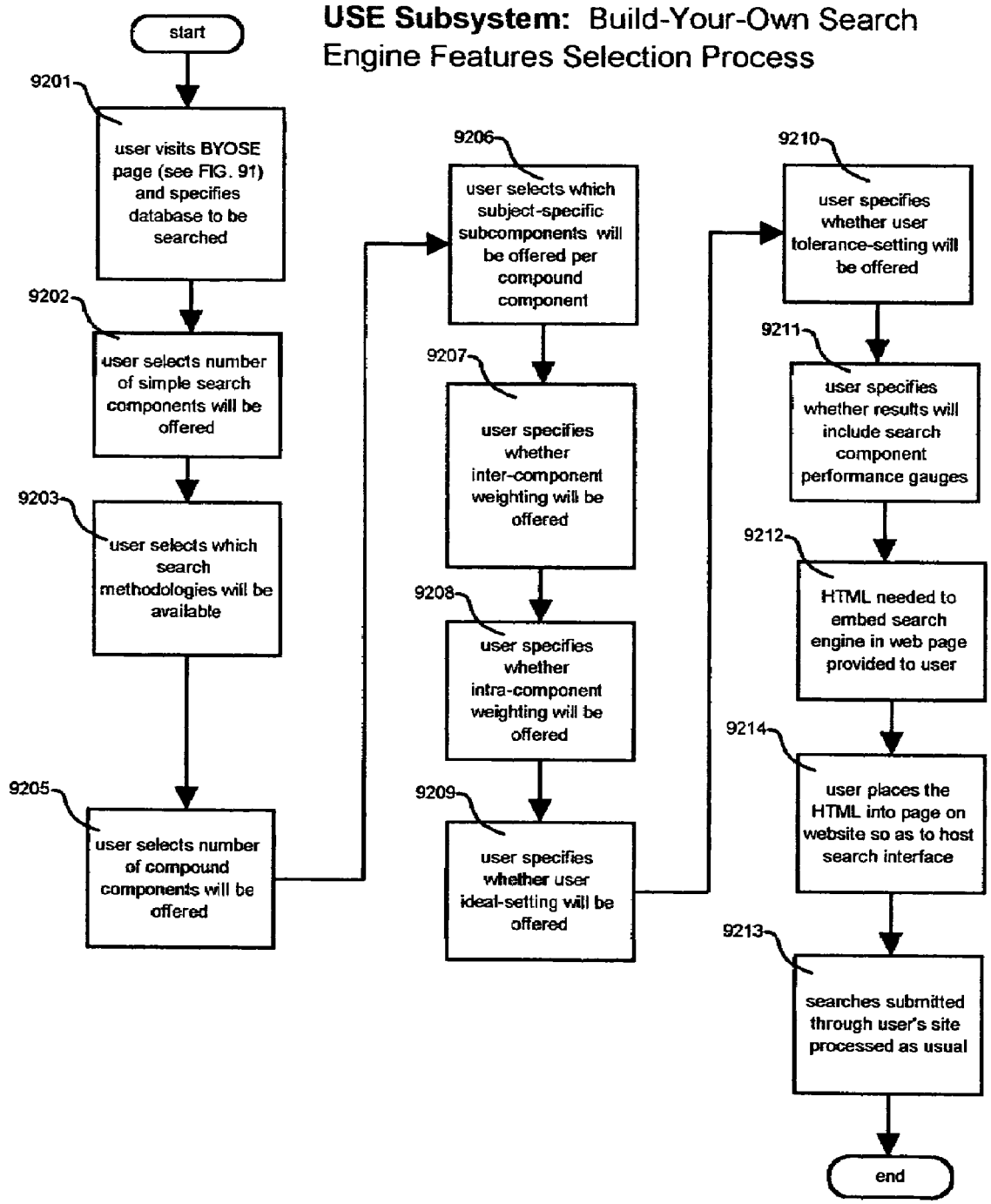
FIG. 92 is a flowchart of a process by which a build-your-own-search-engine feature is used.

Specifically, the user follows the process in FIG. 92: First, the user chooses which UET Company database are to be searched 9201. Next the user selects the number of simple search components that are to be offered 9202. The user then selects which search methodologies are to be available for use with each simple search component 9203. The user then chooses how many, if any, compound components are to be offered 9205. The user then chooses which subcomponents are to be included in each compound component 9206. The user then specifies whether intercomponent weighting 9207 is to be offered (if not, then each search component is equally weighted), and, if compound components are used, whether intracomponent weighting 9208 is to be offered. If compound components are being used, the user indicates whether ideal setting is to be offered 9209 and whether tolerance setting is to be offered 9210. The user then specifies whether results are to include search component performance gauges 9211. Once the form has been submitted, the HTML to be included in the web page where the user is to host his or her submission form is e-mailed or otherwise provided to the user 9212. Queries submitted through the user's submission form are then processed by the UET Company as normal 9213.

3.4 USE Subsystem Lexivote Ranking Methodology

Allowing users to design their own algorithms and manipulate the power of multiple search methodologies, as demonstrated above, is a powerful tool. However, the power of the USE can be even more fully realized when combined with a more powerful relevancy ranking methodology than the related art provides.

The Lexivote ranking methodology essentially allows a search engine user to interview millions of other users to find documents most relevant to his or her query. Specifically, a database of "word-votes" is created, then populated over time through user input, and then searched in response to a search query so as to provide the most relevant documents pertaining to the term or terms searched.

A word-vote, in its simplest form, is a pairing of two data: (I) a word datum and (II) a URL datum. Thus, a given word-vote could be a group such as "music" and "http://www.performer.org". A word-vote database record, in its simplest form form, has two corresponding fields: the word datum field and the URL datum field.

Word-votes are cast one at a time by individual users. Specifically, the user inputs a word and inputs a URL that he or she believes to be the URL of the best resource pertaining to that word.

A query for use in the Lexivote system is, in its simplest form, a word. When a query consisting of a word is submitted for a search under the Lexivote methodology, the word-vote database is searched for matching word-votes. A matching word-vote is a word-vote record in which the word datum in the word-vote vote matches the query word.

Results of the search are ranked using matching word-votes.

In its simplest form, the score of a document A under a Lexivote search according to the present invention is $$r(A)=m$$

where r(A) is the score of the document A and m is the number of matching word-votes in which the URL is the same as the URL of document A.

Thus, for instance, assume that users have cast exactly 1000 word-votes in which "music" is the word, and, of these 1000 word-votes, exactly 7 of them contain "http://www.performer.org" as the URL. When a query on the word "music" is submitted, there are 1000 matching word-votes, and the score of the document appearing at the URL http://www.performer.org under the submitted query is 7.

Complexity and subtlety can be added to the process quickly. For instance, the word datum in a word-vote can be a phrase or almost any character string rather than just a single word. A word-vote can include more than one URL-datum field, such that there can be a one-to-many relationship between the word/phrase datum and the URLs associated with this datum in a single word-vote database record.

In such a one-to-many word-vote, the URL data fields can be weighted such that a user puts his or her favorite URL in first, his or her second favorite URL in second, and so on. Then, instead of the score of the document being simply the number of matching votes that include the URL of the document, such matching votes are weighted according to the priority of the given URL in each matching vote. Greater weight is assigned to the first URL than to the second URL, and greater weight is assigned to the second URL than the third URL. A formula for scoring under such an approach appears in FIG. 98B.

Additionally, word-vote derivatives can be included. A word-vote derivative is an additional datum derived from a word-vote. For instance, every word-vote database record can include an additional field that is automatically populated with simply the domain name appearing in the URL datum. This domain name field can then be used in a secondary ranking methodology: when the basic Lexivote ranking methodology yields rankings that are very close together, the domain name field is used in a sort of "tiebreaker" methodology; a URL that includes a more popular domain name ranks higher than the URL that includes a less popular domain name.

The Lexivote system is further explained in reference to the figures. FIG. 93 depicts an example of an excerpt from a web page 9301 that provides a search query submission form. Also included are the fields necessary for submission of a word-vote to a Lexivote system operated by the UET Company. Specifically, the user chooses a word or phrase to enter in the word datum submission field 9302 and then enters into the URL datum submission field 9303a a URL that identifies the web page that he or she believes to be the most relevant page associated with the given word or phrase. If the user wishes to submit more than one URL to be associated with the chosen word, he or she can enter them in the additional "Favorite Website . . . " fields provided 9303b, 9303c. The user then submits both his search query and his word-vote by clicking the "search" button.

While FIG. 94 depicts a process by which the Lexivote system can be implemented without the use of registered user accounts, this approach is particularly vulnerable to abuse. The preferred embodiment therefore is that depicted in FIG. 95, which is based upon registered user accounts. Through this approach, several quality control measures can be implemented. For instance, by allowing only registered users to cast word-votes and preventing any registered user account from including a duplicate word-vote, i.e., a word-vote in which the word datum is identical to that of another word-vote, the given user account can be limited to one word-vote for any given term. This measure will help to reduce the likelihood of attempts to "stuff the ballot box." (Note that the presence of multiple word-votes cast by the same user and including identical URLs as the URL data is not problematic; certainly, the same website can be a user's favorite website pertaining to a variety of different words.)

Thus, in the preferred embodiment, the user logs into his or her UET Company account 9501 and uses the UET search engine 9502. At predetermined times, intervals, or events, the user is asked to cast a word-vote 9503; the UET Company can choose to follow some suggested timing criteria depicted in FIG. 96 for requesting users to submit word-votes or adhere to a schedule of its own design.

Over time, as more and more users participate in the Lexivote system and cast more and more word-votes, the word-vote database grows richer and the Lexivote ranking methodology more effective.

FIG. 97 depicts an example weighting scheme for use in an embodiment in which one-to-many relationships are possible in word-votes.

FIG. 98A depicts a process through which pages are ranked according to word-votes. First, registered users cast their word-votes 9801. For each word-vote, a new record is created in the word-votes database and related to the user account of the user casting the vote 9802. As discussed above, each word-vote includes a word/phrase datum and a URL datum (or more than one URL datum in certain embodiments).

When the user submits a query 9803, results are ranked according to matching votes 9804, or, in some embodiments, weighted matching votes.

One benefit of the account-based approach is that users can change their votes as their tastes change and as the World Wide Web evolves. FIG. 99 depicts an excerpt from an example web page through which the user can view and alter his or her word-votes in an account-based Lexivote system. This feature can be used to further enhance the functionality of the Lexivote system by assuring "freshness" of word-votes; users can be periodically required to confirm previously cast word-votes or otherwise update them if the user's preferences have changed or a URL is no longer valid.

3.5 USE Subsystem Lexary Reference Tool

A Lexary is provided to further enhance the functionality of the Lexivote subsystem and USE subsystem.

The Lexary is an electronic reference tool that includes two basic reference features, entries and senses. The Lexary serves the combined functions of a dictionary, thesaurus, grammar book, and stylebook. An entry is a word, phrase, punctuation mark, or other datum that may be included in such reference materials. A sense is a definition, synonym, antonym, usage note, or other descriptive content that explains the entry with which the sense is associated. Thus, a sense can be a dictionary sense (e.g., a definition of a word entry), a thesaurus sense (e.g., a synonym or antonym of a word entry), a grammar sense (e.g., a usage note pertaining to a punctuation mark entry), or a style sense (e.g., a usage note pertaining to an editorial convention entry, such as idiomatic usage of a phrase or proper citation of a source).

The Lexary provides a mechanism through which users can submit entries and senses. Additionally, so that the Lexary can serve as an authoritative source of information, the Lexary also provides a number of quality control mechanisms. Without such mechanisms, the anarchy and misinformation that characterizes many user-generated-content sites would almost certainly overtake the Lexary also.

When a new sense is submitted, whether in association with an existing entry or a new entry, the new sense is marked "proposed." In order for the sense to move beyond proposed status to "approved" status, it must receive a predetermined threshold number of "subscriptions," a subscription being an indication of approval of the sense by a registered user.

Once approved, the sense becomes published as part of the Lexary such that a search on the given entry will return the given sense as an authoritative statement. Over time, as the number of Lexary users increases, users with unusually high levels of linguistic understanding will periodically encounter senses that have been approved but are not completely accurate. The Lexary therefore provides a "challenge" mechanism through which the user can call an existing approved sense into question and seek to supplant it with an improved version of the sense. The challenge is denied or upheld through a special voting procedure that involves only a small portion of the whole user community, namely, the users who have already demonstrated an outstanding track record with respect to contribution of material to the Lexary. This track record is represented by the user's authority rating.

A general method of creation, deployment and use of the Lexary system appears in flowchart form in FIG. 101. First, a group of databases necessary for use in the Lexary system, such as those depicted in FIG. 100, are created 10101, as are a group of interfaces through which users can submit, review, search, subscribe to, challenge, flag, and edit entries and senses 10102.

Once the Lexary has been made available to the public, a user logs into his or her UET Company account 10103 and, if the user so desires 10104, the user enters a term search through the Lexary search interface 10105. Search results are returned to the user 10106, including an entry or entries matching the search term and a sense or senses associated therewith.

If the user wishes to add a new entry 10107, the user enters information pertaining to the new entry through a new entry submission form 10108, and if the entry does not already exist 10109, the entry is added as a new entry record in the entries database 10111.

An entry is not searchable through the official published Lexary until at least one sense associated with the given entry has been approved. If a user wishes to add a new sense 10112 to be associated with an entry, the user enters the new sense through a new sense submission form 10113 and a new record is created in the senses database and related to the given entry record in the entry database 10114. The new sense is marked "proposed" at this point. If the entity does exist 10109, the user is so informed 10110.

If the user wishes to review proposed senses 10115, he or she submits a search on the term to be reviewed 10116 and results are returned to the user 10117. If there are some pending proposed senses associated with the search term 10118, the user clicks through to a sense review page 10119. If the user wishes to subscribe to a sense 10120, he or she clicks the "I subscribe" link and a new record is created in the sense subscription database 10121 noting the subscription of the user to the given sense 10122.

Figure 108:
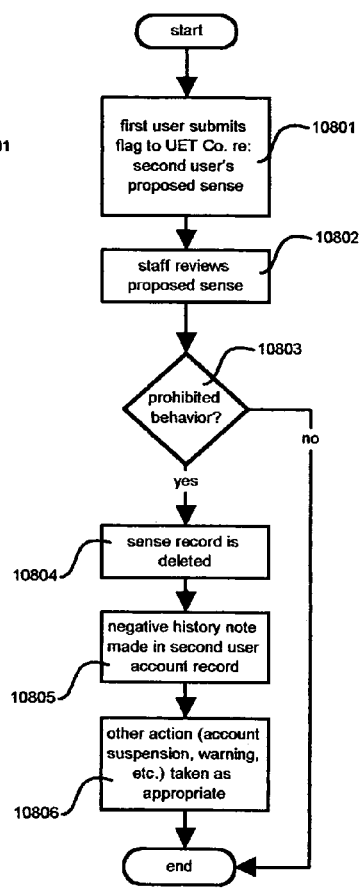
FIG. 108 is a flowchart depicting a process by which a given sense is flagged.

Occasionally, users will propose inappropriate senses in an attempt to be funny or offensive. If the user wishes to flag such a sense 10123, the flagging process depicted in FIG. 108 is followed 10124. If the user wishes to challenge an approved sense 10125, the sense challenge process depicted in FIG. 111 is followed 10126. If the user wishes to alter a choice he or she has formerly made—such as a sense or subscription he or she previously submitted—, the choice editing process depicted in FIG. 109 is followed 10128.

Figure 109:
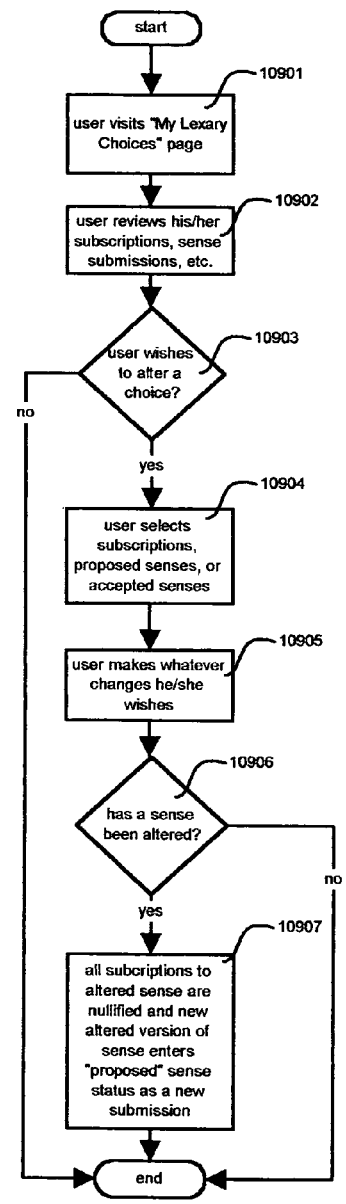
FIG. 109 is a flowchart depicting a process through which a choice is edited.

If a user wishes to alter previously submitted terms, senses or subscriptions 10127, the choice updating process depicted in FIG. 109 is followed 10128.

Any time a choice made by a user affects a calculation used in the Lexary system, the process of performing this calculation is restarted 10129. For instance, sense approvals are based on the number of user subscriptions; thus, when a user submits a new subscription, a sense selection process, depicted in FIG. 110, must be followed again; running of the process need not occur immediately but rather can be conducted at regularly scheduled-intervals at the choice of the UET Company. Similarly, since a user's authority rating is based upon approved senses, an authority rating process, depicted in FIG. 107, should be followed when a sense authored by a user has become approved.

For the sake of simplicity, the following figures depict excerpts from sample web pages for a limited scope deployment of the Lexary, specifically, one that serves only as a dictionary. It should be understood that one of ordinary skill in the art can easily modify the depicted pages so as to allow the searching, submitting, and editing of non-dictionary entries and senses, such as grammar and style entries and senses. It should also be noted that the same basic processes disclosed herein can be used for management of longer entries, such as encyclopedia entries, although the Lexary is primarily aimed at serving the purposes described above.

FIG. 102 depicts a Web submission form 10201 through which a term can be looked up in the Lexary. FIG. 103 depicts an excerpt from a sample results page 10301 generated and returned to the user in response to a Lexary search query.

The results page 10301 displays all approved senses associated with the term searched. Additionally, the number 10302 of subscriptions to each sense is displayed to the right of that sense. The user ID 10303 of the user who submitted the given sense is also displayed, as is the authority rating 10304 of this sense author.

A link 10305 to a page that displays pending proposed senses associated with the entry, such as the page depicted in FIG. 105, is displayed. A link 10306 to a page including a Web submission form through which a new sense for the entry can be submitted, such as the "Submit New Sense" page depicted in FIG. 104, is also displayed. An advertisement 10307 also appears. An advertiser pays the UET Company to serve the advertisement 10307 each time certain terms are searched in the Lexary.

When a user wishes to submit a new sense, he or she does so through a Web submission form such as the form 10401 in FIG. 104. For a dictionary sense (as depicted), the submission form includes fields for a part of speech, a qualifier (such as transitive or intransitive in the case of verbs), a definition, an etymology, and a usage note. Clearly, additional fields can be used and different fields should be used for different types of entries, e.g., grammar or style.

If a user wishes to subscribe to a pending proposed sense, he or she does so by clicking an "I subscribe" button 10502 appearing in the review proposed senses page 10501 depicted in FIG. 105. If a user wishes to flag a proposed sense, he or she clicks a "flag" link 10503 to initiate the flagging process depicted in FIG. 108. Inappropriate use of the Lexary can result in demerits which subtract from a given user's authority rating; enough demerits can result in a negative authority rating 10504.

FIG. 106 depicts an excerpt from an example "Sense Challenge Submission" form 10601. Through such a form, a user may submit a challenge to a currently approved sense. Such a challenge may be necessary when an approved sense is good enough to have received enough subscriptions to be approved but nonetheless is, in the eyes of the challenger, incomplete or otherwise imperfect. Fields to be included in a sense challenge page should include an "explanation for the challenge" field and a "proposed alternative" field.

Figure 107:
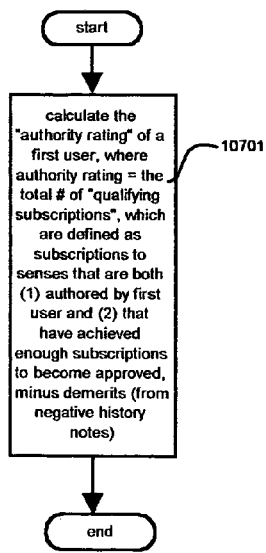
FIG. 107 is a flowchart depicting a process by which an authority rating of a user is calculated.

An embodiment of the authority rating process is depicted in FIG. 107. In the depicted embodiment, a user's authority rating equals the total number of "qualifying subscriptions," where qualifying subscriptions are defined as subscriptions by other users to approved senses that were authored by the user being rated, minus any demerits. Certainly, other formulae for producing an authority rating can be used. For instance, a recursive definition, using one or more known techniques for handling recursive equations, can be used.

Such a definition might define a first user's authority rating in terms of authority ratings of other users who have subscribed to senses authored by the first user.

The flagging process is depicted in FIG. 108. After a flag has been submitted by a user 10801, UET Company staff reviews the flagged sense 10208. If the staff determines that the flagged sense was not submitted in good faith 10803, the sense record pertaining to the flagged sense is deleted 10804 and a negative history note is entered in relation to the user account of the submitter of the flagged sense 10805. Such a negative history note may result in demerits per UET Company business rules. If the violation is sufficiently egregious or part of a pattern of misconduct, additional action may be taken 10806, such as suspension of the offending user account.

Occasionally, users will find that they no longer agree with senses they themselves have submitted or with senses to which they have previously subscribed. In such a case, the user can follow the choice editing process depicted in FIG. 1Q9. The user browses the "My Lexary Choices" page 10901, from which he or she can review previously submitted subscriptions and senses 10902. If the user wishes to alter such a choice 10903, the user selects the choice to be modified 10904 and makes the appropriate change 10905. If the user alters a sense 10906, the altered sense is treated as a new sense submission 10907: all previous subscriptions to that sense are voided and the modified sense enters "proposed" status. This measure is necessary so that approved senses are not subsequently altered into a form that would not have received such approval from the community.

Senses are approved through a sense selection process such as that depicted in FIG. 110. The UET Company can choose 11002 to weight subscriptions with reference to the authority rating of the subscribing user 11004 and 11005, or to simply count all subscriptions equally 11003. Whichever methodology is chosen, the score of a sense is compared to a predetermined threshold 11006, and if the score meets or exceeds this threshold, the sense is approved 11007.

Senses are challenged through a sense challenge process depicted in FIG. 111. If a user wishes to submit a challenge, he or she does so through the submission of a form such as that depicted in FIG. 106, and a new record is created in the sense challenges database 11101. Provided that the submission meets minimum requirements for completeness 11102, the author of the challenged sense is notified and given the opportunity to submit a rebuttal to the challenge 11103. After this rebuttal has been received or a certain period of time has elapsed, a panel of users who are considered "top members" are notified of the challenge. Top members are users with the highest authority ratings, and the top member panel may consist of approximately 300 to 500 top members.

Top members panel are notified of a challenge 11104.

Panel members must cast a vote agreeing or disagreeing with the challenger's case within a certain period of time 11005, each vote being a record in the sense challenges votes database. If not enough votes are received to reach a quorum 11106, the challenge fails. But if a quorum is reached and enough votes for the challenger are received to meet or exceed a predetermined threshold 11107, the challenge is upheld and the challenger sense replaces the challenged sense 11108. The UET Company can choose whether a successful challenger sense inherits all the subscriptions of the challenged sense it replaces or simply is awarded a minimum number of subscriptions to become approved. The UET Company can also choose what happens to the replaced sense.

The viability of the sense challenge process relies upon the participation of top members. A top member who repeatedly fails to respond when asked to vote on challenges may be removed from the top members panel and replaced by another top member 11109.

The Lexary can be integrated with the Userithm search engine system to produce an even more effective search mechanism. FIG. 112 depicts an excerpt from a web page including a USE search submission form 11201; this particular USE embodiment provides two simple search components.

When a search query submitted through this form 11201 contains search terms that appear in the Lexary as entries with more than one associated sense per entry, the user is presented with a secondary selections page such as that 11301 depicted in FIG. 113. This page provides an input field 11302 next to each available sense so that a user can eliminate ambiguity by selecting the particular sense of the word that he or she intends.

For instance, if a user submits a search query that includes the words "rubber" and "stamp" as depicted in the example in FIG. 112, he or she may be presented with a secondary selection page such as that 11301 depicted in FIG. 113. This page 11301 displays two approved senses associated with the word "rubber" in the Lexary. This page also displays two approved senses associated with the word "stamp" in the Lexary. The user can either bypass the use of secondary selections by clicking a "bypass this step" button, or he or she can check a checkbox next to the sense in which he or she intends the word, thereby indicating his or her secondary selection, and then click the "search according to my selections above" button to submit the search query.

This process is summarized in the flowchart depicted in FIG. 114. When a user submits a query 11401 and the chosen search methodology relies in part upon the meaning of the given word 11402 (as opposed to a search simply for the appearance of a word in a domain name, for instance), the submitted search term or terms are looked up in the Lexary 11403. If any of the search terms appear as entries in the Lexary with more than one associated sense 11404, a secondary selections page such as that depicted in FIG. 113 is presented to the user 11405. If the user chooses to refine his or her search through the use of a secondary selection 11406, the search is performed with reference to the particular sense or senses selected by the user 11407. Otherwise, the search is performed as usual without reference to secondary selections 11408.

Searches performed using secondary selections can be enhanced by reference to the thesaurus-like functionality of the Lexary. Specifically, the usage of synonyms of a particular sense of a word in a document helps to indicate that the word is being used in the intended sense in the document. Thus, while the process of submitting a thesaurus entry is essentially similar to the process of submitting any other type of entry, a thesaurus entry submission process is depicted in FIG. 114B. In the depicted embodiment, while viewing senses associated with an entry, a user locates the particular dictionary sense for which he or she wishes to submit a synonym 11411. The user then clicks through, using a link such as that 11421 depicted in FIG. 114C, to view the thesaurus entry related to the given sense 11412. The user can then view thesaurus senses associated with the particular dictionary sense of the word, and, if desired, the user can click through to a Web submission form whereby he or she can submit the new thesaurus sense 11413. The new thesaurus sense then enters "proposed" status as usual 11414, allowing other users to submit subscriptions 11415, and the sense approval process is followed as usual 11416.

4.1 UTOU Subsystem

A Uniform Terms of Use (UTOU) subsystem is provided to further facilitate informational and commercial transactions and interactions between users of the UAML and USE subsystems.

The UTOU subsystem allows a website provider to "subscribe" to a particular version of a Uniform Terms of Use Agreement (UTOUA) by properly referencing the UTOUA in a "local" terms of use agreement governing a relationship between the website provider and a website user.

In so doing, the UTOU subsystem enables significant savings in terms of time and expense for both website providers and website users while also causing numerous beneficial side effects, such as laying a foundation for uniformity in Internet-related law.

Figure 115:
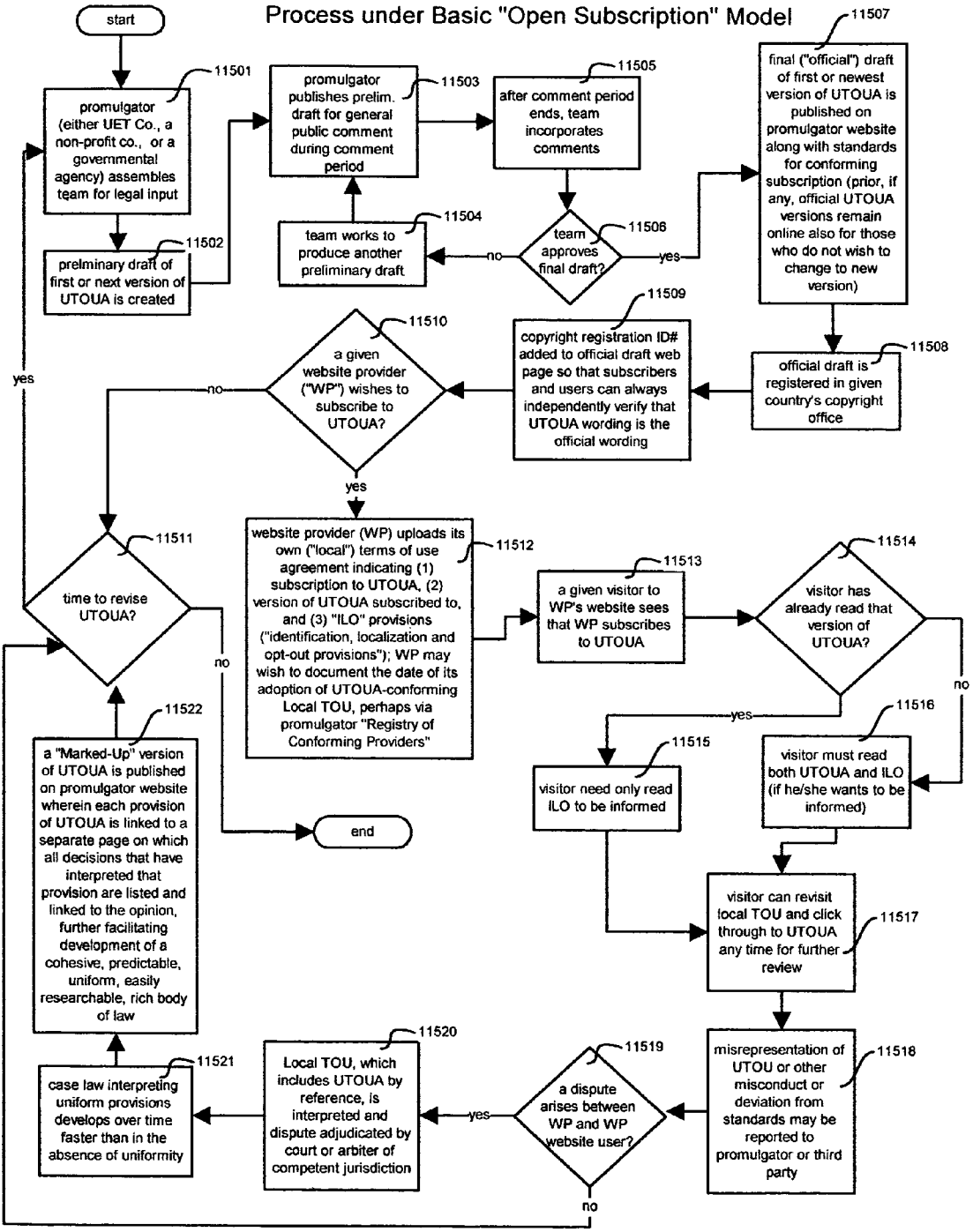
FIG. 115 is a flowchart depicting a process whereby the UTOU system is created, deployed, and used.

A process of creation, deployment and use of the UTOU subsystem is depicted in flowchart form in FIG. 115. The embodiment depicted in FIG. 115 is an "open subscription" model, meaning, that any website provider can participate in this model without registering with the UET Company. A "Registered Subscriber" model is provided, in contrast, in FIG. 119. There are advantages and disadvantages to both models: under the open subscription model, the convenience of participating may encourage more participants; under the registered subscriber model, quality assurance mechanisms can be implemented and UTU integration is possible.

Under the open subscription model, a promulgator—an entity such as the UET Company, a nonprofit organization, or a governmental agency—assembles a UTOU drafting team that includes representatives of the legal community, consumer advocacy groups, and other interested parties 11501. The team produces a preliminary draft of a first (or, in later iterations, a next) version of the UTOUA 11502. The promulgator publishes the preliminary draft on its website together with a mechanism through which citizens-at-large can comment on the preliminary draft 11503 for a predetermined period of time. After the comment period ends, the drafting team incorporates knowledge gained through the public comment procedure into the draft 11505. If, after these revisions, the team approves the draft as final 11506, it is published as the official final draft of the given version of the UTOUA 11507. Otherwise, another preliminary draft is produced 11504 and the public comment procedure is repeated 11503.

Related information, such as standards for proper usage of the UTOUA are also published 11507. Older versions of the UTOUA, if any, remain at the URL where they were originally published so that any citations to them remain valid.

The official draft of the latest UTOUA version is registered in a governmental copyright office 11508, and a unique copyright number is added to the official draft 11509; in this way, a dispute about the actual language appearing in the draft can be resolved by reference to the copy of the draft at the copyright office.

If a website provider wishes to subscribe to the UTOUA 11510, the website provider drafts its own local terms of use agreement so that it conforms to the standards set forth on the promulgator website (and in the UTOUA itself) 11512. A conforming local terms of use agreement includes a valid reference and link to the UTOUA version to which the website provider subscribes as well as a group of terms that are specific to the website provider's local terms of use agreement. These site-specific terms, called "ILO" provisions, identify the website provider, indicate which jurisdictional laws apply, and provide all terms that differ from or add to the terms of the UTOUA version to which the website provider subscribes 11512.

When a visitor visits the website provider's website, he or she can see that the website provider subscribes to the UTOUA by viewing the local terms of use agreement 11513. If the visitor is already familiar with the version of the UTOUA to which the website provider subscribes 11514, the visitor need only read the ILO provisions 11515 in order to be informed about the contractual provisions to which he or she is agreeing in using the website.

In allowing website visitors to focus strictly on these site-specific provisions applicable to the given website, the UTOU subsystem saves visitors a great deal of time and encourages them to read the local terms of use agreement.

Any time the visitor wishes to refresh his or her knowledge of the UTOUA, the visitor can simply click through from the local terms of use agreement to the UTOUA 11517. Whenever a website provider misuses or deviates from the standards for conforming usage of the UTOUA, misconduct can be reported to the promulgator 11518.

If a dispute arises between the website provider and the visitor 11519, the provisions of both the local terms of use agreement and the UTOUA, provided the latter has been properly incorporated by reference by the former, apply to the dispute, with the site-specific ILO provisions trumping any conflicting terms in the UTOUA 11520. As the terms of the UTOUA are interpreted during the resolution of disputes, the body of caselaw pertaining to the UTOU develops into a richer and more uniform body of law than is possible in the absence of such a system 11521.

As decisions interpreting the UTOUA provisions are handed down, a document linking system, such as that depicted in FIG. 118, is deployed to further facilitate easy researching of legal issues pertaining to the UTOUA and development of a settled body of Internet law 11522.

FIG. 116 depicts an excerpt from an example web page 11601 hosted on the promulgator website. This page 11601 displays a version of the Uniform Terms of Use Agreement, including terms that describe how a conforming subscription can be made effective as well as the actual terms that will be legally active and applicable when a conforming subscription is in effect.

FIG. 117 depicts an excerpt from an example web page 11701 hosted on the website provider's website. This page 11701 displays the local terms of use agreement, which has been made effective in conformance with the UTOU standards for subscription. Thus, the UTOUA version indicated in the document is incorporated by reference so as to be legally active. ILO provisions are also included, serving to identify the website provider, the website, the jurisdiction whose laws will apply to conflicts arising out of the agreement, and the site-specific opt-out provisions.

FIG. 118 depicts document-linking relationships underlying the UTOU subsystem. Depicted is a first version 11801 of the UTOUA and a second version 11804 of the UTOUA. Multiple local terms of use agreements 11808a and 11808b link to the first version 11801 and multiple local terms of use agreements 11809a and 11809b link to the second version 11804. One terms of use agreement 11808c is depicted at two different moments in time: at one time, this local terms of use agreement 11808c incorporates by reference the first version of the UTOUA 11801; at a later date, this document 11808c has been modified by the website provider so as to incorporate the second version of the UTOUA 11804 by reference.

Each version of the UTOUA links to a marked-up, exact copy of the same document. Thus, for instance, the first version of the UTOUA appears in "clean" form 11801 and links to a "marked-up" document 11802 that includes the same version of the UTOUA. Each clause or provision of the marked-up UTOUA 11802 is an individual hyperlink to another page 11803. The latter page 11803, continually updated by the promulgator, provides a list of cases in which the individual UTOUA provision linking to the latter page 11803 has been interpreted.

This document linking system allows anyone to visit the marked up version of the UTOUA and click on an individual contractual provision so as to view cases relating to that provision. Researching the legal significance of any given provision in the UTOUA is thereby made much easier.

The registered subscriber model includes all the steps of the open subscription model but involves the additional steps shown in the flowchart in FIG. 119. The website provider tags his or her local terms of use agreement with UAML tags, specifically, using the UTOU tag vocabulary (not depicted), and lists the local terms of use web page as any other UAML-enabled listing per the process depicted in FIG. 6A. Thereafter, when a UTU user visits the web page including the UTOU listing 11902, the UTU displays an icon indicating that the given website provider is a registered UTOU subscriber 11903. Such an icon 12002 appears in the UTU embodiment 12001 depicted in FIG. 120.

Registering UTOU subscribers through the UAML listing method allows certain benefits: the local terms of use agreement can be validated, like other UAML listings, by comparison to standards for conforming subscriptions, while the presence of a URLIT enables UTU integration as described above.

4.2 UTOU Subsystem UFC Subsystem

The basic approach of the UTOU subsystem can be extended into a Universal Form Contract (UFC) subsystem.

The UFC subsystem allows two or more users to establish a written contract between each other that "subscribes" to a particular Universal Form Contract by properly referencing the UFC in the written contract; the terms of the UFC referenced in the written contract are stored in multiple locations for easy retrieval.

In so doing, the UFC subsystem enables significant savings in terms of time and expense for users while also causing numerous beneficial side effects, such as reducing the use of paper by potentially millions of pages annually and laying a foundation for uniformity in contract law.

Figure 121:
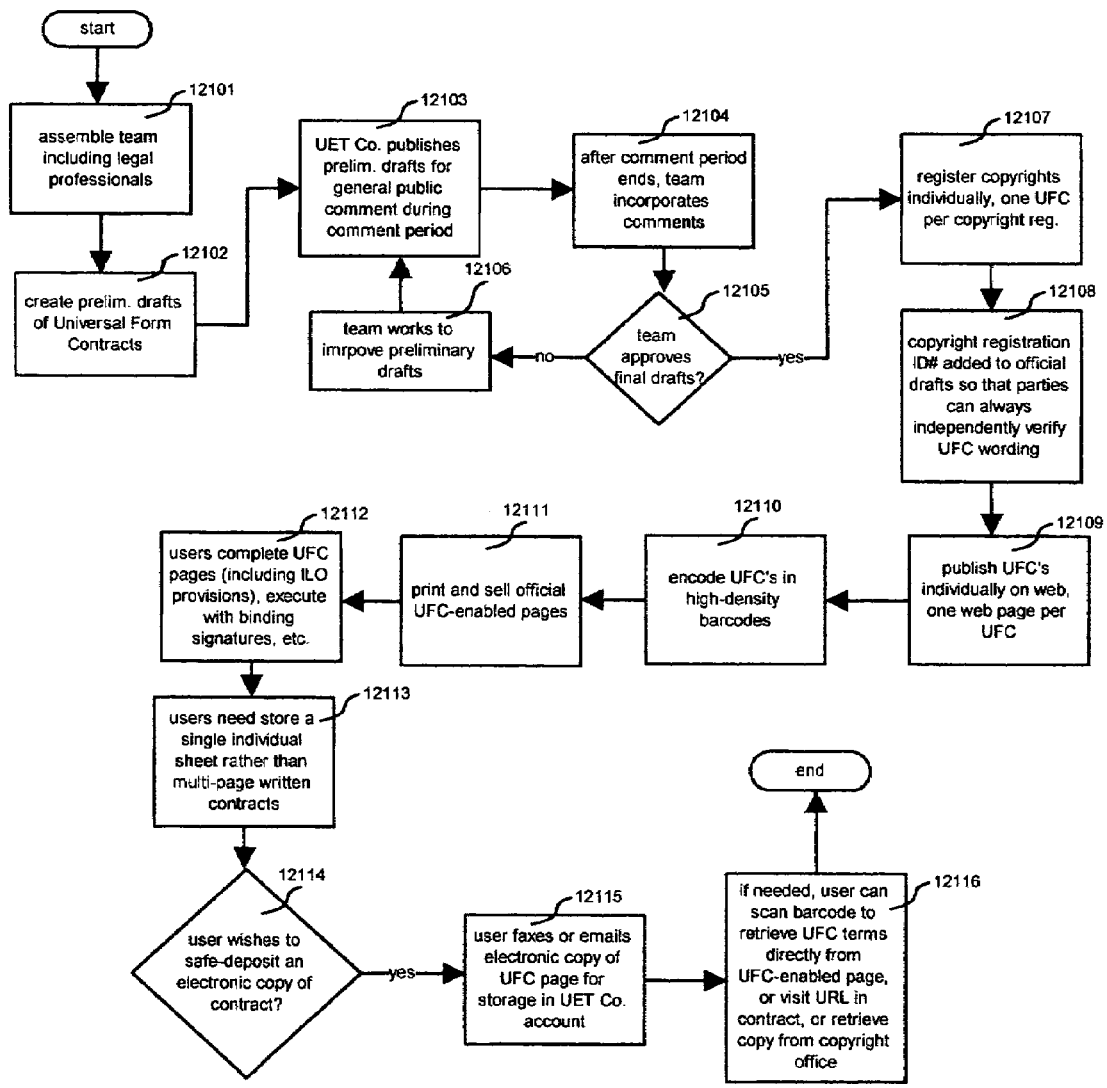
FIG. 121 depicts a process whereby the UFC system is created, deployed, and used.

A method of creating, deploying and using an embodiment of the UFC subsystem appears in flowchart form in FIG. 121. A drafting team is formed 12101 to create a preliminary draft for each type of Universal Form Contract 12102. Types of UFCs may include: a UFC apartment rental agreement; a UFC personal property purchase agreement; a UFC nondisclosure agreement; a UFC will; and other such legal instruments. The UET Company then publishes the draft of each UFC 12103 for public comment. Once the public comment period ends, the drafting team modifies each UFC so as to accommodate useful public comments 12104. When the draft is finally approved by the team 12105, each UFC is individually registered in the copyright office 12107 and the copyright registration number is added to the official draft so that parties can verify the official terms through an independent source 12108.

If a draft is not approved 12105, the team works to improve the preliminary draft 12106.

Each UFC is published individually on the website of the UET Company site so that only one UFC appears per URL 12109. Each UFC is then encoded in high-density-bar-code form 12110, which bar-code is then printed along with human readable text on an official "UFC-enabled" paper page 12111 such as the example page 12201 depicted in FIG. 122.

Users wishing to record an agreement in written form acquire a UFC-enabled page that references the appropriate UFC type, fill out the ILO provisions by hand or machine print, and then execute the agreement with signatures 12112.

In this way, most written contracts can be reduced from several pages to one page 12113 while still containing the same amount of contractual provisions.

If a user wishes to create a back up copy of the executed UFC-enabled contract document 12114, he or she can fax or e-mail an electronic copy of the UFC-enabled contract document to the UET Company for storage as a digital file related to the user's UET Company account 12115. Whenever a user or third party needs to look up the UFC terms incorporated into the written document, three different ways are readily available: visit the URL identified in the written document, scan and decode the bar-code on the document, or retrieve the copy of the document deposited at the copyright office 12116. These and other benefits are described in the chart depicted in FIG. 123. Most importantly, the UFC subsystem offers a significant opportunity to reduce the waste of paper and other resources used in making paper.

5.1 Universal Arbitration Subsystem

A Universal Arbitration Subsystem is also provided to further facilitate informational and commercial transactions and interactions between users of the UAML and USE subsystems.

The UArb subsystem allows users to form a community by contracting with an intermediary such that members of the UArb community are bound to submit their disputes to alternative dispute resolution.

Figure 124:
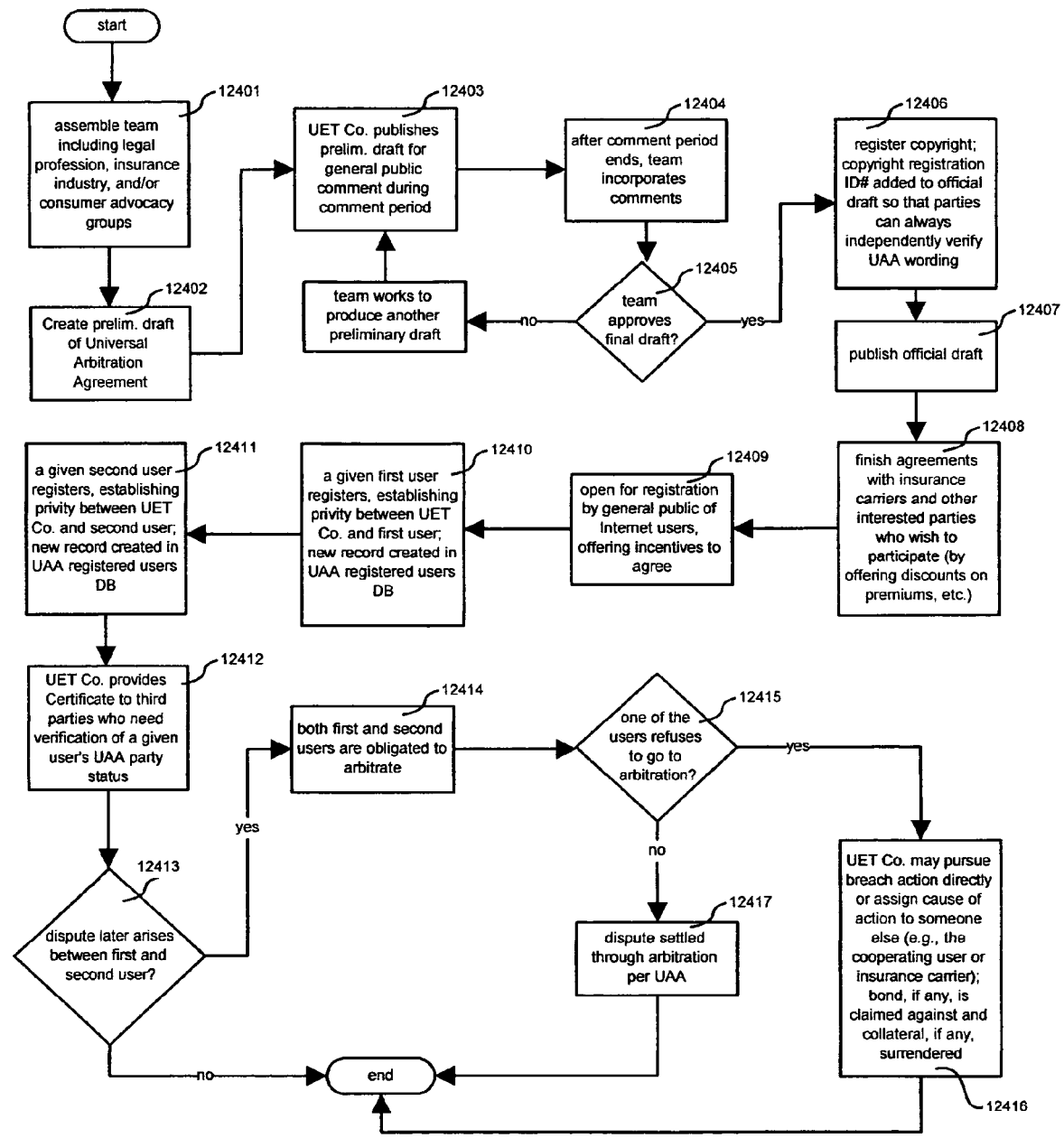

A method of creation, deployment, and use of the UArb subsystem appears in flowchart form in FIG. 124. First, a drafting team, including representatives from the legal profession, insurance industry, consumer advocacy groups, and other interested parties, is formed 12401 to create a preliminary draft of the Universal Arbitration Agreement (UAA) 12402. The UET Company then publishes the preliminary draft for public comment 12403. After the public comment period ends, the drafting team incorporates these comments 12404. When the drafting team approves the final draft 12405, the final official draft is registered at the copyright office and the copyright registration number is added to the official draft for the reasons discussed in reference to the UTOU subsystem above 12406. The official draft is then published on the UET Company website 12407.

The UET Company optionally arranges any agreements with insurance companies or other parties who may wish to offer incentives to encourage users to participate in the UArb subsystem 12408. The UArb system is then made available 12409 so that a user can register by agreeing to the Universal Arbitration Agreement 12410. Such agreement establishes privity of contract between the agreeing user and the UET Company, which serves as an intermediary in the UArb subsystem as described below. Other users also agree to the UAA 12411, and a new record is created in the UAA participants database for each participant.

Thereafter, if a third party, such as an insurance company, needs to verify that the agreeing user has agreed to the UAA, the UET Company can provide a certificate indicating the agreeing user's party status and the expiration date of the current UAA agreement between the agreeing user and the UET Company 12412.

In the event that a dispute later arises between two users who have both agreed to the UAA during the effective term of both parties' agreements 12413, both agreeing users are obligated to submit that dispute to binding arbitration 12414. If one of the agreeing users so obligated refuses arbitration 12415, enforcement of the arbitration duty can be pursued by the other agreeing user or by the UET Company directly, or the cause of action can be assigned to someone else for enforcement 12416. Otherwise, the dispute is settled through arbitration per the UAA 12417, and the parties thereby enjoy considerable savings in terms of time and money in avoiding litigation through the court system. Additional benefits are described in the chart in FIG. 127.

Figure 125:
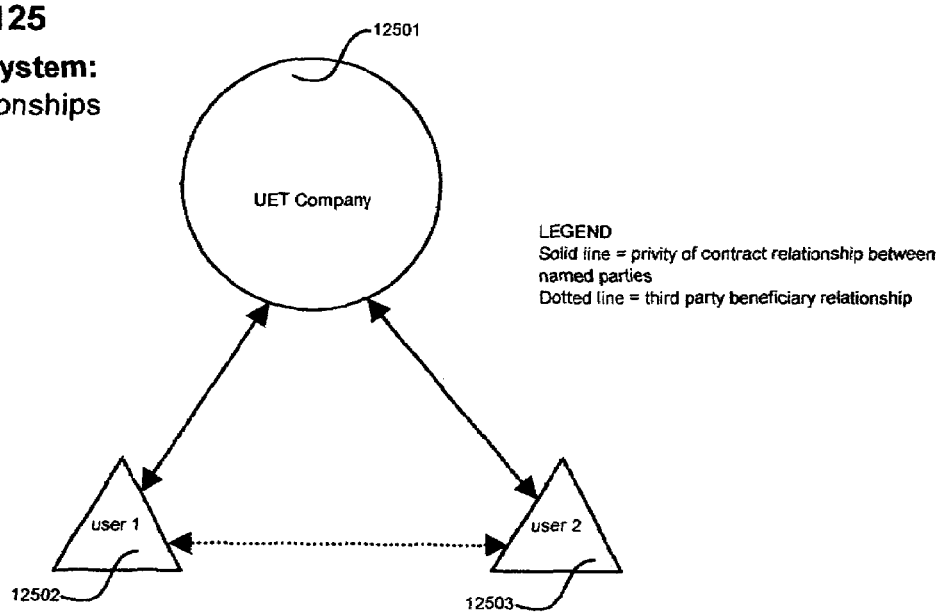

FIG. 125 depicts the party relationships described above. Specifically, a first agreeing user 12502 forms a binding UAA contract with the UET Company 12501. A second agreeing user 12503 also forms a binding UAA contract with the UET Company 12501. The terms of the UAA provide that any agreeing user agrees to submit disputes with third parties to binding arbitration when said third parties have also agreed to the UAA. These terms create a mutual "third party beneficiary" relationship between one agreeing user and another agreeing user.

Figure 126:
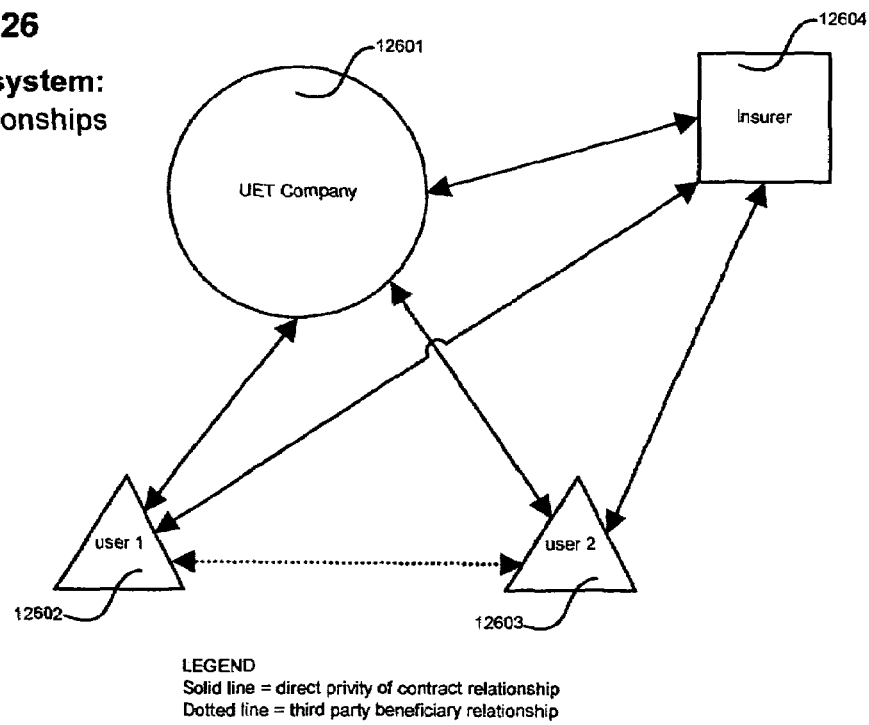

FIG. 126 depicts the party relationships described above so as to include an insurer 12604. The insurer 12604, in order to incentivize users to participate in the UArb subsystem, may offer premium discounts to users who agree to the UAA. A separate agreement, establishing privity of contract between the insurer 12604 and an agreeing user 12602, may thereby be formed. The insurer 12604 may wish to make such an offer to users so as to reduce its exposure to litigation costs. The UET Company 12601 thereby establishes a third-party beneficiary relationship between a first user 12602 and a second user 12603.

FIG. 128 depicts an excerpt from an example web page, hosted by the UET Company, that contains an embodiment of a version of the Universal Arbitration Agreement.

FIG. 129 depicts an excerpt from an example certificate through which the UET Company certifies that an agreeing user has agreed to the UAA.

The UAML/UTU subsystem and UArb subsystem can be integrated to enhance the functionality of each other. Specifically, when a UTU user visits a UAML-enabled listing of a website provider who has agreed to the UAA, information can be transmitted from the UET Company to the UTU indicating that the website provider is a UArb subsystem participant. The UTU can then display an icon informing the UTU user of the website provider's UArb status.

FIG. 130 depicts an embodiment of the UTU 13001 displaying such an icon 13002.

6.1 Ramifications

As shown, the disclosed URLIT and UAML system offers users opportunity, flexibility, economy, and precision. UAML listings, including Internet auctions, can be hosted on any website, and the appearance of such listings is determined by the user. Indexing and searching such listings is easy, and the precision and accuracy of such searches are much greater than conventional HTML pages and Web search engines allow. This power can even be tapped by e-mail, telephone, or other nontraditional search input media. Meanwhile, the subject matter of UAML listings is almost limitless: auctions, jobs, personals, automobiles, real estate, and all manner of other classified ads.

The disclosed UTU reduces or eliminates the need for traditional Web submission forms and purchase forms, thereby saving users time and reducing the risk of identity theft. The universal shopping cart feature allows purchasing from multiple vendors through a single interface. The inventory and wish list features give website providers an additional vehicle for maximizing the value of their websites.

The disclosed Userithm Search Engine gives users tremendous leeway in customizing search algorithms to meet their individual needs for a unique search in real-time, on-the-fly. Performance feedback is provided immediately so that users can improve their own techniques over time. The Userithm Search Engine method can be applied to a wide variety of subject matter, including auctions, personal ads, real estate, investment vehicles and more.

The disclosed Lexivote search methodology offers direct access to the collective intelligence of the World Wide Web user community. Lexivote search results are essentially the product of countless individual interviews, making for highly dependable levels of relevancy.

The disclosed Lexary reference materials method provides both the currency of a user-maintained resource and the authority of extensively reviewed content, while avoiding the pitfalls of anarchy.

The disclosed UTOU subsystem brings order and commonality to the disjointed, unpredictable landscape of relationships between website providers and website users. In so doing, high priority, unique contractual terms are brought into focus while common terms need not be read over and over. Meanwhile, the UTOU establishes a platform upon which rich and settled case law can develop rapidly.

The disclosed UFC subsystem offers the advantages of the UTOU subsystem while also reducing paper usage and storage requirements while making the transmission and backup of important legal documents easier.

The disclosed UArb subsystem allows the formation of intentional communities via the Internet, whereby the efficiencies of alternative dispute resolution are made conveniently available to citizens at large.

7.1 Scope

Although the description above contains many specificities, these should not be construed as limiting the scope of the invention but as merely providing illustrations of some of the presently preferred embodiments of this invention. Accordingly, the scope of the invention should be determined by the appended claims and their legal equivalents, rather than by the examples given. For instance, it will be understood that features of one embodiment may be combined with features of other embodiments while other features may be omitted or replaced as being nonessential to the practice of the invention. As is plain to one skilled in the art, the disclosed invention can be deployed using entirely different tag names as long as the purposes for which these tags exist are served. Following disclosed tagging conventions may be useful, but one skilled in the art will see that the invention can use other conventions or be modified to meet external standards, e.g., XML.

Licensing information may be obtained through http://www.inventerprise.com.

What is claimed is:

1. A news method, the method comprising the following steps:
    receiving at a first computer system a first submission, said first submission comprising first content, said first content comprising first account information, said first computer system comprising a first memory;
    storing said first account information in said first memory;

receiving a second submission, said second submission comprising second content, said second content comprising first article information, said first article information comprising at least a first resource location or a first headline;

receiving a plurality of additional submissions, said plurality of additional submissions comprising a third submission and a fourth submission, said third submission comprising third content, said fourth submission comprising fourth content, said fourth content comprising at least an indication of either approval or disapproval;

storing at least some of said submissions in a first database system, said first database system comprising at least a first database;

calculating a first content approval score, said step of calculating said first content approval score being performed at least partly according to a first time criterion and comprising a step of performing a first count, said step of performing said first count comprising a first step of counting at least some of said plurality of additional submissions;

providing a first resource, said first resource comprising a plurality of items, said plurality of items comprising a first item, said first item comprising at least first indicia, said first indicia indicating a first value, said first value pertaining to said third content;

performing a second count, said step of performing said second count comprising a second step of counting at least some of said plurality of additional submissions;

providing first display information, said step of providing said first display information comprising a step of at least partly causing second indicia to appear in a second resource, said second indicia indicating a second value, said second value being based at least in part upon an outcome of said step of performing said second count;

providing first submission-facilitation information, said step of providing said first submission-facilitation information comprising a step of at least partly causing a first submission-facilitation mechanism to appear in a third resource;

providing fifth content;

receiving a fifth submission, said fifth submission comprising sixth content, said sixth content comprising second article information, said second article information comprising at least a second resource location or a second headline;

updating said fifth content, said step of updating said fifth content comprising a step of including said sixth content in said fifth content;

associating a second item with a first probational status;

associating a third item with said first probational status;

determining a first measure of community approval;

comparing said first measure of community approval to a first threshold;

promoting said second item to a first elevated status, said step of promoting said second item to said first elevated status being performed at least partly according to an outcome of said step of comparing said first measure of community approval to said first threshold;

determining a second measure of community approval;

comparing said second measure of community approval to a second threshold;

keeping said third item in association with said first probational status, said step of keeping said third item in association with said first probational status being performed at least partly according to an outcome of said step of comparing said second measure of community approval to said second threshold;

promoting a fourth item to said first elevated status; and removing said second item from said first elevated status, wherein said first resource is different from said second resource and from said third resource.

2. The method in claim 1 wherein:

said third content comprises a third resource location, said third resource location being or comprising a first uniform resource locator (URL);

said first time criterion pertains to when at least one of said plurality of additional submissions was received; and wherein said method additionally comprises the following steps:

receiving third article information;

receiving fourth article information;

comparing said third article information to said fourth article information;

providing notice that said fourth article information has already been received;

disallowing a sixth submission, said sixth submission comprising at least an indication of either approval or disapproval;

allowing a seventh submission, said seventh submission comprising at least an indication of either approval or disapproval, wherein both said fourth submission and said sixth submission are associated with a first user account;

wherein said seventh submission is associated with a second user account; and wherein said first user account is different from said second user account.

3. The method in claim 1 additionally comprising the following step:

ensuring data portability, said step of ensuring data portability comprising at least a step of:

providing a fourth resource, said fourth resource conforming to a first data portability standard, said first data portability standard comprising at least a first instruction standard and a second instruction standard, said first instruction standard being a manner of describing data, said manner of describing data being sufficient to identify a first field of data to which a described piece of data belongs, wherein said fourth resource comprises at least a first instruction and a second instruction;

wherein said first instruction describes a first piece of data in conformance with said first instruction standard;

wherein said second instruction describes a second piece of data in conformance with said second instruction standard; and wherein said first field of data is selected from the group consisting of (i) a sex field, (ii), a religion field, (iii) an orientation field, (iv) an age field, (v) a height field, (vi) and a city field.

4. The method in claim 1 wherein:

said step of providing first display information further comprises a step of providing a first set of information, said first set of information being in a pasteable form; and said step of providing first submission-facilitation information further comprises a step of providing a second set of information, said second set of information being in a pasteable form.

5. The method in claim 1 wherein:

said fifth content is a first news feed;

said first resource is hosted on a second computer;

said second resource is hosted on a third computer;
said second computer and said third computer are different computers;
said first resource is under control of a first entity;
said second resource is under control of a first user; and
said first user is different from said first entity.

6. The method in claim 1 additionally comprising the following step:
   determining whether a second time criterion is met,
   wherein said step of promoting said fourth item to said first elevated status is performed only when said second time criterion is met.

7. The method in claim 1 additionally comprising the following steps:
   receiving a first URL;
   converting said first URL to a first character string, said first character string being different from said first URL; and
   causing current information pertaining to said first URL to display via a first toolbar.

8. The method in claim 1 additionally comprising the following step:
   recommending a first user to a second user, said step of recommending said first user to said second user comprising a step of determining that at least one of said first user or said second user matches at least one matching criterion.

9. The method in claim 1 additionally comprising the following step:
   providing a first toolbar, said step of providing said first toolbar comprising at least one of the following steps:
      providing an in-toolbar submission mechanism, said in-toolbar submission mechanism being configured to convey a sixth submission, said sixth submission pertaining to a first URL, said first URL identifying a document that is currently displayed in a web browser, said step of providing said in-toolbar submission mechanism comprising at least (i) a step of receiving said sixth submission and (ii) a step of storing said sixth submission in relation to said first URL; and
      providing an in-toolbar link to a first plurality of user comments, said first plurality of user comments relating to a second URL, said second URL identifying a document that is currently displayed in said web browser; and
      providing an in-toolbar newsfeed of real-time, top news stories.

10. The method in claim 1 wherein:
    said step of removing said second item from said first elevated status is performed when said step of promoting said fourth item to said first elevated status is performed; and
    wherein said method additionally comprises the following step:
       determining which one of said second item and said fourth item is currently more popular.

11. The method in claim 1 additionally comprising the following step:
    providing a first toolbar function, said step of providing said first toolbar function comprising the following steps:
       alternately displaying or not displaying a first indicator in a first toolbar, said step of alternately displaying or not displaying said first indicator being performed according to whether a first URL is currently in a web address field of a web browser, said first indicator indicating a condition pertaining to said first URL; and
       alternately displaying or not displaying a first link in said first toolbar, said first link configured to trigger display of real-time information comprising or pertaining to user-generated content, said step of alternately displaying or not displaying said first link being performed according whether said first URL is currently in said web address field, said user-generated content pertaining to said first URL and being stored in said first database.

12. The method in claim 1 additionally comprising the following step:
    calculating a first authority score, said first authority score being related to a first account, said first account being related to said first account information,
       wherein said step of calculating said first content approval score is performed at least partly according to said first authority score.

13. The method in claim 12 wherein said step of calculating said first authority score is performed at least partly according to a first factor, said first factor pertaining to popularity of submissions associated with said first account.

14. The method in claim 12 additionally comprising the following steps:
    receiving a sixth submission, said sixth submission being associated with said first account; and
    receiving a seventh submission, said seventh submission pertaining to said sixth submission,
       wherein said step of calculating said first authority comprises a step of performing a third count, said step of performing said third count comprising a third step of counting at least some of said plurality of additional submissions, including said seventh submission.

15. The method in claim 1 wherein:
    said step of comparing said first measure of community approval to said first threshold comprises a step of determining whether said second item is popular, wherein said second item is popular if at least a first quantity or proportion of users has indicated approval of said second item; and
    said step of promoting second item to said first elevated status comprises a step of displaying said second item in a first manner at a first point in time when said second item is popular at said first point in time.

16. The method in claim 1 additionally comprising the following steps:
    receiving a first user-specified article filter criterion, said first user-specified article filter criterion pertaining to content or characteristics of news articles;
    filtering articles according to said first user-specified article filter criterion;
    receiving or retrieving a first user-specified category; and
    categorizing said first article information according to said first user-specified category.

17. The method in claim 1 wherein said first probational status signifies that an item has not yet become popular, and said first elevated status signifies that an item has become popular.

18. The method in claim 1 additionally comprising the following steps:
    receiving a first URL;
    receiving a first indication of a first strength of preference;
    receiving a first label, said first label comprising at least a first word;
    receiving a first query;

comparing said first query to said first label;
ranking a plurality of items, said plurality of items comprising a fifth item and a sixth item, said fifth item being associated with said first URL, said step of ranking said plurality of items comprising a step of ranking said fifth item higher than said sixth item when said first strength of preference is higher than a second strength of preference;
establishing a first vendor account, a second vendor account, and first shopper account;
indicating that said first vendor account has been established;
providing an electronic shopping cart mechanism;
receiving by way of said electronic shopping cart mechanism information pertaining to a plurality of different purchases;
charging said first shopper account for said plurality of different purchases;
paying a plurality of different vendors for said plurality of different purchases;
instructing said plurality of different vendors to ship said purchases to a first shopper, said plurality of different vendors comprising a first vendor and a second vendor, said first vendor being associated with said first vendor account, said second vendor being associated with said second vendor account, and said first shopper being associated with said first shopper account, said first vendor being different from said second vendor and from said first shopper; and
causing display of an advertisement;
  wherein said first strength of preference comprises a first value, said first value being one among a range of possible values, said range of possible values comprising at least three different values.

19. The method in claim 1 additionally comprising the following steps:
providing a fourth resource, said fourth resource comprising a first customization submission mechanism;
receiving a first customization submission via said fourth resource; and
causing display of first custom content when a first URL is accessed, said step of causing display of first custom content being performed at least in part according to said first customization submission and being performed by way of either (i) a first toolbar or (ii) a first set of embeddable information.

20. The method in claim 1 wherein:
said first value indicates at least in part a real-time measure of popularity;
said second value indicates a real-time quantity of submissions received that relate to said second resource;
said first submission-facilitation mechanism comprises a link configured to submit submissions that relate to said second resource; and
said second resource and said third resource are the same resource.

21. The method in claim 1 additionally comprising the following steps:
providing a first set of embeddable information;
determining whether said first set of embeddable information is embedded in a fourth resource; and
providing access to a first account function only when said first set of embeddable information is embedded in said fourth resource.

22. The method in claim 19 wherein said first custom content comprises a first newsfeed or a first in-toolbar submission mechanism.

23. The method in claim 1 wherein:
said first time criterion pertains to freshness of submissions;
said fourth content pertains to said third content;
said first content approval score is based in part on said fourth content;
said first item further comprises a hyperlink to said second resource, said second resource being located at a first URL, said third content comprising said first URL;
said first indicia pertains at least partly to popularity of said second resource;
said first account information is associated with a first user account and comprises at least a name, user identification (ID), or email address;
said first user account is associated with a first user;
said third submission is associated with said first user account;
a second user account is associated with a second user;
said fourth submission is associated with said second user account; and
said first user and said second user are different users.

24. The method in claim 1 wherein said fifth content further comprises said first article information, said first article information comprising both said first resource location and said first headline, said first resource location comprising a first URL, wherein:
said first headline is hyperlinked to said first URL in said fifth content.

25. The method in claim 1 additionally comprising the following steps:
receiving evidence of official capacity to represent an organization or of affiliation with said organization; and
providing access to a first newsfeed function only after receipt of said evidence.

26. The method in claim 1 additionally comprising the following step:
providing a first toolbar mechanism, said step of providing said first toolbar mechanism being configured to perform at least one of the following steps:
  (i) a step of causing display of a current status indicator through a first toolbar;
  (ii) a step of causing display of a list through said first toolbar;
  (iii) a step of causing display of user-submitted comments through said first toolbar; or
  (iv) a step of causing display of a newsfeed through said first toolbar according to a user subscription.

27. The method in claim 1 wherein:
said method is a collective intelligence-based, social news gathering and tagging method for crowdsourcing and collaborative editing by a first community of users; and
wherein the step of promoting said fourth item comprises the following step:
determining whether critical mass has been reached with respect to said fourth item, wherein said critical mass pertains to a first quorum, said first quorum pertaining to a number or proportion of users who have participated.

* * * * *